(12) United States Patent
Satori

(10) Patent No.: US 7,092,170 B2
(45) Date of Patent: Aug. 15, 2006

(54) ZOOM LENS AND IMAGE PICKUP APPARATUS

(75) Inventor: Tomoyuki Satori, Kawagoe (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/114,096

(22) Filed: Apr. 26, 2005

(65) Prior Publication Data

US 2005/0259331 A1   Nov. 24, 2005

(30) Foreign Application Priority Data

Apr. 30, 2004 (JP) .............................. 2004-136910
Apr. 30, 2004 (JP) ........................ P 2004-136908
Apr. 30, 2004 (JP) ........................ P 2004-136909

(51) Int. Cl.
   *G02B 15/14* (2006.01)
(52) U.S. Cl. ....................................... 359/689; 359/676
(58) Field of Classification Search ................ 359/689, 359/676
   See application file for complete search history.

(56) References Cited

U.S. PATENT DOCUMENTS 6,646,815 B1  11/2003  Nobe
6,785,057 B1 *  8/2004  Ori ............................. 359/689
6,804,064 B1 * 10/2004  Hirakawa .................... 359/682
6,839,184 B1 *  1/2005  Shan .......................... 359/689
6,900,947 B1 *  5/2005  Nakatani et al. ............ 359/689
6,919,994 B1 *  7/2005  Tanaka ....................... 359/689
2003/0169509 A1  9/2003  Iyama

FOREIGN PATENT DOCUMENTS

JP        2002-372667         12/2002

* cited by examiner

*Primary Examiner*—Scott J. Sugarman
*Assistant Examiner*—Darryl J. Collins
(74) *Attorney, Agent, or Firm*—Kenyon & Kenyon LLP

(57) ABSTRACT

A three-group zoom lens, includes, in order from an object side thereof: a first lens group having a negative refractive power, including in order from the object side: a negative-power first lens; and a positive-power second lens, wherein the first lens group including at least one aspherical surface, a second lens group having a positive refractive power, including in order from the object side thereof, a positive-power first lens; a positive-power second lens; and a negative-power third lens; wherein the positive-power second lens and the negative-power third lens are cemented together to form a meniscus-shaped cemented lens that faces a convex surface to the object side and the second lens group has aspherical surfaces on at least two surfaces other than a cemented surface of the cemented lens; and a third lens group having a positive refractive power, including: a positive-power single lens having only a spherical surface.

34 Claims, 32 Drawing Sheets

FIG.1
(a)
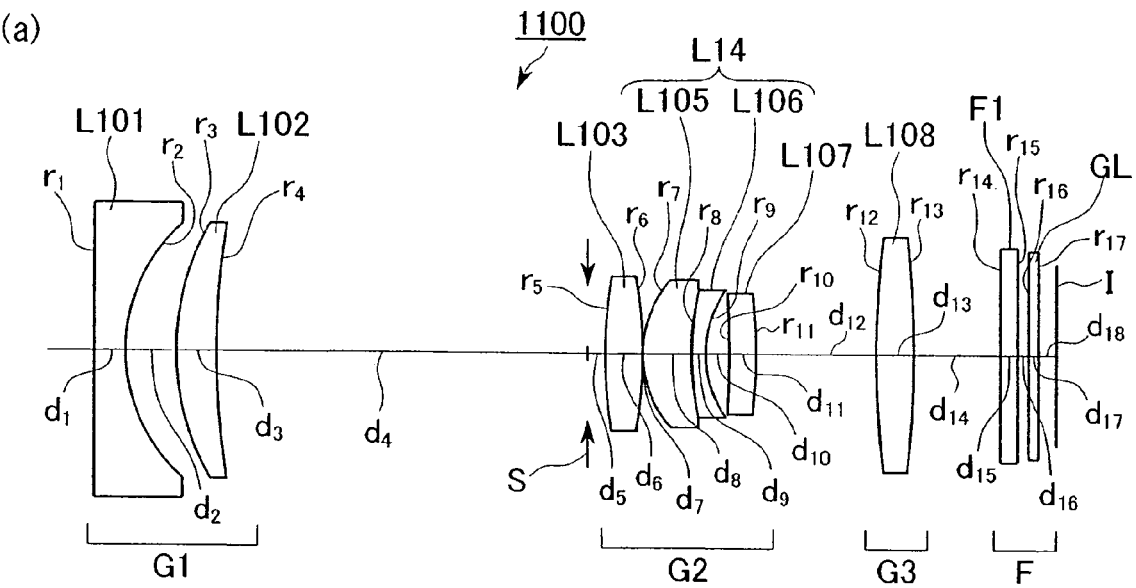
(b)
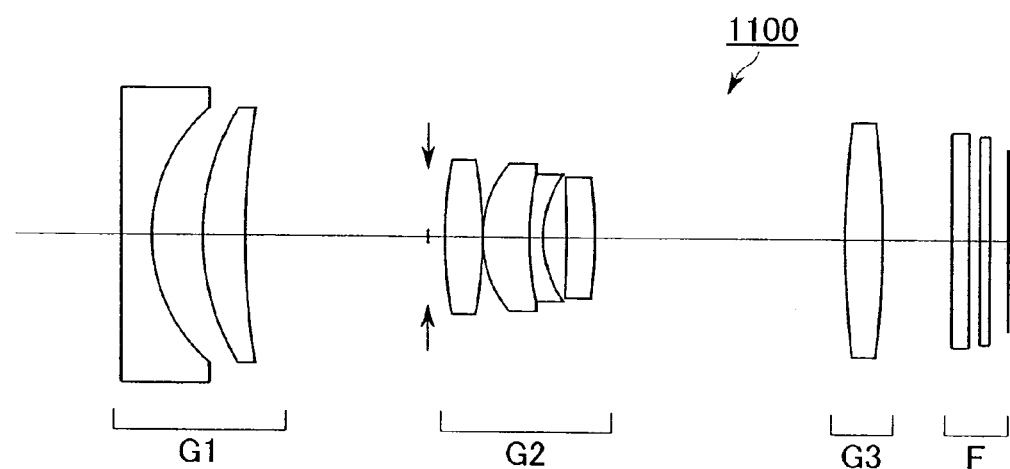
(c)
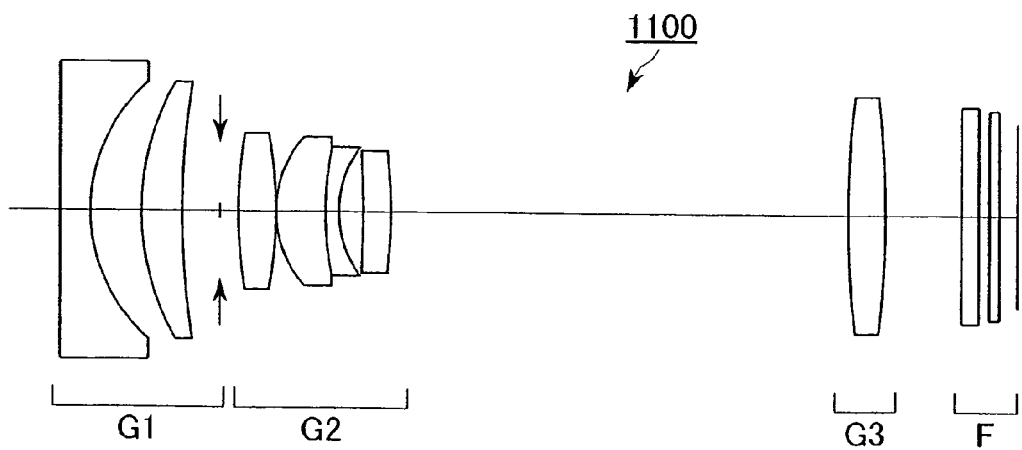

FIG.2
(a)
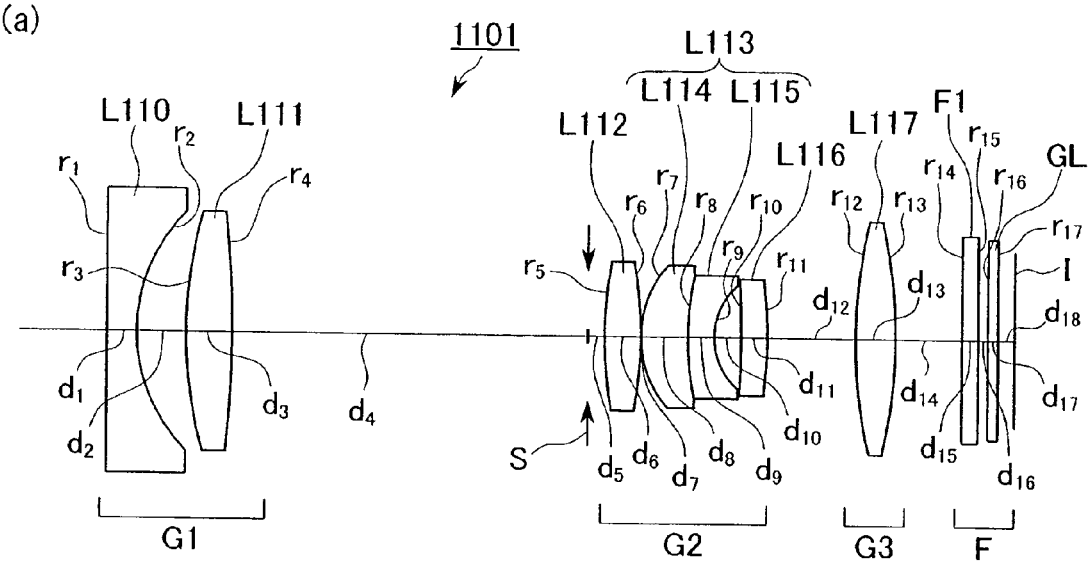
(b)
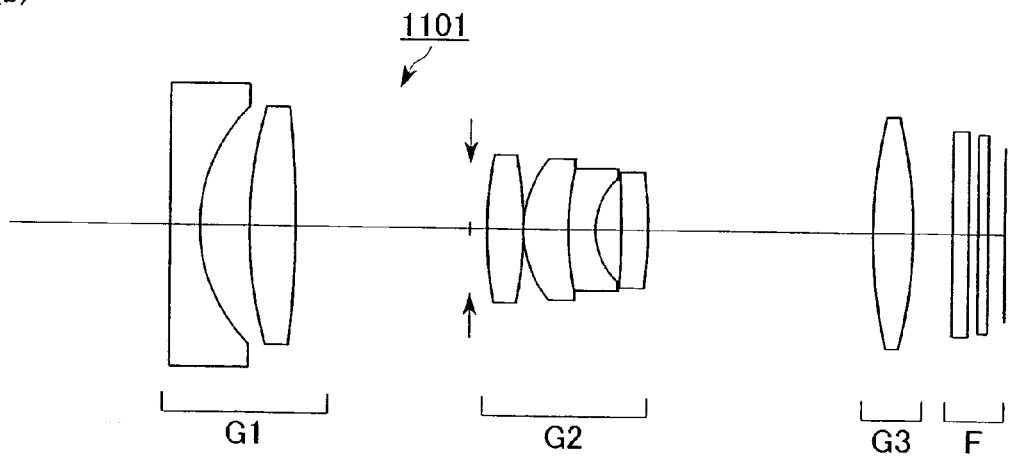
(c)
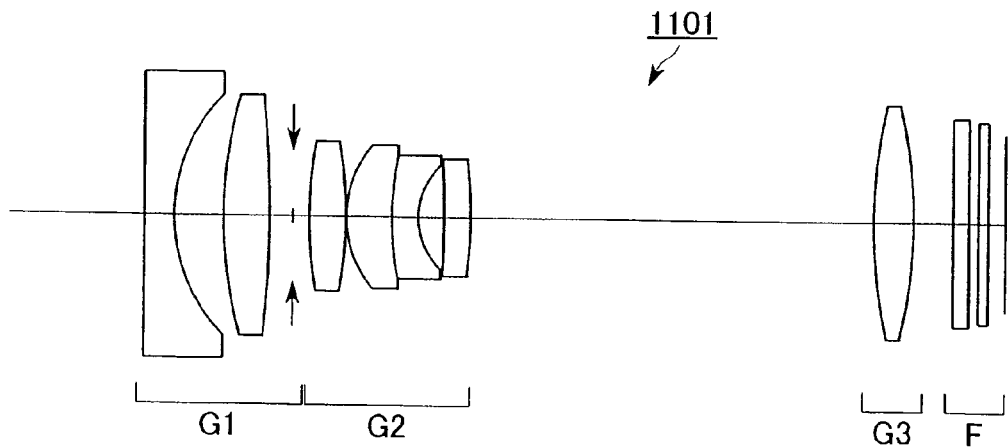

FIG.3
(a)
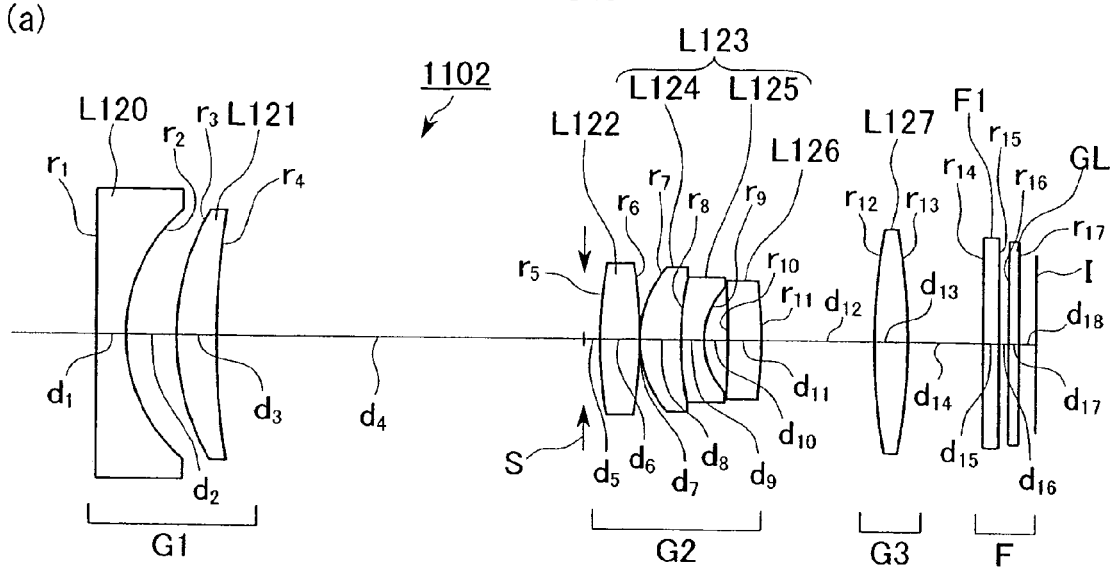
(b)
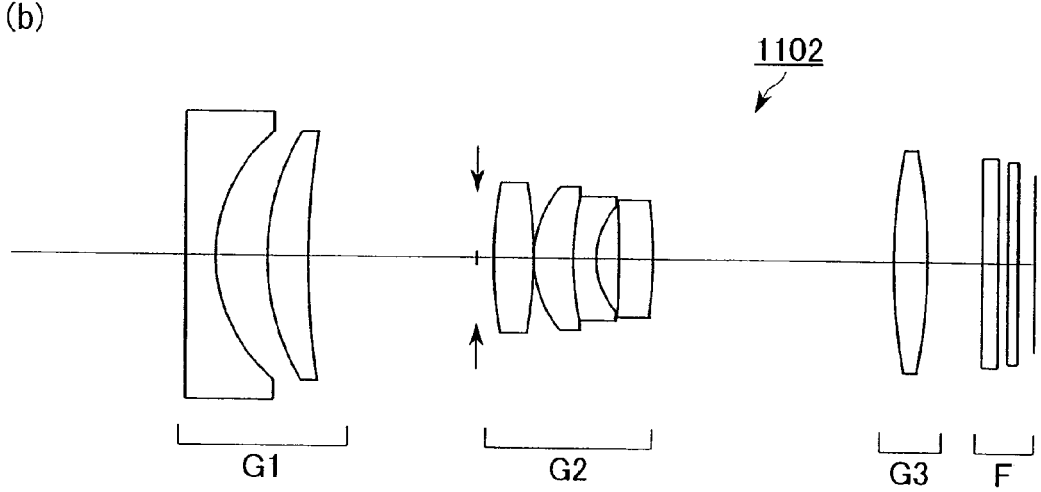
(c)
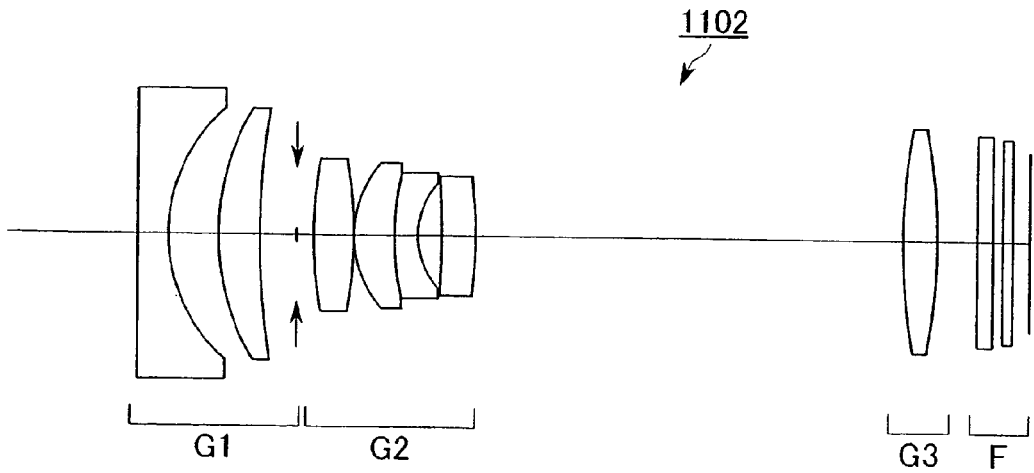

FIG.4
(a)
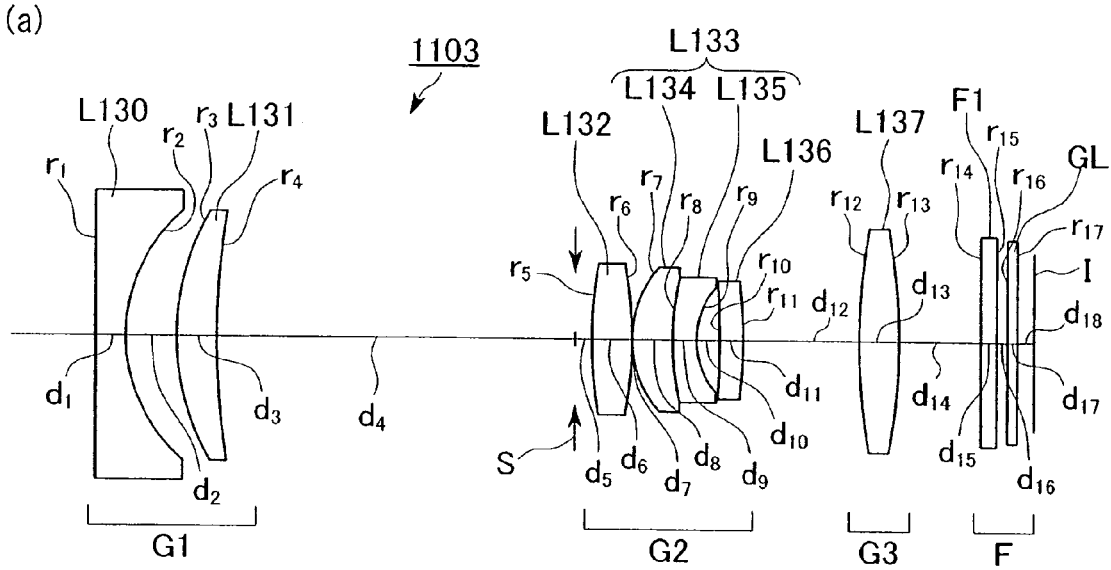
(b)
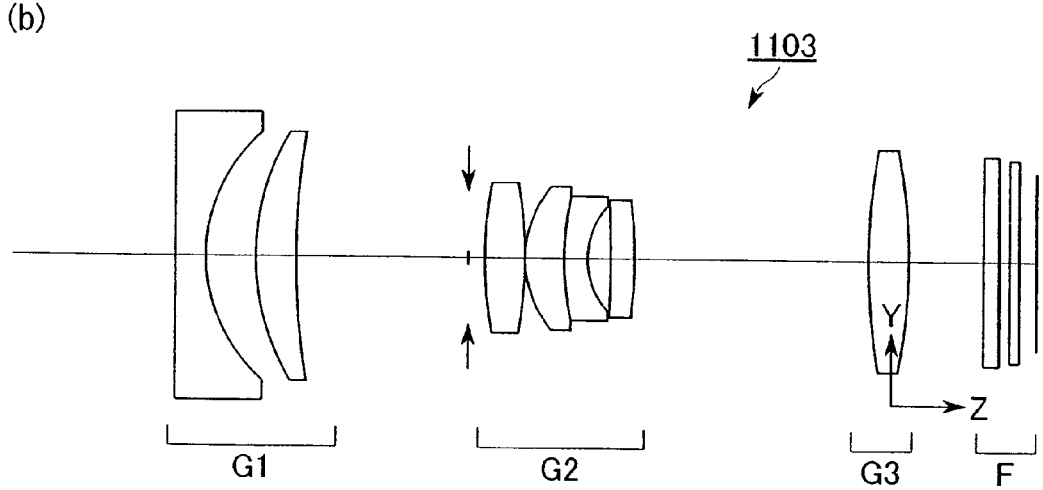
(c)
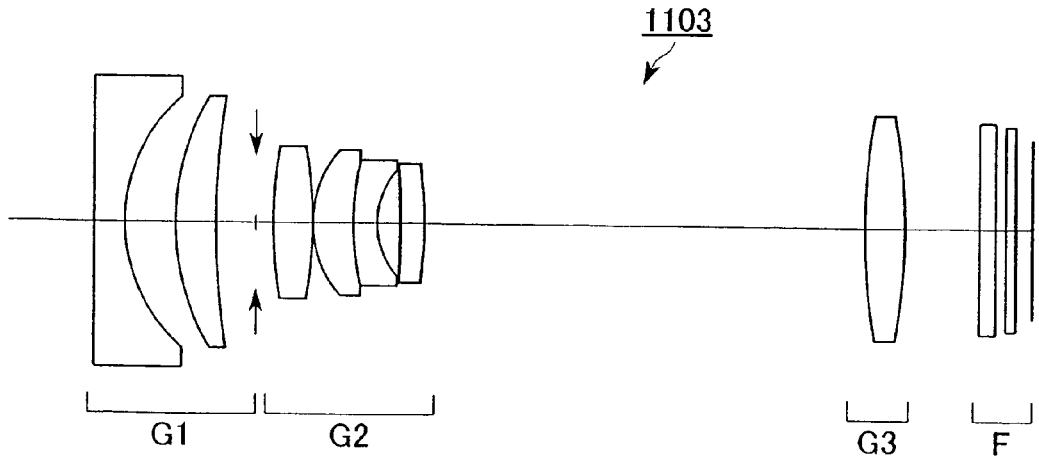

FIG.5
(a)
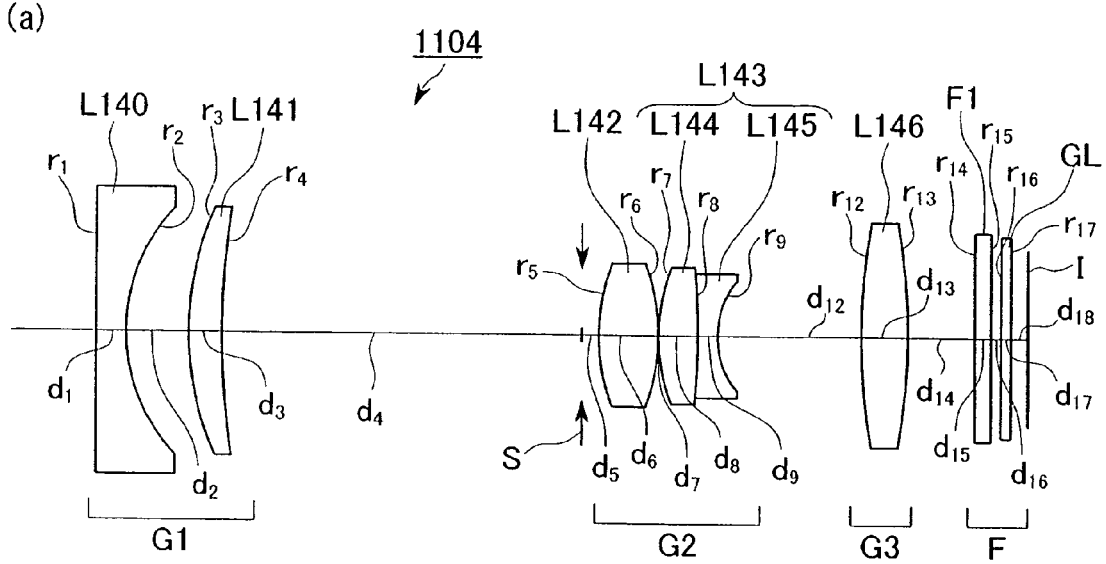
(b)
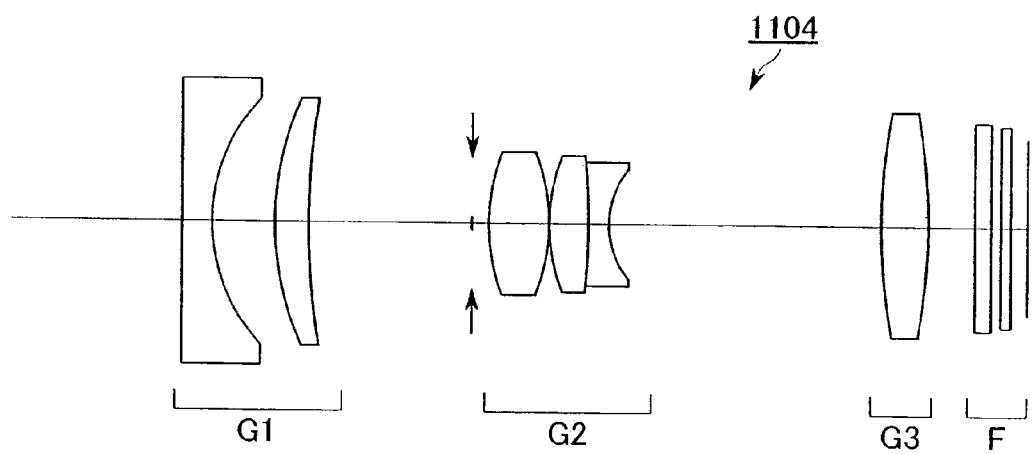
(c)
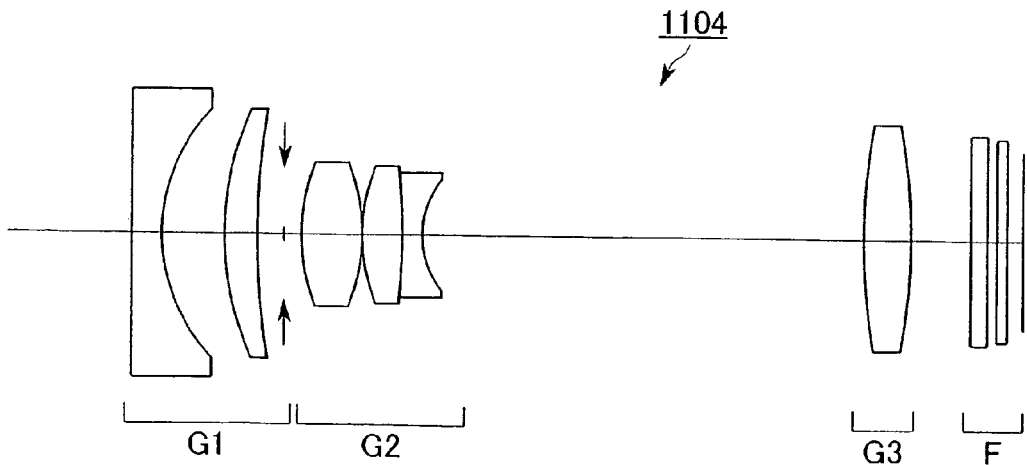

FIG.14
(a)
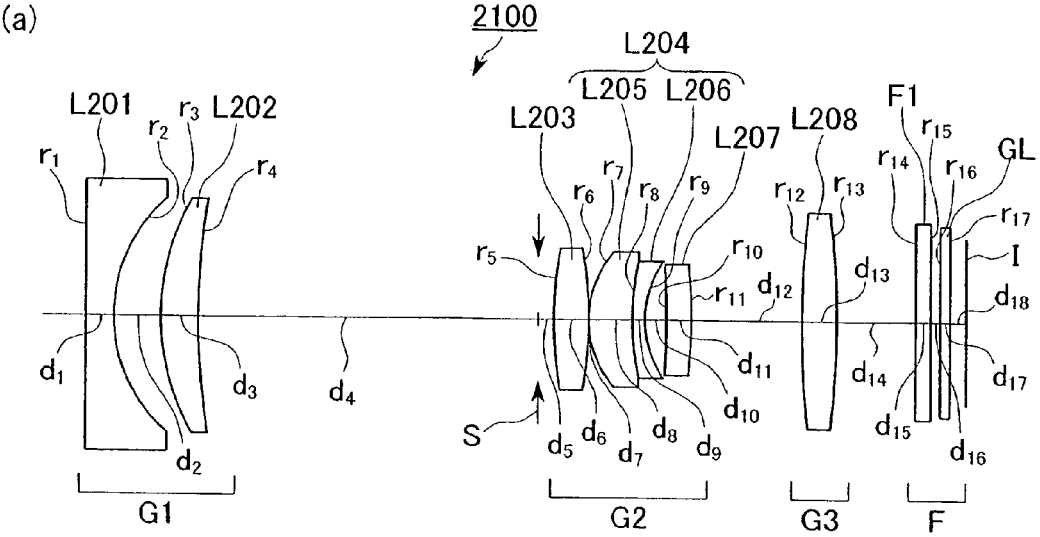
(b)
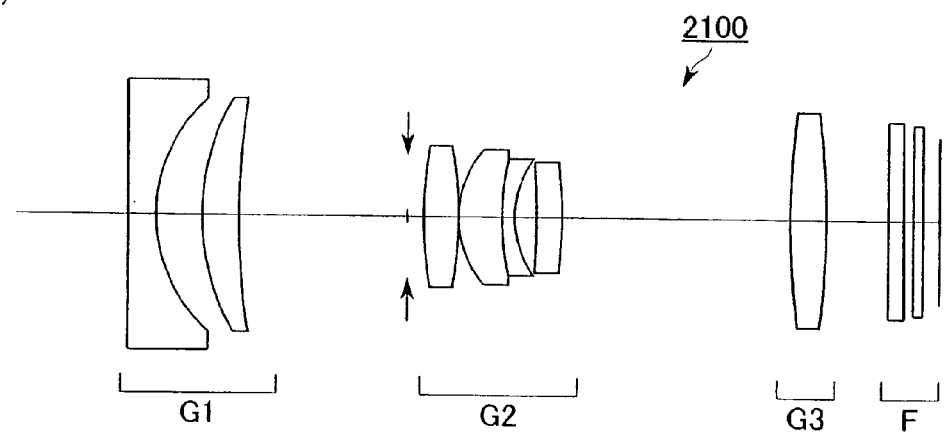
(c)
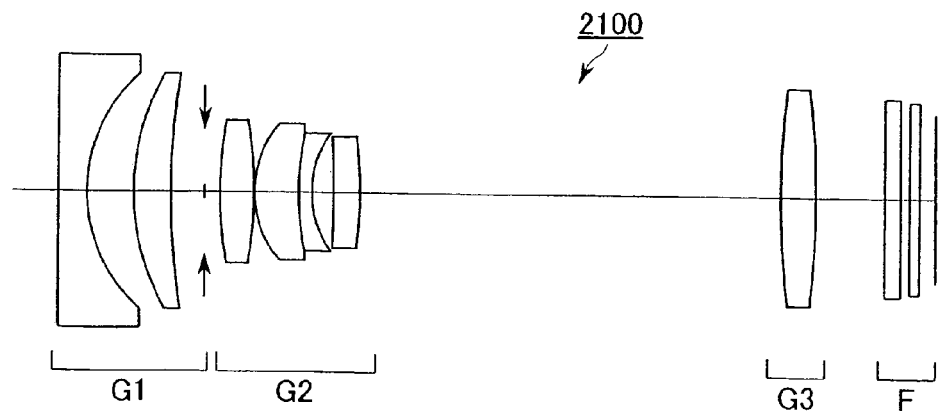

FIG.15
(a)
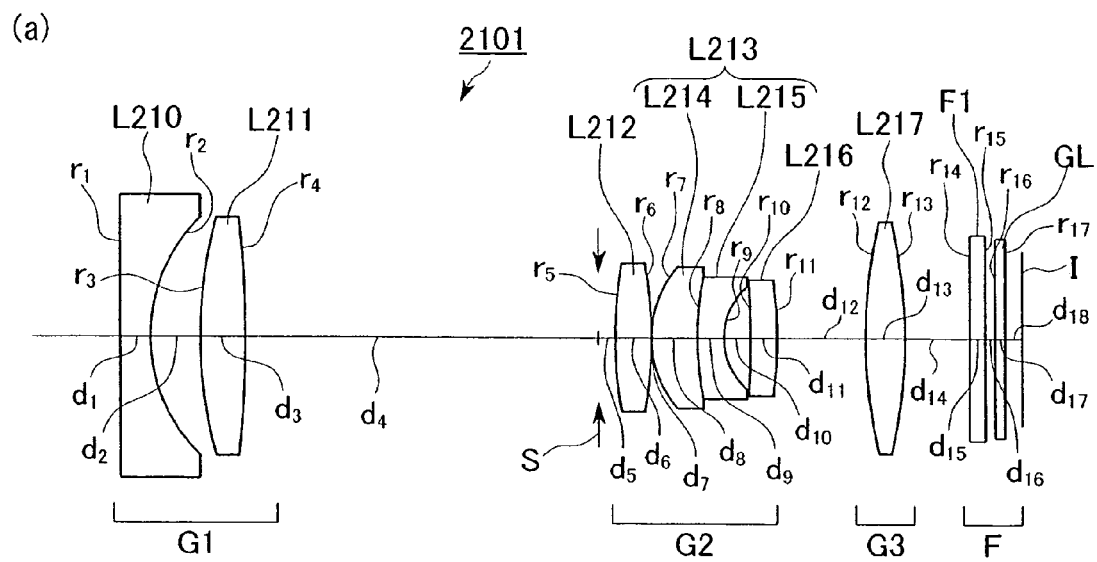
(b)
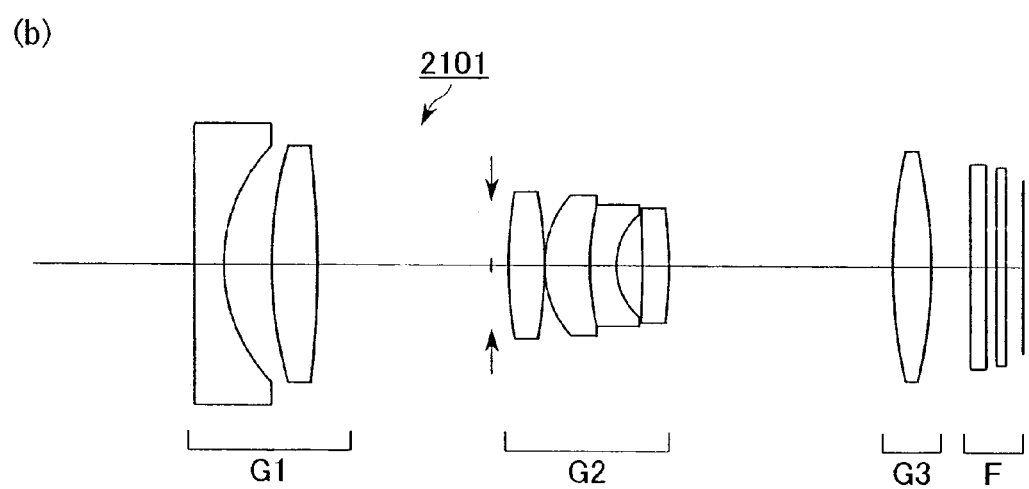
(c)
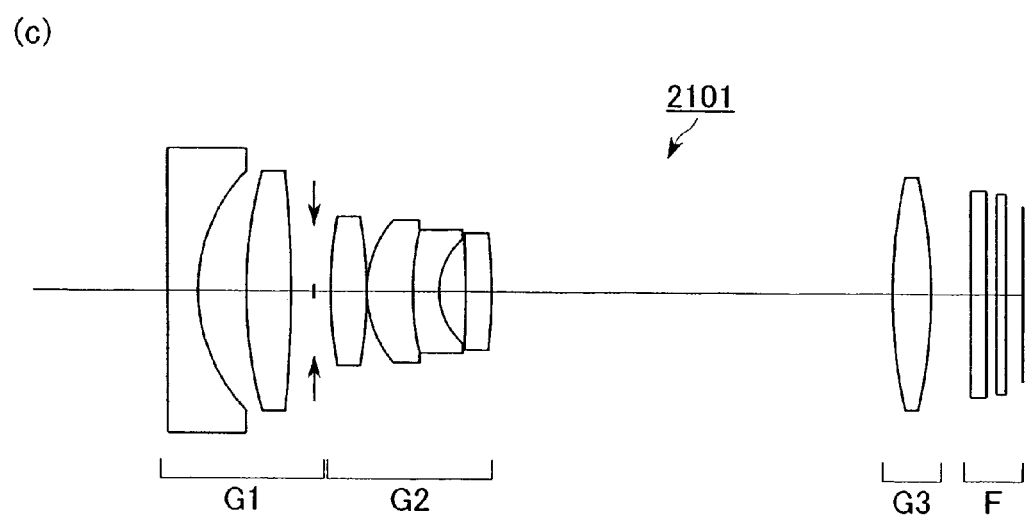

FIG.16
(a)
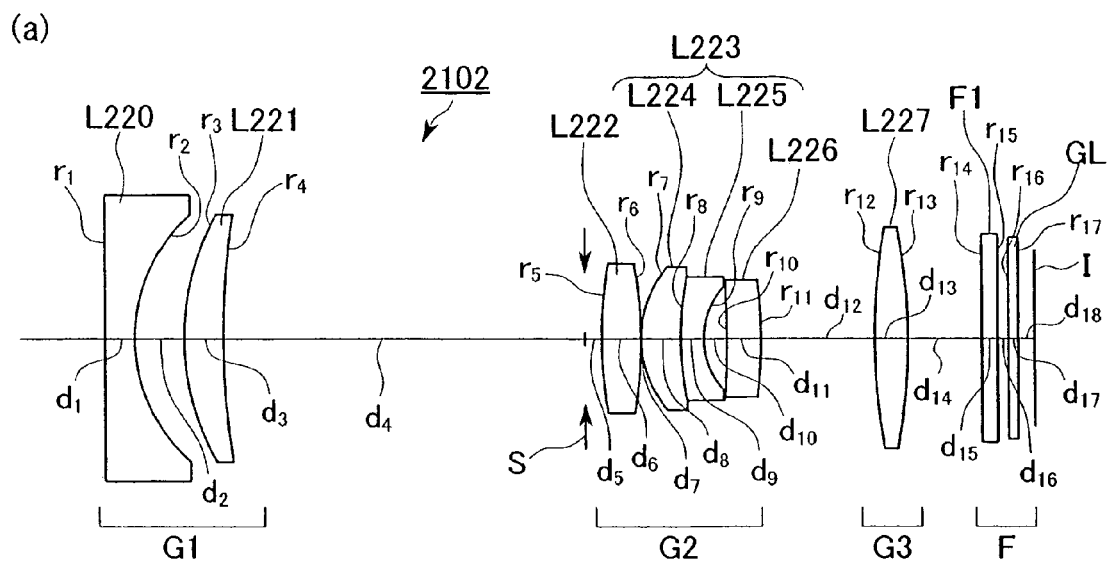
(b)
(c)
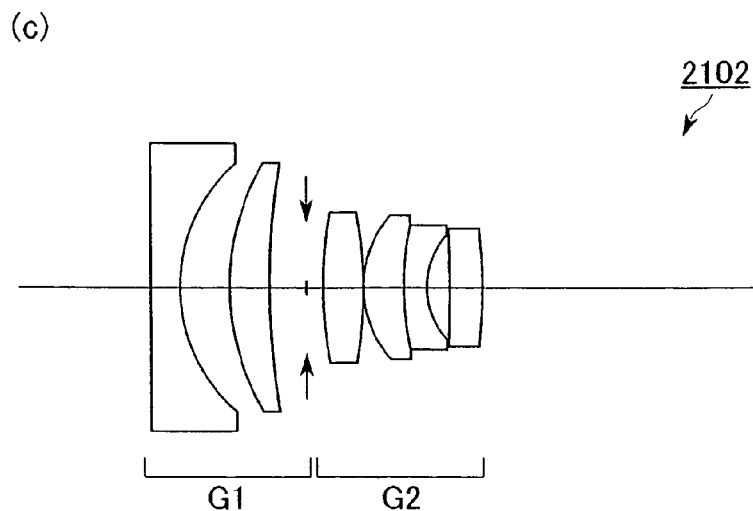

FIG.25
(a)
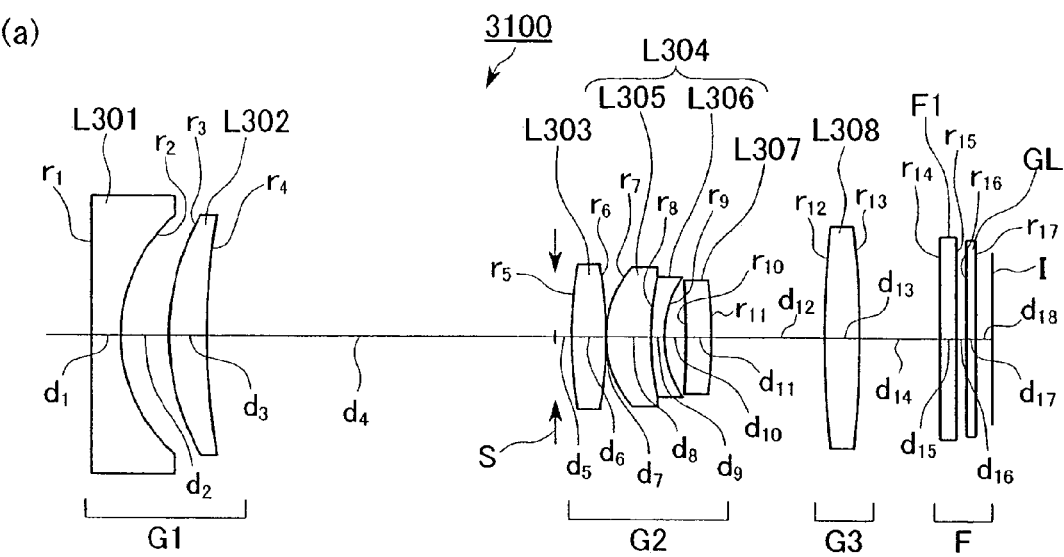
(b)
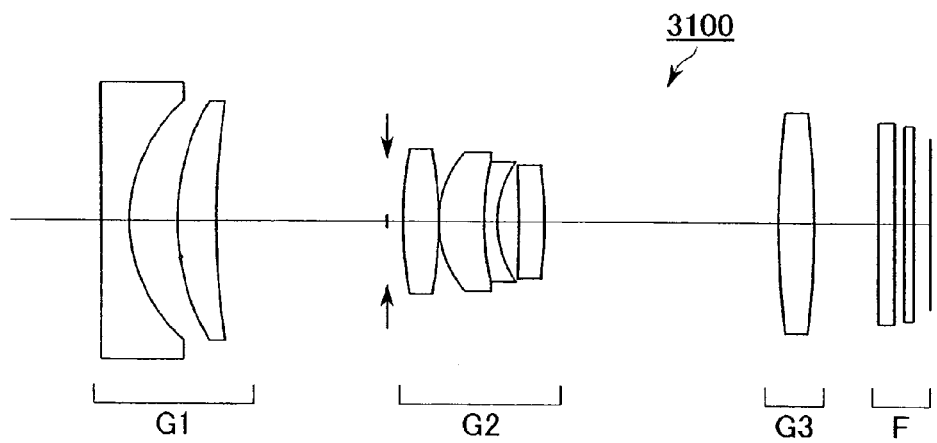
(c)
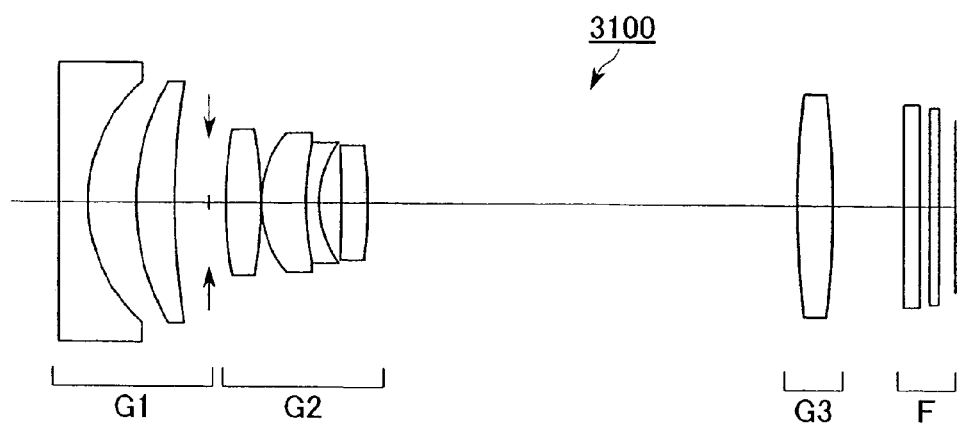

FIG.26
(a)
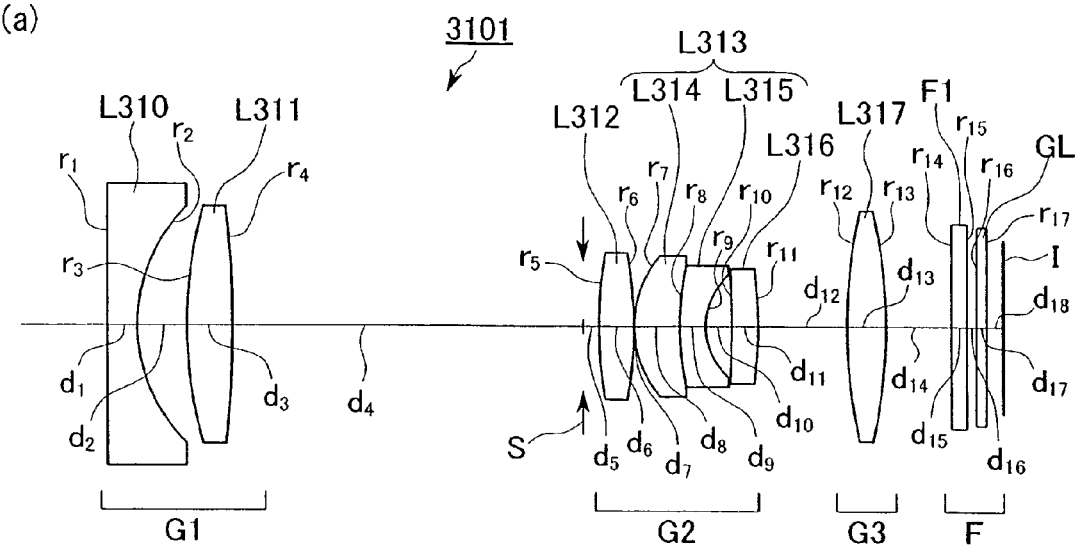
(b)
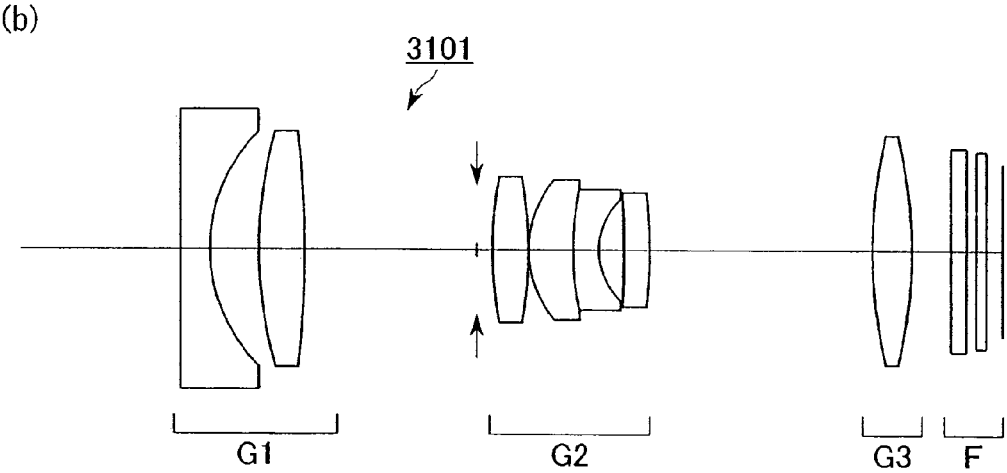
(c)
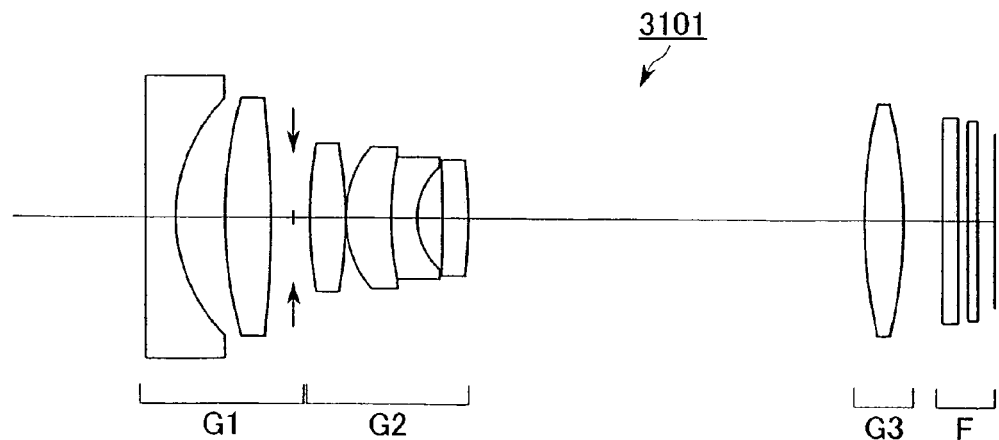

FIG.27
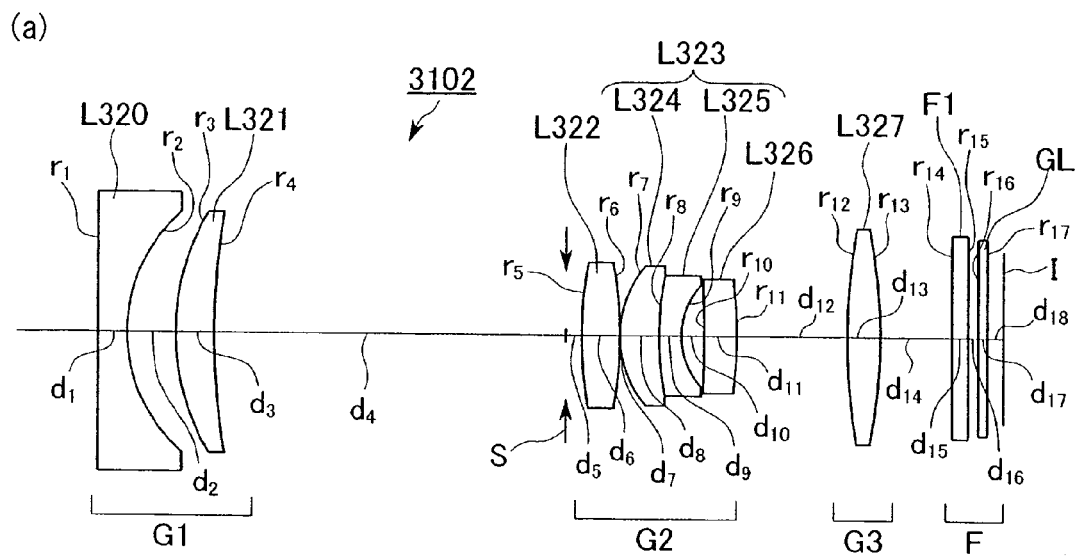
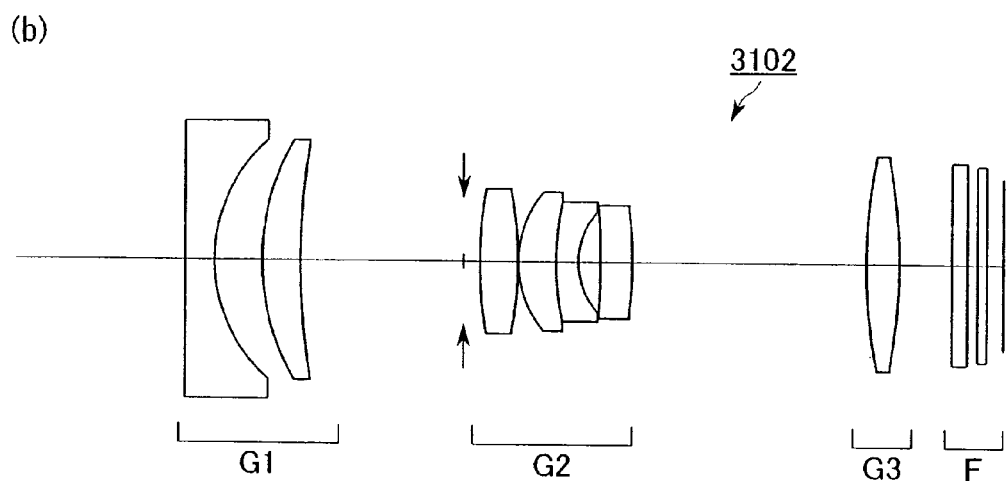
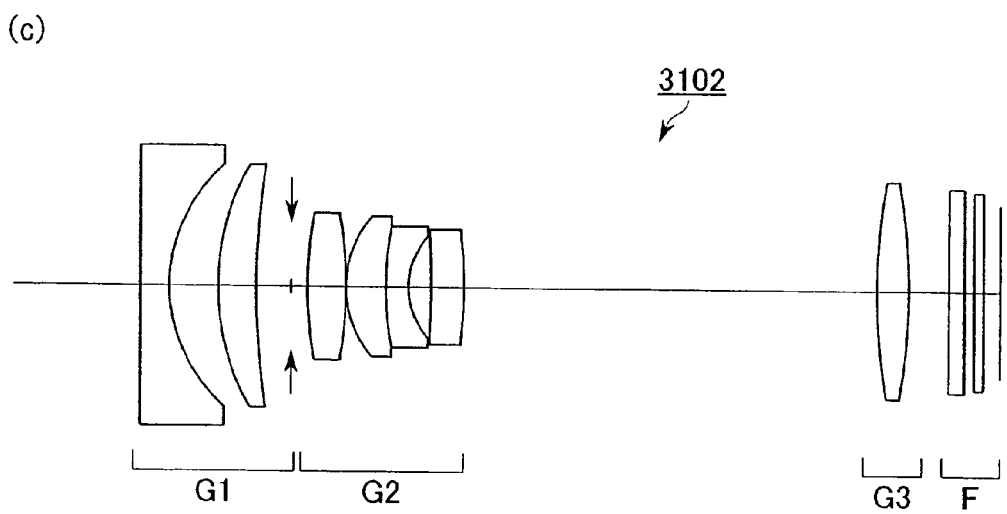

ZOOM LENS AND IMAGE PICKUP APPARATUS

BACKGROUND OF THE INVENTION

1. Field of the Invention

The present invention relates to a three-group zoom lens and an image pickup apparatus, for example, a three-group zoom lens that is suitable for an electronic image pickup apparatus, such as a digital camera, a video camera, or the like.

Priority is claimed on Japanese Patent Applications Nos. 2004-136908, 2004-136909, and 2004-136910, filed Apr. 30, 2004, the contents of which are incorporated herein by reference.

2. Description of Related Art

In recent years, digital cameras (electronic cameras) have received attention as the next generation of cameras, an alternative to silver-halide 35 mm-film cameras. Such digital cameras are broken down into several categories in a wide range from the high-end type for commercial use to the portable low-end type. In particular, cameras in the portable low-end type are desired to have high quality, such as having a low F number of about 2.8, a high zoom ratio of about 3, and a wide angle of view of about 60° while being thin.

The gravest bottleneck in diminishing the depth dimension of cameras is the thickness of an optical system, especially the zoom lens system from the surface located nearest to its object side to an image pickup plane. Recent technologies for slimming down cameras rely primarily on a collapsible lens mount that allows the optical system to be extended from a camera body for phototaking and be retracted thereto for carrying.

In order to achieve reduction in size and thickness, the reduction in the size of an image pickup element is required. For the reduced sized image pickup element to have the same number of pixels, the pitch between pixels should be reduced, and the resulting compromised sensitivity must be compensated by the optical system. In addition, diffraction may affect the sensitivity. Thus, an optical system having a smaller F number must be required.

Furthermore, to obtain a camera body to be thinner, it is effective to use the so-called rear focusing method for focusing in terms of the layout of the drive system rather than a method in which a front lens group is moved. Thus, an optical system that exhibits less fluctuation of aberration when the rear focusing method is employed must be selected.

For example, Japanese Unexamined Patent Application, First Publication No. 2002-372667 and Japanese Unexamined Patent Application, First Publication No. 2002-196240 disclose a negative lead type of zoom lens including three groups that has a low F number, a high zoom ratio of about 3, and a wide angle of view while being relatively compact.

Furthermore, Japanese Unexamined Patent Application, First Publication No. 2002-196240 and Japanese Unexamined Patent Application, First Publication No. 2003-222797 disclose a zoom lens that is suitable for used in the rear focusing method.

The above-described conventional zoom lenses have the following shortcomings.

In the techniques disclosed in Japanese Unexamined Patent Application, First Publication No. 2002-372667 and Japanese Unexamined Patent Application, First Publication No. 2002-196240, off-axis aberrations cannot be completely eliminated by the first lens group and the second lens group, and the remainder of the aberrations is eliminated by providing a lens having a large amount of asphericity to the third lens group. Therefore, fluctuation of aberration becomes significant when the third lens group is moved, and accordingly it is difficult to obtain a sufficient image forming capability stably from the object point at infinity to an object point in a close range. Thus, the techniques are not suitable for the rear focusing method.

In addition, the technique disclosed in Japanese Unexamined Patent Application, First Publication No. 2002-196240 and Japanese Unexamined Patent Application, First Publication No. 2003-222797, the shortest entire lens length in the wide-angle end or the telephoto end are large and the second lens group moves in a large amount upon varying magnifying power. Thus, the length of a lens-barrel portion that includes a cam mechanism for driving the second lens group is increased. Consequently, the overall length of the lenses is increased even when the lens is retracted, which may hinder size reduction.

SUMMARY OF THE INVENTION

The present invention was made in view of the above-mentioned background, and an object thereof is to provide a three-group zoom lens that includes fewer lenses while being compact, is suitable for the rear focusing method that enables reduction in size and simplification of the structure in terms of the layout of mechanism, as well as providing a stable image forming capability from at infinity to a close range.

In order to solve the above-described problem, a three-group zoom lens according to a first aspect of the present invention is a three-group zoom lens, including, in order from an object side thereof: a first lens group having a negative refractive power, including in order from the object side: a negative-power first lens; and a positive-power second lens, wherein the first lens group has no third lens, and the first lens group includes at least one aspherical surface, a second lens group having a positive refractive power, including in order from the object side thereof, a positive-power first lens; a positive-power second lens; and a negative-power third lens; wherein the positive-power second lens and the negative-power third lens are cemented together to form a meniscus-shaped cemented lens that faces a convex surface to the object side and the second lens group has aspherical surfaces on at least two surfaces other than a cemented surface of the cemented lens; and a third lens group having a positive refractive power, including: a positive single lens having two spherical surfaces on the two sides, wherein the third lens group has no second lens, wherein the first lens group moves to the object side after moving to an image side, the second lens group moves only to the object side, and the third lens group moves in an amount different from that of the second lens group upon focusing an object point at infinity from the wide-angle end to the telephoto end, and the third lens group is configured to be movable for focusing, wherein and the following conditional formula are satisfied:

$$2.3 < L_t/f_2 < 3.7 \tag{1-1}$$

$$1.15 < |f_1/f_2| < 2.0 \tag{1-2}$$

where $L_t$ is a distance between a lens surface that is closest to the object side of the three-group zoom lens and the image plane at the telephoto end, $f_2$ is a focal length of the second lens group, and $f_1$ is a focal length of the first lens group.

In order to solve the above-described problem, a three-group zoom lens according to a second aspect of the present invention is a three-group zoom lens including, in order from an object side thereof: a first lens group having a negative refractive power, including in order from the object side: a negative-power first lens; and a positive-power second lens, wherein the first lens group has no third lens, and the first lens group includes at least one aspherical surface, a second lens group having a positive refractive power, including in order from the object side thereof, a positive-power first lens; a positive-power second lens; a negative-power third lens; and a fourth lens that is made of a single lens having a convex surface on an image side, wherein the positive-power second lens and the negative-power third lens are cemented together to form a meniscus-shaped cemented lens that faces a convex surface to the object side and the second lens group has aspherical surfaces on at least two surfaces other than a cemented surface of the cemented lens; and a third lens group having a positive refractive power, including: a positive single lens wherein the third lens group has no second lens, wherein the first lens group moves to the object side after moving to the image side, the second lens group moves only to the object side, and the third lens group moves in an amount different from that of the second lens group upon focusing an object point at infinity from the wide-angle end to the telephoto end, and the third lens group is configured to be movable for focusing, and the following conditional formulae are satisfied:

$$2.3 < L_t/f_2 < 3.7 \quad (2\text{-}1)$$

$$0.29 < f_W/f_3 < 0.6 \quad (2\text{-}2)$$

$$0.4 < f_2/R_{2C} < 1.4 \quad (2\text{-}3)$$

where $L_t$ is a distance between a lens surface that is closest to the object side of the three-group zoom lens and the image plane at the telephoto end, f2 is a focal length of the second lens group, $f_W$ is a focal length of the entire three-group zoom lens in the wide-angle end, $f_3$ is a focal length of the third lens group, and $R_{2C}$ is a paraxial radius of curvature of the cemented surface of the cemented lens in the second lens group.

In order to solve the above-described problem, a three-group zoom lens according to a third aspect of the present invention is a three-group zoom lens, including, in order from an object side thereof: a first lens group having a negative refractive power, including in order from the object side: a negative-power first lens; and a positive-power second lens, wherein the first lens group has no third lens, and the first lens group includes at least one aspherical surface, a second lens group having a positive refractive power, including in order from the object side thereof, a positive-power first lens; a positive-power second lens; a negative-power third lens; and a fourth lens that is made of a single lens having a convex surface on an image side, wherein the positive-power second lens and the negative-power third lens are cemented together to form a meniscus-shaped cemented lens that faces a convex surface to the object side and the second lens group has aspherical surfaces on at least two surfaces other than a cemented surface of the cemented lens; and a third lens group having a positive refractive power, including: a positive single lens wherein the third lens groups has no second lens, wherein the first lens group moves to the object side after moving to the image side, the second lens group moves only to the object side, and the third lens group moves in an amount different from that of the second lens group upon focusing an object point at infinity from the wide-angle end to the telephoto end, and the third lens group is configured to be movable for focusing, and the following conditional formulae are satisfied:

$$2.3 < L_t/f_2 < 3.7 \quad (3\text{-}1)$$

$$-2.5 < (R_{13}+R_{14})/(R_{13}-R_{14}) < -0.4 \quad (3\text{-}2)$$

$$0.65 < T_1/T_2 < 1 \quad (3\text{-}3)$$

where $L_t$ is a distance between a lens surface that is closest to the object side of the three-group zoom lens and the image plane at the telephoto end, $f_2$ is a focal length of the second lens group, $R_{13}$ is a radius of curvature of the object side surface of the positive-power second lens in the first lens group, $R_{14}$ is a radius of curvature of the image side surface of the positive-power second lens in the first lens group, $T_1$ is a distance along the optical axis from a surface that is closest to the object side to a surface closest to the image side of the first lens group, and $T_2$ is a distance along the optical axis a surface that is closest to the object side to a surface closest to the image side of the second lens group.

BRIEF DESCRIPTION OF THE DRAWINGS

FIG. 1 is a cross-sectional view of a first example of the zoom lens according to the first embodiment of the first aspect of the present invention in the wide-angle end, the middle focal length position, and the telephoto end respectively, when the zoom lens is focused on an object point at infinity;

FIG. 2 is a cross-sectional view of a second example of the zoom lens in the wide-angle end, the middle focal length position, and the telephoto end respectively, when the zoom lens is focused on an object point at infinity, similar to FIG. 1;

FIG. 3 is a cross-sectional view of a third exemplary zoom lens in the wide-angle end, the middle focal length position, and the telephoto end respectively, when the zoom lens is focused on an object point at infinity, similar to FIG. 1;

FIG. 4 is a cross-sectional view of a fourth example of the zoom lens in the wide-angle end, the middle focal length position, and the telephoto end respectively, when the zoom lens is focused on an object point at infinity, similar to FIG. 1;

FIG. 5 is a cross-sectional view of a fifth example of the zoom lens in the wide-angle end, the middle focal length position, and the telephoto end respectively, when the zoom lens is focused on an object point at infinity, similar to FIG. 1;

FIG. 14 is a cross-sectional view of a first example of the zoom lens according to the first embodiment of the second aspect of the present invention in the wide-angle end, the middle focal length position, and the telephoto end respectively, when the zoom lens is focused on an object point at infinity;

FIG. 15 is a cross-sectional view of a second example of the zoom lens in the wide-angle end, the middle focal length position, and the telephoto end respectively, when the zoom lens is focused on an object point at infinity, similar to FIG. 14;

FIG. 16 is a cross-sectional view of a third exemplary zoom lens in the wide-angle end, the middle focal length position, and the telephoto end respectively, when the zoom lens is focused on an object point at infinity, similar to FIG. 14;

FIG. 25 is a cross-sectional view of a first example of the zoom lens according to the first embodiment of the third aspect of the present invention in the wide-angle end, the middle focal length position, and the telephoto end respectively, when the zoom lens is focused on an object point at infinity;

FIG. 26 is a cross-sectional view of a second example of the zoom lens in the wide-angle end, the middle focal length position, and the telephoto end respectively, when the zoom lens is focused on an object point at infinity, similar to FIG. 25;

FIG. 27 is a cross-sectional view of a third exemplary zoom lens in the wide-angle end, the middle focal length position, and the telephoto end respectively, when the zoom lens is focused on an object point at infinity, similar to FIG. 25;

DETAILED DESCRIPTION OF THE INVENTION

First Aspect

Figure 6:
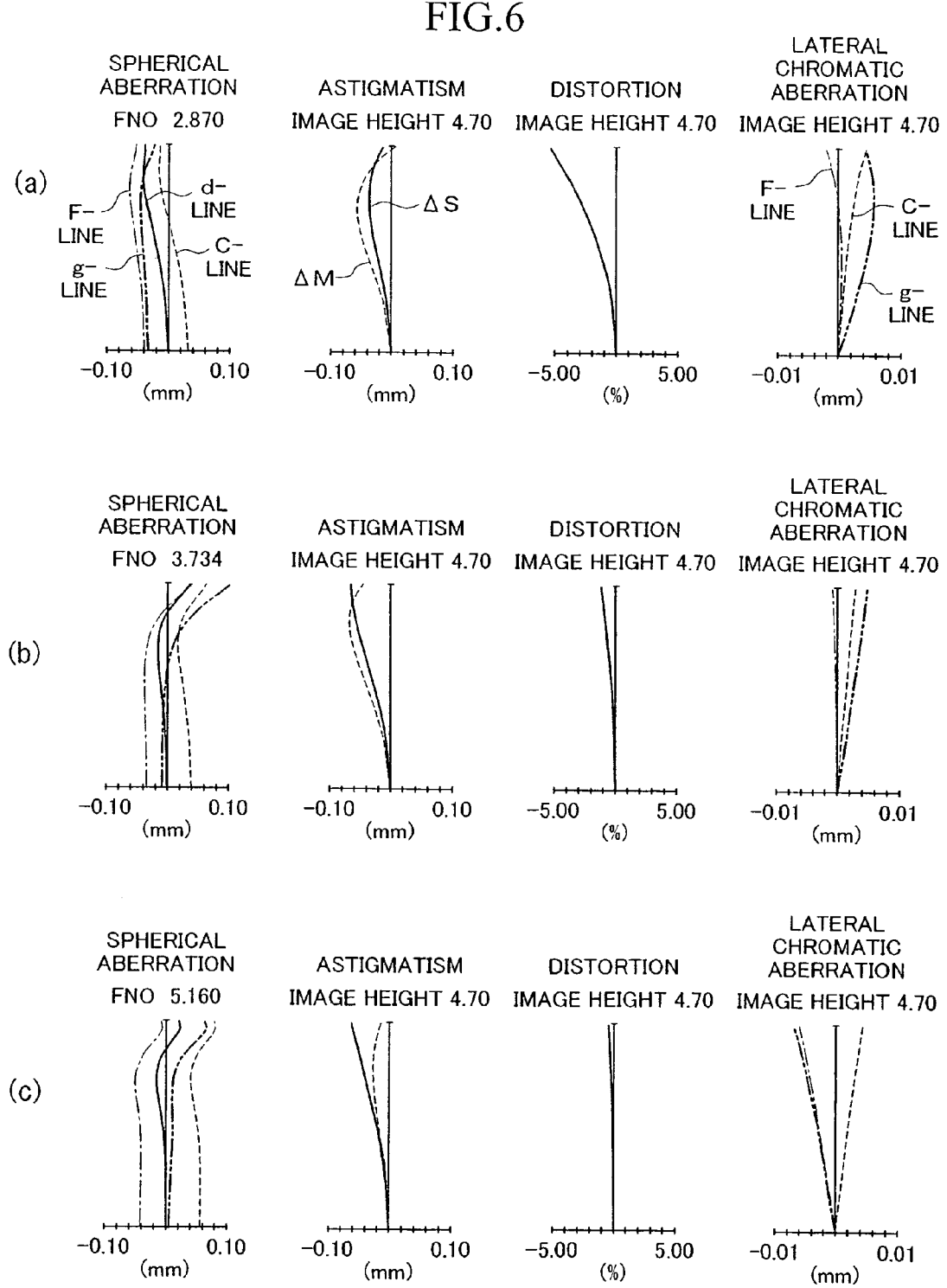
FIG. 6 is aberration curves of Example 1-1 in the wide-angle end, the middle focal length position, and the telephoto end.
Figure 7:
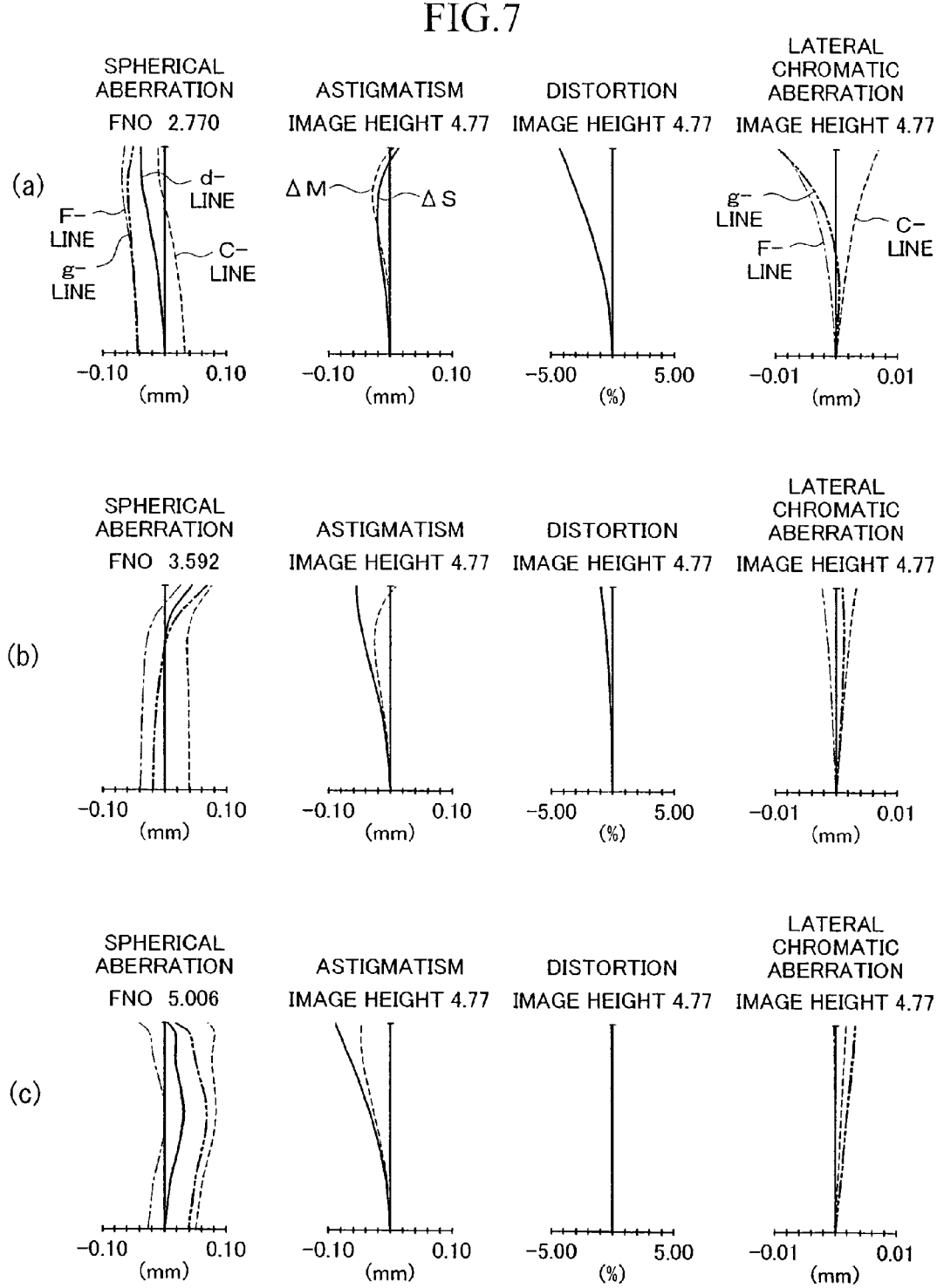
FIG. 7 is aberration curves of Example 1-2 in the wide-angle end, the middle focal length position, and the telephoto end.

Before describing various embodiments of the first aspect of the present invention, the operation of the first aspect of the present invention will be described with reference to examples.

A zoom lens according to the first aspect of the present invention have three-lens groups construction including a first lens group having a negative refractive power, a second lens group having a positive refractive power, and a third lens group having a positive refractive power in order from an object side thereof. Thus, the zoom lens exhibits an excellent telecentricity, and light beams can be effectively introduced into an image pickup element such as a charge-coupled device (CCD), for example. Furthermore, since it is possible to ensure a long back focus, space for installing parts, such as an optical low-pass filter or an infrared blocking filter, can be saved.

In addition, upon varying magnifying power from the wide-angle end to the telephoto end, the first lens group moves to the object side after moving to the image side, the second lens group moves only to the object side, whereas the third lens group moves in an amount different from that of the second lens group. Thus, it is possible to reduce the total length of the system while maintaining an appropriate exit pupil.

Furthermore, the third lens group is configured to being movable and is used for focusing. With such a rear focusing method by means of the third lens group, the load to the drive motor can be reduced since the movable lens group has a lower weight than a focusing by means of the first lens group. In addition, the total length can be maintained to be short, and the diameter of the lens barrel can be maintained small since the drive motor can be accommodated in the lens barrel. Thus, such a system is advantageous since it allows a compact layout.

When the third lens group is configured to be movable upon varying magnifying power, or the focusing is done by means of the third lens group, fluctuation of aberration becomes problematic. If more asphericity than necessary is included in the third lens group, astigmatism that remains in the first lens group and the second lens group is required to be corrected by the third lens group in order for the lens configuration to be effective. In this case, moving the third lens group for focusing or the like is undesirable since the balance for the correction of aberration is lost.

In the zoom lens according to the first aspect of the present invention, all of lens surfaces of the third lens group are made of spherical surfaces rather than aspherical surfaces. Thus, the total thickness of the lens unit upon being collapsed can be reduced, and fluctuation of aberration can be suppressed even when focusing is done by means of the third lens group.

However, the lens surfaces of the third lens group made of only spherical surfaces places a significant burden on correction of astigmatism or the like. Accordingly, it is desirable to cut astigmatism almost completely by the first lens group and the second lens group in the entire range of zooming. In order to reduce variation in off-axial aberrations, such as astigmatism, the capability for correcting aberration of the second lens group is especially important.

For the above-described reasons, in the zoom lens according to the first aspect of the present invention, the second lens group includes a positive-power first lens, a positive-power second lens, and a negative-power third lens in order from the object side thereof, and the positive-power second lens and the negative-power third lens are cemented together to form a meniscus-shaped cemented lens that faces a convex surface to the object side and the second lens group has aspherical surfaces on at least two surfaces other than the cemented surface of the cemented lens.

Such a structure can effectively correct astigmatism that is generated in the third lens group, thereby enhancing image forming capability. In particular, since the aspherical surfaces are provided to at least two surfaces, correction of aberration can be performed effectively.

In this case, since the aspherical surfaces on the at least two surfaces are provided to lens surfaces other than the cemented surface of the cemented lens, the cemented lens can be easily manufactured.

Furthermore, the aspherical surfaces on the at least two surfaces are preferably provided to the two sides of the positive-power first lens in the second lens group. This provides great benefits: correction of spherical aberration, reduction in the relative decentration sensitivity within the group, reduction in the manufacturing cost.

Furthermore, since the negative-power third lens in the second lens group cancels spherical aberration and coma aberration generated in the positive-power second lens, this configuration can minimize aberrations generated in the second lens group. The positive-power second lens that has a lens surface for canceling spherical aberration and coma aberration is cemented with the negative-power third lens that is a main lens, generation of aberration due to relative eccentricity can be inhibited.

In this case, decentration sensitivity is preferably reduced by canceling aberration in the cemented lens. This can reduce relative decentration sensitivity with the positive-power first lens in the second lens group.

In such a lens configuration, if the at least two aspherical surfaces provide a sufficient image forming capability, the second lens group may be made of the positive-power first lens, and the positive-power second lens and the negative-power third lens forming a meniscus-shaped cemented lens that faces the convex surface to the object side. In this case, an inexpensive configuration having a reduced number of lenses may be provided.

Furthermore, the zoom lens according to the first aspect of the present invention satisfies the conditional formula (1-1) described above. The conditional formula (1-1) defines a preferable condition by defining the range of $L_t/f_2$.

If $L_t/f_2$ exceeds the upper limit defined in the conditional formula (1-1), the total length becomes too long, in which reduction in size is impossible. In contrast, if the $L_t/f_2$ is less than the lower limit, the power of the second lens group becomes too weak, and consequently zooming action of the second lens group is degraded, requiring more movement to vary magnifying power. This, too, hinders reduction in size.

The lower limit value in the conditional formula (1-1) is preferably 2.5, and more preferably is 2.7. The upper limit value is preferably 3.5, and more preferably is 3.3.

For example, preferably the following conditional formula (1-1a) should be satisfied, and more preferably the following conditional formula (1-1b) should be satisfied:

$$2.5 < L_t/f_2 < 3.5 \tag{1-1a}$$

$$2.7 < L_t/f_2 < 3.3 \tag{1-1b}$$

The zoom lens according to the first aspect of the present invention also satisfies the conditional formula (1-2).

If $|f_1/f_2|$ exceeds the upper limit defined in the conditional formula (1-2), the power of the second lens group becomes too high. Thus, a telecentricity may be difficult to be ensured, and shading tends to occur at the corners of the picture. If the lower limit is not reached, the power of the second lens group becomes too weak, and consequently zooming action of the second lens group is degraded, requiring more movement to vary magnifying power. This causes an increase in the size of the overall lens system.

The lower limit value in the conditional formula (1-2) is preferably 1.2, and more preferably is 1.25. The upper limit value is preferably 1.75, and more preferably is 1.5.

For example, preferably the following conditional formula (1-2a) should be satisfied, and more preferably the following conditional formula (1-2b) should be satisfied:

$$1.2 < |f_1/f_2| < 1.75 \tag{1-2a}$$

$$1.25 < |f_1/f_2| < 1.5 \tag{1-2b}$$

In the zoom lens according to the first aspect of the present invention, a positive-power fourth lens is preferably provided in the image side of the cemented lens in the second lens group.

In this case, since the positive-power fourth lens scatters the positive power within the second lens group, relative decentration sensitivity within the second lens group can be further reduced. The fourth lens in the second lens group may be a powerless lens or a negative-power lens for the purpose of correction of aberration.

Furthermore, when a positive-power fourth lens is provided in the second lens group, the positive-power fourth lens is preferably a single lens having a convex surface at the image side.

In this case, by directing the convex surface to the image side, deterioration of performance can be reduced when the positive-power fourth lens in the second lens group is decentered. Furthermore, this is advantageous for the size reduction since mechanical interference between mechanical members that are placed behind the second lens group can be avoided upon being collapsed.

When a positive-power fourth lens is provided in the second lens group, the image side of the positive-power fourth lens is preferably an aspherical surface. This may be effective for correction of aberration. In particular, in order to correct astigmatism and distortion generated in the first lens group, it is effective to provide the aspherical surface on a surface in which the chief ray height becomes high behind the stop.

Since providing an aspherical surface to a lens surfaces of the third lens group is provided undesirable for rear focusing as described previously, the aspherical surface is preferably provided to a surface of the second lens group that is closest to the image side.

It should be noted that the fourth lens in the second lens group may be a glass lens or a plastic lens. Alternatively, it may be a compound aspherical lens in which an aspherical resin is provided on a spherical surface made of glass.

In the zoom lens according to the first aspect of the present invention, the cemented lens in the second lens group preferably satisfies the following conditional formulae (1-5) and (1-6):

$$0.3 < R_{23R}/R_{22F} < 1.0 \quad (1\text{-}5)$$

$$-0.4 < f_2/R_{23F} < 1.4 \quad (1\text{-}6)$$

where $f_2$ is the focal length of the second lens group, $R_{22F}$ is the radius of curvature in the vicinity of the optical axis of the object side surface of the positive-power second lens in the second lens group, $R_{23R}$ is the radius of curvature in the vicinity of the optical axis of the surface that is closest to the image side of the negative-power third lens in the second lens group, $R_{23F}$ is the radius of curvature in the vicinity of the optical axis of the cemented surface of the cemented lens in the second lens group.

The conditional formula (1-5) defines a range of a preferable shape of the cemented lens in the second lens group by the value of $R_{23R}/R_{22F}$.

If $R_{23R}/R_{22F}$ exceeds the upper limit defined by the conditional formula (1-5), correction of spherical aberration, coma aberration, and astigmatism within the group cannot be achieved sufficiently and the effect of reduction in decentration sensitivity achieved by the cementing is reduced. If the lower limit is not reached, spherical aberration, coma aberration, and astigmatism within the group is corrected and decentration sensitivity is reduced. However, the power of the second lens group is increased, which tends to hinder size reduction.

The lower limit value in the conditional formula (1-5) is preferably 0.4, and more preferably is 0.45. The upper limit value is preferably 0.95, and is more preferably 0.9.

For example, preferably the following conditional formula (1-5a) should be satisfied, and more preferably the following conditional formula (1-5b) should be satisfied:

$$0.4 < R_{23R}/R_{22F} < 0.95 \quad (1\text{-}5a)$$

$$0.45 < R_{23R}/R_{22F} < 0.9 \quad (1\text{-}5b)$$

The conditional formula (1-6) defines a range of a preferable shape of the cemented lens with respect to the focal length of the second lens group by the value of $f_2/R_{23F}$.

If $f_2/R_{23F}$ exceeds the upper limit defined in the conditional formula (1-6), correction of axial chromatic aberration and chromatic deference of magnification tends to be insufficient. If the lower limit is not reached, the thickness on the optical axis is increased to ensure a sufficient thickness of the periphery of positive-power second lens in cemented lens is increased, which is undesirable.

The lower limit value in the conditional formula (1-6) is preferably 0.4, and is more preferably 0.5. The upper limit value is preferably 1.2, and is more preferably 1.0.

For example, preferably the following conditional formula (1-6a) should be satisfied, and more preferably the following conditional formula (1-6b) should be satisfied.

$$0.4 < f_2/R_{23F} < 1.2 \quad (1\text{-}6a)$$

$$0.5 < f_2/R_{23F} < 1.0 \quad (1\text{-}6b)$$

In the zoom lens according to the first aspect of the present invention, the negative-power third lens in the second lens group preferably satisfies the following conditional formula (1-7):

$$1.0 < |f_2/f_{23}| < 3.0 \quad (1\text{-}7)$$

where $f_2$ is the focal length of the second lens group, and $f_{23}$ is the focal length of the negative-power third lens in the second lens group.

The conditional formula (1-7) defines a preferable range of the ratio of the focal length of the negative-power third lens in the second lens group to the focal length of the second lens group by the value of $|f_2/f_{23}|$.

If $|f_2/f_{23}|$ exceeds the upper limit defined in the conditional formula (1-7), correction of astigmatism becomes difficult although the total length can be reduced since the principal point of the second lens group shifts closer to the object side. If the lower limit is not reached, the principal point of the second lens group shifts closer to the image side and the power of the second lens group cannot be reduced. Thus, the amount of movement and the size of the first lens group tend to be increased. Furthermore, useless space tends to be defined behind the second lens group when in use, which may increase the total length. This may render the mechanical structure of the lens barrel to become complex or huge. Or the total length of the lens cannot be reduced upon collapsed.

The lower limit value in the conditional formula (1-7) is preferably 1.3, and is more preferably 1.6. The upper limit value is preferably 2.5, and is more preferably 2.0.

For example, preferably the following conditional formula (1-7a) should be satisfied, and more preferably the following conditional formula (1-7b) should be satisfied.

$$1.3 < |f_2/f_{23}| < 2.5 \quad (1\text{-}7a)$$

$$1.6 < |f_2/f_{23}| < 2.0 \quad (1\text{-}7b)$$

In the zoom lens according to the first aspect of the present invention, the amount of movement of the second lens group upon varying magnifying power preferably satisfies the following conditional formula (1-4):

$$0.4 < |X_2/f_1| < 1.0 \quad (1\text{-}4)$$

where $X_2$ is an amount of movement of the second lens group upon varying magnifying power from the wide-angle end to the telephoto end, and $f_1$ is the focal length of the first lens group.

The conditional formula (1-4) defines a preferable range of the amount of movement of the second lens group by the value of $|X_2/f_1|$.

If $|X_2/f_1|$ exceeds the upper limit defined in the conditional formula (1-4), a mechanical mechanism for moving the second lens group becomes too large since the amount of movement of the second lens group is increased, which makes reduction in the total length of the lens upon collapsed difficult. If the power of the first lens group becomes too high exceeding the lower limit, off-axial astigmatism and coma aberration in the wide-angle end is significant, making correction of such aberrations difficult.

The lower limit value in the conditional formula (1-5) is preferably 0.5, and is more preferably 0.6. The upper limit value is preferably 0.9, and is more preferably 0.85.

For example, preferably the following conditional formula (1-4a) should be satisfied, and more preferably the following conditional formula (1-4b) should be satisfied:

$$0.5 < |X_2/f_1| < 0.9 \quad (1\text{-}4a)$$

$$0.6 < |X_2/f_1| < 0.85 \quad (1\text{-}4b)$$

In addition, in the zoom lens according to the first aspect of the present invention, the first lens group includes a negative-power first lens and a positive-power second lens in order from an object side thereof, and has at least one aspherical surface.

Since the first lens group includes two lenses having at least one aspherical surface, chromatic aberration and each off-axial aberration can be effectively corrected, and the reduction of the thickness of the zoom lens can be realized.

In the zoom lens according to the first aspect of the present invention, a glass material having a refractive index of 1.75 or higher for the d-line (having a wavelength of 587.56 nm) is preferably used for the negative-power first lens in the first lens group. This provides an excellent refractive power without increasing the curvature, thereby minimizing generation of various off-axial aberrations.

Furthermore, in the zoom lens according to the first aspect of the present invention, the negative-power first lens in the first lens group preferably has a concave surface having a larger curvature on the image side than that of the object side surface, and the concave surface on the image side includes an aspherical surface. This can effectively correct distortion and curvature of field especially in the wide-angle end. This lens may be an aspherical lens formed by the glass molding, or a compound aspherical lens in which an aspherical resin is formed on a spherical surface made of glass.

In the zoom lens according to the first aspect of the present invention, a glass material having a refractive index of 1.85 or higher for d-line (having a wavelength of 587.56 nm) is preferably used for the positive-power second lens in the first lens group. Generation of various off-axial aberrations can be minimized for the same reason as the negative-power first lens. In this case, it is preferable to use a glass material having a refractive index of 1.90 or higher for d-line.

In the zoom lens according to the first aspect of the present invention, the positive-power second lens in the first lens group preferably satisfies the following conditional formula (1-8):

$$-2.5 < (R_{13}+R_{14})/(R_{13}-R_{14}) < -0.4 \quad (1\text{-}8)$$

where $R_{13}$ is the radius of curvature of the object side surface of the positive-power second lens in the first lens group, $R_{14}$ is the radius of curvature of the image side surface of the positive-power second lens in the first lens group.

The conditional formula (1-8) defines a preferable shape of the positive-power second lens in the first lens group by the value of $(R_{13}+R_{14})/(R_{13}-R_{14})$.

If $(R_{13}+R_{14})/(R_{13}-R_{14})$ exceeds the upper limit defined in the conditional formula (1-8), it may be disadvantageous in terms of correction of distortion. If the lower limit is not reached, it may be disadvantageous in terms of correction of astigmatism. Furthermore, it is disadvantageous for reduction in the size since more space from the second lens group is required in order to avoid any mechanical interference upon varying magnifying power.

The lower limit value in the conditional formula (1-8) is preferably −2.4, and is more preferably −2.3. The upper limit value is preferably −0.45, and is more preferably −0.5.

For example, preferably the following conditional formula (1-8a) should be satisfied, and more preferably the following conditional formula (1-8b) should be satisfied.

$$-2.4 < (R_{13}+R_{14})/(R_{13}-R_{14}) < -0.45 \quad (1\text{-}8a)$$

$$-2.3 < (R_{13}+R_{14})/(R_{13}-R_{14}) < -0.5 \quad (1\text{-}8b)$$

In the zoom lens according to the first aspect of the present invention, the positive-power second lens in the first lens group preferably has aspherical surfaces on the two sides.

In this case, it is more preferable to provide the object side surface with an aspherical shape in which the positive refractive power is higher at the outer periphery portion of the lens. By this, the outer diameter of the negative-power first lens in the first lens group can be reduced, and distortion and astigmatism in the wide-angle end can be effectively corrected. For the same reason, it is more preferable to provide the image side surface with an aspherical shape in which the positive refractive power is higher at the outer periphery portion of the lens.

Furthermore, the aspherical shape preferably satisfies the following conditional formula (1-9):

$$0.01 < (A_{sp12F} - A_{sp12R})/f_W < 0.05 \quad (1\text{-}9)$$

where $A_{sp12F}$ and $A_{sp12R}$ are amounts of displacement of surface with respect to a datum spherical surface having paraxial radius of curvature of the aspherical surfaces at effective diameters of aspherical surfaces of the object side and the image side in the positive-power second lens in the first lens group, respectively, and $f_W$ is the focal length of the entire zoom lens in the wide-angle end.

The conditional formula (1-9) defines a more preferable aspherical shape by the value of $(A_{sp12F}-A_{sp12R})/f_W$.

If the amount of asphericity increases, with $(A_{sp12F}-A_{sp12R})/f_W$ exceeding the upper limit defined in the conditional formula (1-9), correction of off-axial coma aberration is difficult. If the lower limit is not reached, the negative distortion cannot be corrected sufficiently, and off-axial curvature of field and astigmatic difference cannot be corrected.

The lower limit value in the conditional formula (1-9) is preferably 0.015, and more preferably is 0.02. The upper limit value is preferably 0.04, and more preferably is 0.03

For example, the value preferably satisfies the following conditional formula (1-9a), and more preferably the following conditional formula (1-9b) should be satisfied.

$$0.015 < (A_{sp12F} - A_{sp12R})/f_W < 0.04 \quad (1\text{-}9a)$$

$$0.02 < (A_{sp12F} - A_{sp12R})/f_W < 0.03 \quad (1\text{-}9b)$$

Furthermore, in the zoom lens according to the first aspect of the present invention, the third lens group preferably moves to the object side after moving to the image side upon varying magnifying power from the wide-angle end to the telephoto end.

In this case, allowance of adjustment is ensured especially at the telephoto end in which variance in the focus point is great due to fabrication error.

Furthermore, in the zoom lens according to the first aspect of the present invention, the third lens group is made up of one positive-power lens.

In this structure, aberration can be corrected to a practical level, and the size of the zoom lens can be reduced by reducing the number of lenses.

In the zoom lens according to the first aspect of the present invention, the third lens group preferably satisfies the following conditional formula (1-3):

$$0.29 < f_W/f_3 < 0.6 \quad (1\text{-}3)$$

where $f_W$ is the focal length of the entire zoom lens in the wide-angle end, and $f_3$ is the focal length of the third lens group.

The conditional formula (1-3) defines a preferable range of the refractive power of the third lens group by the range of $f_W/f_3$.

If $f_W/f_3$ exceeds the upper limit defined in the conditional formula (1-3), with the refractive power of the third lens group being high, coma aberration and curvature of field in the third lens group become significant, making rear focusing difficult. If the value is less than the lower limit, with the refractive power of the third lens group being low, the back focus is increased and the amount of movement of the third lens group upon focusing is increased, making reduction in the size difficult. The above-described conditional formula (1-3) is especially useful when the lens surface of the third lens group is constructed by spherical surfaces.

The lower limit value in the conditional formula (1-3) is preferably 0.3, and is more preferably 0.31. The upper limit value is preferably 0.5, and is more preferably 0.45.

For example, preferably the following conditional formula (1-3a) should be satisfied, and more preferably the following conditional formula (1-3b) should be satisfied.

$$0.3 < f_W/f_3 < 0.5 \quad (1\text{-}3a)$$

$$0.31 < f_W/f_3 < 0.45 \quad (1\text{-}3b)$$

Furthermore, in the zoom lens according to the first aspect of the present invention, the aperture stop is preferably positioned between the first lens group and the second lens group.

In this case, the position of the entrance pupil can be shallower, and accordingly the diameter of the front lens can be reduced. Consequently, the thickness of the lens can be reduced on the optical axis, thereby enabling reduction in the thickness.

In addition, since the position of the exit pupil can be set to be distant from the image formation position, the angle of beams emitted to an image pickup element, such as a CCD, can be reduced and shading at the corners of the picture can be prevented.

The aperture stop preferably moves together with the second lens group upon varying magnifying power.

This structure is advantageous in that this enables a simpler mechanism and that less useless space is created when collapsed. In addition, the difference in F number between the wide-angle end and the telephoto end is reduced.

The image pickup apparatus according to the first aspect of the present invention includes the zoom lens according to the first aspect of the present invention and an image pickup element positioned at the image formation position of the zoom lens.

According to this invention, since an image of a subject can be formed on the image pickup element using the zoom lens according to the first aspect of the present invention, the image pickup apparatus has the same advantageous effects as the zoom lens according to the first aspect of the present invention.

It should be noted that each of the conditional formulae or configurations described above can be combined if needed to obtain a better zoom lens and/or an electronic image pickup apparatus. For each of the above-described conditional formulae, only the upper limit value or the lower limit value thereof can be defined by an upper limit value or a lower limit value of a more preferable conditional formula. In addition, the upper limit value or the lower limit value may be that of a conditional formula of examples described later.

In the following, embodiments of the first aspect of the present invention will be described with reference to the attached drawings.

FIRST EMBODIMENT OF FIRST ASPECT

A zoom lens according to a first embodiment of the first aspect of the present invention will be described.

Parts (a), (b), and (c) of FIG. 1 are cross-sectional views of a first example of the zoom lens according to the first embodiment of the first aspect of the present invention in the wide-angle end, the middle focal length position, and the telephoto end, respectively, when the zoom lens is focused on an object point at infinity. In this figure, reference symbol I indicates an image surface. Detailed numerical examples of this example will be described as Example 1-1.

A first exemplary zoom lens 1100 of this example generally includes a first lens group G1, a second lens group G2, a third lens group G3, and a group of parallel plates F, which are arranged in order from an object side thereof, as shown in Part (a) of FIG. 1.

The first lens group G1 includes a negative-power lens L101 (negative-power first lens) and a positive-power lens L102 (positive-power second lens) in order from an object side thereof, defining a lens group having a negative refractive power.

The negative-power lens L101 include a lens that has a concave surface having a larger curvature on the image side than that of the object side surface, and the concave surface on the image side includes an aspherical surface. It is made of a glass material having a refractive index of 1.75 or higher for the d-line.

The positive-power lens L102 is a positive meniscus lens that faces the convex surface to the object side. It is made of a glass material having a refractive index of 1.85 or higher for the d-line.

In the following, the negative-power lens L101 and the positive-power lens L102 may be simply referred as the lens L101 or L102 as long as there is no possibility of being misunderstood.

The second lens group G2 includes a positive-power lens L103 (positive-power first lens), a cemented lens L104, and a positive-power lens L107 (positive-power fourth lens) in order from an object side thereof, defining a lens group having a negative refractive power. An aperture stop S that moves together with the second lens group G2 upon varying magnifying power is provided at the object side of the second lens group G2.

The positive-power lens L103 includes a biconvex lens that has aspherical surfaces on the two sides.

The cemented lens L104 includes a positive-power lens L105 (positive-power second lens) including a positive meniscus lens that faces the convex surface to the object side, and a negative-power lens L106 (negative-power third lens) including a negative meniscus lens that faces the convex surface to the object side in order from an object side thereof. Each lens surface of the positive-power lens L105 and the negative-power lens L106 are made up of a spherical surface.

The positive-power lens L107 includes a single lens that faces the convex surface to the image side and has an aspherical surface on convex surface on the image side.

The third lens group G3 includes a positive-power lens L108 (positive single lens) that includes a biconvex single lens having only spherical surfaces on the two sides.

The group of parallel plates F may have any desired characteristics that are achieved by an image pickup element or the like provided to the image surface I. In this embodiment, it includes an optical low-pass filter F1 and a cover glass GL in order from an object side thereof, and is positioned between the last lens group and the image surface I in an immobile manner.

As the optical low-pass filter F1, a birefringent low-pass filter that is made of a quartz plate in which the orientation of crystal axis thereof is adjusted, or a phase low-pass filter that provides optical cut-off frequency characteristic by means of the diffraction effect may be preferably used.

The cover glass GL is a cover glass for disposing an image pickup element such as a CCD.

Other examples include, for example, an infrared light blocking filter in which an evaporated film that blocks infrared light is provided on a parallel plate.

It should be noted that all or part of these components may be omitted in some cases.

As shown in Parts (a), (b), and (c) of FIG. 1, in the zoom lens 1100, the first lens group G1 moves along the optical axis to the image side in a convex locus, the second lens group G2 moves together with the aperture stop S along the optical axis only to the object side, and the third lens group G3 moves in an amount different from that of the second lens group G2 along the optical axis to the image side in a convex locus upon varying magnifying power from the wide-angle end to the telephoto end upon focusing an object point at infinity. The third lens group G3 is configured to be movable for focusing.

Next, a second example of the zoom lens according to this embodiment will be described.

Parts (a), (b), and (c) of FIG. 2 are cross-sectional views of a second example of zoom lens according to the first embodiment of the first aspect of the present invention in the wide-angle end, the middle focal length position, and the telephoto end, respectively, when the zoom lens is focused on an object point at infinity. In this figure, reference symbol I indicates an image surface. Detailed numerical examples of this example will be described as Example 1-2.

As shown in Part (a) of FIG. 2, a second example of the zoom lens 1101 generally includes lenses L110 to L117 that correspond to the lenses L101 to L108 of the first example of the above-described embodiment and have the same refractive power types (positive or negative) and the same types of lens shape as the lenses L101 to L108. The aperture stop S and the group of parallel plates F are the same as those of the first example.

As shown in Parts (a), (b), and (c) of FIG. 2, in the zoom lens 1101, the first lens group G1 moves along the optical axis to the image side in a convex locus, the second lens group G2 moves together with the aperture stop S along the optical axis only to the object side, and the third lens group G3 moves in an amount different from that of the second lens group G2 along the optical axis to the image surface side upon varying magnifying power from the wide-angle end to the telephoto end upon focusing an object point at infinity. The third lens group G3 is configured to be movable for focusing.

Next, a third example of the zoom lens according to this embodiment will be described.

Parts (a), (b), and (c) of FIG. 3 are cross-sectional views of a third example of zoom lens according to the first embodiment of the first aspect of the present invention in the wide-angle end, the middle focal length position, and the telephoto end, respectively, when the zoom lens is focused on an object point at infinity. In this figure, reference symbol I indicates an image surface. Detailed numerical examples of this example will be described as Example 1-3.

As shown in Part (a) of FIG. 3, a third example of the zoom lens 1102 generally includes lenses L120, L122 to L125, and L127 that correspond to the lenses L101, L103 to L106, and L108 of the first example of the above-described embodiment and have the same refractive power types (positive or negative) and the same types of lens shape as the lenses L101, L103 to L106, and L108.

It also includes a positive-power lens L121 (positive-power second lens) and a positive-power lens L126 (positive-power fourth lens) instead of the positive-power lens L103 and the positive-power lens L107 of the first example, respectively.

The positive-power lens L121 includes a single lens that has a positive refractive power by having aspherical surfaces on the two sides. It is made of a glass material having a refractive index of less than 1.85 for the d-line.

The positive-power lens L126 includes a single lens that has the convex surface to the image side and has an aspherical surface on convex surface on the image side.

The aperture stop S and the group of parallel plates F are the same as those of the first example.

As shown in Parts (a), (b), and (c) of FIG. 3, in the zoom lens 1102, the first lens group G1 moves along the optical axis to the image side in a convex locus, the second lens group G2 moves together with the aperture stop S along the optical axis only to the object side, and the third lens group G3 moves in an amount different from that of the second lens group G2 along the optical axis upon varying magnifying power from the wide-angle end to the telephoto end upon focusing an object point at infinity. The third lens group G3 is configured to be movable for focusing.

Next, a fourth example of the zoom lens according to this embodiment will be described.

Parts (a), (b), and (c) of FIG. 4 are cross-sectional views of a fourth example of zoom lens according to the first embodiment of the first aspect of the present invention in the wide-angle end, the middle focal length position, and the telephoto end, respectively, when the zoom lens is focused on an object point at infinity. In this figure, reference symbol I indicates an image surface. Detailed numerical examples of this example will be described as Example 1-4.

As shown in Part (a) of FIG. 4, a fourth example of the zoom lens 1103 generally includes lenses L130 to 135, and L137 that correspond to the lenses L101 to 106, and L108 of the first example of the above-described embodiment and have the same refractive power types (positive or negative) and the same types of lens shape as the lenses L101 to 106, and L108.

It also includes a positive-power lens L136 (positive-power fourth lens) instead of the positive-power lens L107 of the first example.

The positive-power lens L136 includes a single lens that has the convex surface to the image side and has spherical surfaces on the two sides.

The aperture stop S and the group of parallel plates F are the same as those of the first example.

As shown in Parts (a), (b), and (c) of FIG. 4, in the zoom lens 1103, the first lens group G1 moves along the optical axis to the image side in a convex locus, the second lens group G2 moves together with the aperture stop S along the optical axis only to the object side, and the third lens group G3 moves in an amount different from that of the second lens group G2 along the optical axis upon varying magnifying power from the wide-angle end to the telephoto end upon focusing an object point at infinity. The third lens group G3 is configured to be movable for focusing.

Next, a fifth example of the zoom lens according to this embodiment will be described.

Parts (a), (b), and (c) of FIG. 5 are cross-sectional views of a fifth example of zoom lens according to the first embodiment of the first aspect of the present invention in the wide-angle end, the middle focal length position, and the telephoto end, respectively, when the zoom lens is focused on an object point at infinity. In this figure, reference symbol I indicates an image surface. Detailed numerical examples of this example will be described as Example 1-5.

As shown in Part (a) of FIG. 5, a second example of the zoom lens 1104 generally includes lenses L140 to 142, and L146 that correspond to the lenses L101 to 103, and L108 of the first example of the above-described embodiment and have the same refractive power types (positive or negative) and the same types of lens shape as the lenses L101 to 103, and L108.

The second lens group G2 includes a positive-power lens L142 (positive-power first lens) and a cemented lens L143, defining a lens group having a negative refractive power. An aperture stop S that moves together with the second lens group G2 upon varying magnifying power is provided at the object side of the second lens group G2.

The cemented lens L143 includes a positive-power lens L144 (positive-power second lens) including a biconvex lens, and a negative-power lens L145 (negative-power third lens) including a double-concave lens in order from an object side thereof. Each lens surface of the positive-power lens L143 and the negative-power lens L145 is made up of a spherical surface.

In this fifth example, the second lens group includes no positive-power fourth lens.

The aperture stop S and the group of parallel plates F are the same as those of the first example.

As shown in Parts (a), (b), and (c) of FIG. 5, in the zoom lens 1104, the first lens group G1 moves along the optical axis to the image side in a convex locus, the second lens group G2 moves together with the aperture stop S along the optical axis only to the object side, and the third lens group G3 moves in an amount different from that of the second lens group G2 along the optical axis to the image side in a convex locus upon varying magnifying power from the wide-angle end to the telephoto end upon focusing an object point at infinity. The third lens group G3 is configured to be movable for focusing.

It should be noted that the configurations of the lenses within the groups are merely presented as examples, and aspherical surfaces may be provided differently or the configuration of the groups may be changed as long as a desired positive or negative power for each of the lens group is obtained. For example, although the image side surface in the first lens group has been described as having an aspherical surface, at least one aspherical surface may be an object side surface. Furthermore, although the two sides of the positive-power first lens in the second lens group has been described as having aspherical surfaces in the two sides of the positive-power first lens, the at least two aspherical surfaces may be any surface other than the cemented surface of the cemented lens. For example, they may be a surface of cemented lens that is closest to the object side, or the surface closest to the image side may be aspherical.

The first embodiment described above is preferably configured to satisfy a suitable combination of the above-described conditional formulae.

EXAMPLE 1-1

In the following, structural parameters of an optical system of a first numerical example corresponding to the zoom lenses of the first example of the first embodiment described above will be described. In addition to the symbols described above, the following symbols will be used, and the symbols will be used commonly for each example:

f represents the focal length of the entire system, FNO represents an F number, W represents the wide-angle end, S represents the middle focal length position, and T represents the telephoto end. $r_1, r_2, \ldots$ represent the radii of curvature of each lens surface, $d_1, d_2, \ldots$ represent spacing between each lens surface, which correspond reference symbols used in Part (a) of FIG. 1. In addition, $n_{d1}, n_{d2}, \ldots$ represent refractive indices of each lens for the d-line, and $V_{d1}, V_{d2}, \ldots$ represent the Abbe numbers of each lens. These symbols are commonly used for all of the drawings that will be referred to later.

An aspherical shape can be expressed by the following formula (a) provided that z represents a direction of the optical axis, and y represents a direction that is orthogonal to the optical axis:

$$z=(y^2/r)/[1+\sqrt{\{1-(1+K)\cdot(y/r)^2\}}]+A_4y^4+A_6y^6+A_8y^8+A_{10}y^{10} \quad (a)$$

where r is a paraxial radius of curvature, K is a conical coefficient, and $A_4, A_6, A_8,$ and $A_{10}$ are the fourth, sixth, eighth and tenth aspheric coefficients, respectively.

| Surface Number | Radius of Curvature | Spacing between Surface | Refractive Index | Abbe Number |
|---|---|---|---|---|
| 1 | $r_1 = \infty$ | $d_1 = 1.50$ | $n_{d1} = 1.77377$ | $v_{d1} = 47.17$ |
| 2 | $r_2 = 7.265$ (aspherical) | $d_2 = 2.63$ | | |
| 3 | $r_3 = 12.816$ | $d_3 = 2.20$ | $n_{d2} = 1.80518$ | $v_{d2} = 25.42$ |
| 4 | $r_4 = 39.500$ | $d_4 = $ (variable) | | |
| 5 | $r_5 = \infty$ (stop) | $d_5 = 0.80$ | | |
| 6 | $r_6 = 14.805$ (aspherical) | $d_6 = 1.82$ | $n_{d3} = 1.74330$ | $v_{d3} = 49.33$ |
| 7 | $r_7 = -42.582$ (aspherical) | $d_7 = 0.08$ | | |
| 8 | $r_8 = 5.519$ | $d_8 = 2.52$ | $n_{d4} = 1.51633$ | $v_{d4} = 64.14$ |
| 9 | $r_9 = 16.682$ | $d_9 = 0.65$ | $n_{d5} = 1.80518$ | $v_{d5} = 25.42$ |
| 10 | $r_{10} = 4.631$ | $d_{10} = 1.25$ | | |
| 11 | $r_{11} = 1148.788$ | $d_{11} = 1.38$ | $n_{d6} = 1.51633$ | $v_{d6} = 64.14$ |
| 12 | $r_{12} = -31.519$ (aspherical) | $d_{12} = $ (variable) | | |
| 13 | $r_{13} = 42.164$ | $d_{13} = 2.01$ | $n_{d7} = 1.74400$ | $v_{d7} = 44.78$ |
| 14 | $r_{14} = -33.209$ | $d_{14} = $ (variable) | | |
| 15 | $r_{15} = \infty$ | $d_{15} = 0.95$ | $n_{d8} = 1.54771$ | $v_{d8} = 62.84$ |
| 16 | $r_{16} = \infty$ | $d_{16} = 0.55$ | | |
| 17 | $r_{17} = \infty$ | $d_{17} = 0.50$ | $n_{d9} = 1.51633$ | $v_{d9} = 64.14$ |
| 18 | $r_{18} = \infty$ | $d_{18} = $ (variable) | | |
| I | $\infty$ (image surface) | | | |

[Aspherical Coefficients]

| Surface Number | K | $A_4$ | $A_6$ | $A_8$ | $A_{10}$ |
|---|---|---|---|---|---|
| 2 | −0.694 | $3.79934 \times 10^{-6}$ | $3.02207 \times 10^{-12}$ | $4.80234 \times 10^{-12}$ | $-4.18324 \times 10^{-11}$ |
| 6 | 7.272 | $-5.06557 \times 10^{-4}$ | $-1.23961 \times 10^{-5}$ | $-1.87104 \times 10^{-9}$ | $-1.87517 \times 10^{-8}$ |
| 7 | −43.291 | $-2.56756 \times 10^{-4}$ | $-4.98807 \times 10^{-6}$ | $7.55902 \times 10^{-8}$ | $-8.45234 \times 10^{-9}$ |
| 12 | 0.000 | $1.68492 \times 10^{-4}$ | $-2.27448 \times 10^{-6}$ | $1.41768 \times 10^{-6}$ | $-6.47233 \times 10^{-8}$ |

[Zoom Data]

|  | W | S | T |
|---|---|---|---|
| f (mm) | 8.072 | 13.438 | 23.273 |
| FNO | 2.87 | 3.73 | 5.16 |
| $d_4$ | 18.51 | 8.96 | 1.99 |
| $d_{12}$ | 6.11 | 12.81 | 22.97 |
| $d_{14}$ | 4.17 | 3.40 | 3.83 |
| $d_{18}$ | 0.80 | 0.80 | 0.80 |

Aberration curves of this example are shown in Parts (a), (b), and (c) of FIG. 6. Each drawing corresponds to the wide-angle end (W), the middle focal length position (S), or the telephoto end (T). The drawings are a spherical aberration diagram, an astigmatism diagram, a distortion diagram, and a diagram of chromatic difference of magnification from left to right. The units of each of the horizontal axes are millimeter (mm), millimeter (mm), percent (%), or millimeter (mm).

These diagrams indicate that each of the aberrations is corrected satisfactorily in this example.

The calculated values for each of the conditional formulae will be summarized later.

EXAMPLE 1-2

In the following, structural parameters of an optical system of a second numerical example corresponding to the zoom lenses of the second example (see FIG. 2) of the second embodiment described above will be described.

| Surface Number | Radius of Curvature | Spacing between Surface | Refractive Index | Abbe Number |
|---|---|---|---|---|
| 1 | $r_1 = \infty$ | $d_1 = 1.50$ | $n_{d1} = 1.77377$ | $v_{d1} = 47.18$ |
| 2 | $r_2 = 6.812$ (aspherical) | $d_2 = 2.20$ |  |  |
| 3 | $r_3 = 12.179$ | $d_3 = 2.35$ | $n_{d2} = 1.90367$ | $v_{d2} = 31.32$ |
| 4 | $r_4 = 40.524$ | $d_4$ = (variable) |  |  |
| 5 | $r_5 = \infty$ (stop) | $d_5 = 0.80$ |  |  |
| 6 | $r_6 = 14.507$ (aspherical) | $d_6 = 2.12$ | $n_{d3} = 1.74330$ | $v_{d3} = 49.33$ |
| 7 | $r_7 = -37.838$ (aspherical) | $d_7 = 0.10$ |  |  |
| 8 | $r_8 = 5.549$ | $d_8 = 2.04$ | $n_{d4} = 1.48749$ | $v_{d4} = 70.23$ |
| 9 | $r_9 = 11.872$ | $d_9 = 1.13$ | $n_{d5} = 1.80518$ | $v_{d5} = 25.42$ |
| 10 | $r_{10} = 4.276$ | $d_{10} = 1.28$ |  |  |
| 11 | $r_{11} = 98.456$ | $d_{11} = 1.86$ | $n_{d6} = 1.51633$ | $v_{d6} = 64.14$ |
| 12 | $r_{12} = -27.195$ (aspherical) | $d_{12}$ = (variable) |  |  |
| 13 | $r_{13} = 27.602$ | $d_{13} = 1.97$ | $n_{d7} = 1.60311$ | $v_{d7} = 60.70$ |
| 14 | $r_{14} = -31.375$ | $d_{14}$ = (variable) |  |  |
| 15 | $r_{15} = \infty$ | $d_{15} = 0.95$ | $n_{d8} = 1.54771$ | $v_{d8} = 62.84$ |
| 16 | $r_{16} = \infty$ | $d_{16} = 0.55$ |  |  |
| 17 | $r_{17} = \infty$ | $d_{17} = 0.50$ | $n_{d9} = 1.51633$ | $v_{d9} = 64.14$ |
| 18 | $r_{18} = \infty$ | $d_{18}$ = (variable) |  |  |
| I | ∞ (image surface) |  |  |  |

[Aspherical Coefficients]

| Surface Number | K | $A_4$ | $A_6$ | $A_8$ | $A_{10}$ |
|---|---|---|---|---|---|
| 2 | −0.661 | $-1.18095 \times 10^{-5}$ | $-5.16857 \times 10^{-7}$ | $-8.68102 \times 10^{-10}$ | $-3.63804 \times 10^{-11}$ |
| 6 | 7.386 | $-5.88389 \times 10^{-4}$ | $-1.77024 \times 10^{-5}$ | $2.94038 \times 10^{-10}$ | $-1.44443 \times 10^{-8}$ |
| 7 | −35.173 | $-3.16877 \times 10^{-4}$ | $-9.12370 \times 10^{-6}$ | $1.33506 \times 10^{-7}$ | $-2.25341 \times 10^{-10}$ |
| 12 | 0.000 | $-1.33259 \times 10^{-4}$ | $-1.89869 \times 10^{-5}$ | $1.62043 \times 10^{-6}$ | $-1.96646 \times 10^{-7}$ |

[Zoom Data]

|  | W | S | T |
|---|---|---|---|
| f (mm) | 8.068 | 13.438 | 23.275 |
| FNO | 2.77 | 3.59 | 5.01 |
| $d_4$ | 18.96 | 8.95 | 2.00 |
| $d_{12}$ | 5.52 | 12.09 | 21.96 |
| $d_{14}$ | 3.79 | 2.77 | 2.00 |

-continued

|  | W | S | T |
|---|---|---|---|
| $d_{18}$ | 0.80 | 0.80 | 0.80 |

Aberration curves of this example are shown in Parts (a), (b), and (c) of FIG. 6. Each drawing corresponds to the wide-angle end (W), the middle focal length position (S), or the telephoto end (T). The drawings are a spherical aberration diagram, an astigmatism diagram, a distortion diagram, and a diagram of chromatic difference of magnification from left to right. The units of each of the horizontal axes are millimeter (mm), millimeter (mm), percent (%), or millimeter (mm).

These diagrams indicate that each of the aberrations is corrected satisfactorily in this example.

The calculated values for each of the conditional formulae will be summarized later.

EXAMPLE 1-3

In the following, structural parameters of an optical system of a third numerical example corresponding to the zoom lenses of the third example (see FIG. 3) of the third embodiment described above will be described.

| Surface Number | Radius of Curvature | Spacing between Surface | Refractive Index | Abbe Number |
|---|---|---|---|---|
| 1 | $r_1 = \infty$ | $d_1 = 1.50$ | $n_{d1} = 1.80610$ | $\nu_{d1} = 40.92$ |
| 2 | $r_2 = 8.753$ | $d_2 = 2.71$ |  |  |
| 3 | $r_3 = 29.169$ (aspherical) | $d_3 = 2.35$ | $n_{d2} = 1.84666$ | $\nu_{d2} = 23.78$ |
| 4 | $r_4 = -102.659$ (aspherical) | $d_4$ = (variable) |  |  |
| 5 | $r_5 = \infty$ (stop) | $d_5 = 0.80$ |  |  |
| 6 | $r_6 = 14.140$ (aspherical) | $d_6 = 2.10$ | $n_{d3} = 1.58313$ | $\nu_{d3} = 59.46$ |
| 7 | $r_7 = -24.946$ (aspherical) | $d_7 = 0.10$ |  |  |
| 8 | $r_8 = 5.904$ | $d_8 = 2.08$ | $n_{d4} = 1.69100$ | $\nu_{d4} = 54.82$ |
| 9 | $r_9 = 13.607$ | $d_9 = 1.37$ | $n_{d5} = 1.80518$ | $\nu_{d5} = 25.42$ |
| 10 | $r_{10} = 4.124$ | $d_{10} = 1.46$ |  |  |
| 11 | $r_{11} = -131.935$ | $d_{11} = 1.47$ | $n_{d6} = 1.51633$ | $\nu_{d6} = 64.14$ |
| 12 | $r_{12} = -75.520$ (aspherical) | $d_{12}$ = (variable) |  |  |
| 13 | $r_{13} = 23.098$ | $d_{13} = 2.22$ | $n_{d7} = 1.60311$ | $\nu_{d7} = 60.70$ |
| 14 | $r_{14} = -22.809$ | $d_{14}$ = (variable) |  |  |
| 15 | $r_{15} = \infty$ | $d_{15} = 0.95$ | $n_{d8} = 1.54771$ | $\nu_{d8} = 62.84$ |
| 16 | $r_{16} = \infty$ | $d_{16} = 0.55$ |  |  |
| 17 | $r_{17} = \infty$ | $d_{17} = 0.50$ | $n_{d9} = 1.51633$ | $\nu_{d9} = 64.14$ |
| 18 | $r_{18} = \infty$ | $d_{18}$ = (variable) |  |  |
| I | $\infty$ (image surface) |  |  |  |

[Aspherical Coefficients]

| Surface Number | K | $A_4$ | $A_6$ | $A_8$ | $A_{10}$ |
|---|---|---|---|---|---|
| 3 | 0.000 | $5.74375 \times 10^{-5}$ | $-8.37511 \times 10^{-6}$ | $4.11074 \times 10^{-7}$ | $-5.28660 \times 10^{-9}$ |
| 4 | 0.000 | $-6.94729 \times 10^{-5}$ | $-7.63117 \times 10^{-6}$ | $3.77509 \times 10^{-7}$ | $-5.46523 \times 10^{-9}$ |
| 6 | 6.643 | $-6.02020 \times 10^{-4}$ | $-5.51363 \times 10^{-6}$ | $-7.20229 \times 10^{-7}$ | $8.33261 \times 10^{-9}$ |
| 7 | -0.550 | $-2.31108 \times 10^{-4}$ | $1.70053 \times 10^{-6}$ | $-6.41632 \times 10^{-7}$ | $1.97033 \times 10^{-8}$ |
| 12 | 0.000 | $1.51066 \times 10^{-4}$ | $-5.40629 \times 10^{-6}$ | $4.30502 \times 10^{-7}$ | $-1.15320 \times 10^{-7}$ |

[Zoom Data]

|  | W | S | T |
|---|---|---|---|
| f (mm) | 8.068 | 13.438 | 23.275 |
| FNO | 2.86 | 3.83 | 5.29 |
| $d_4$ | 18.61 | 9.15 | 1.24 |
| $d_{12}$ | 4.60 | 11.63 | 20.83 |
| $d_{14}$ | 3.38 | 2.00 | 2.00 |
| $d_{18}$ | 0.90 | 0.90 | 0.90 |

Figure 8:
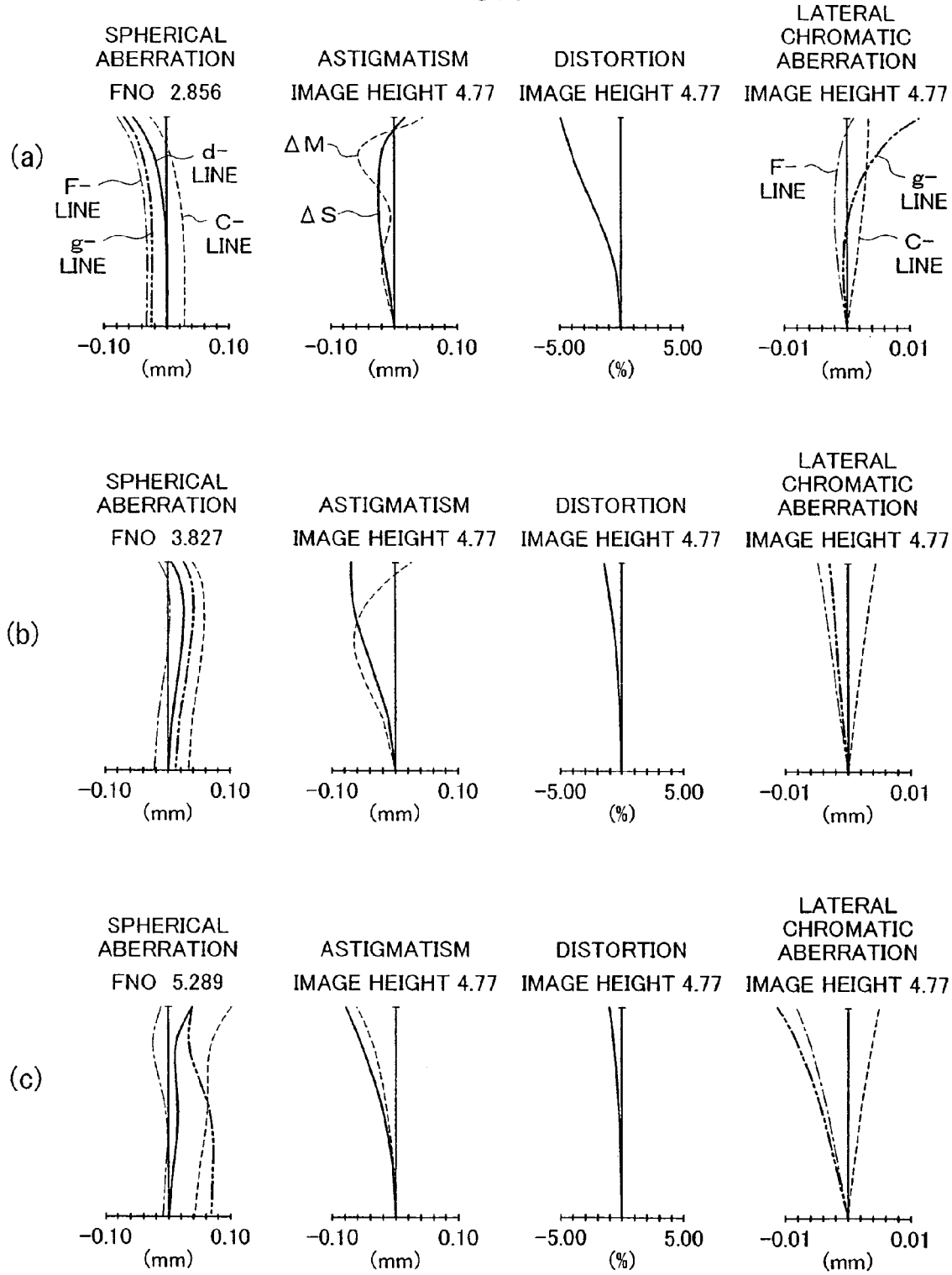
FIG. 8 is aberration curves of Example 1-3 in the wide-angle end, the middle focal length position, and the telephoto end.

Aberration curves of this example are shown in Parts (a), (b), and (c) of FIG. 8. Each drawing corresponds to the wide-angle end (W), the middle focal length position (S), or the telephoto end (T). The drawings are a spherical aberration diagram, an astigmatism diagram, a distortion diagram, and a diagram of chromatic difference of magnification from left to right. The units of each of the horizontal axes are millimeter (mm), millimeter (mm), percent (%), or millimeter (mm).

These diagrams indicate that each of the aberrations is corrected satisfactorily in this example.

The calculated values for each of the conditional formulae will be summarized later.

EXAMPLE 1-4

In the following, structural parameters of an optical system of a fourth numerical example corresponding to the zoom lenses of the fourth example (see FIG. 4) of the first embodiment described above will be described.

| Surface Number | Radius of Curvature | Spacing between Surface | Refractive Index | Abbe Number |
|---|---|---|---|---|
| 1 | $r_1 = \infty$ | $d_1 = 1.50$ | $n_{d1} = 1.77377$ | $\nu_{d1} = 47.17$ |
| 2 | $r_2 = 7.490$ (aspherical) | $d_2 = 2.72$ |  |  |
| 3 | $r_3 = 13.222$ | $d_3 = 2.11$ | $n_{d2} = 1.80518$ | $\nu_{d2} = 25.42$ |
| 4 | $r_4 = 38.308$ | $d_4$ = (variable) |  |  |
| 5 | $r_5 = \infty$ (stop) | $d_5 = 0.80$ |  |  |
| 6 | $r_6 = 16.536$ (aspherical) | $d_6 = 1.77$ | $n_{d3} = 1.74330$ | $\nu_{d3} = 49.33$ |
| 7 | $r_7 = -41.171$ (aspherical) | $d_7 = 0.02$ |  |  |
| 8 | $r_8 = 5.596$ | $d_8 = 2.48$ | $n_{d4} = 1.51633$ | $\nu_{d4} = 64.14$ |
| 9 | $r_9 = 16.030$ | $d_9 = 1.02$ | $n_{d5} = 1.80518$ | $\nu_{d5} = 25.42$ |
| 10 | $r_{10} = 4.623$ | $d_{10} = 1.02$ |  |  |
| 11 | $r_{11} = 1319.760$ | $d_{11} = 1.43$ | $n_{d6} = 1.51633$ | $\nu_{d6} = 64.14$ |
| 12 | $r_{12} = -24.853$ | $d_{12}$ = (variable) |  |  |
| 13 | $r_{13} = 37.064$ | $d_{13} = 2.07$ | $n_{d7} = 1.74400$ | $\nu_{d7} = 44.78$ |
| 14 | $r_{14} = -36.893$ | $d_{14}$ = (variable) |  |  |
| 15 | $r_{15} = \infty$ | $d_{15} = 0.95$ | $n_{d8} = 1.54771$ | $\nu_{d8} = 62.84$ |
| 16 | $r_{16} = \infty$ | $d_{16} = 0.55$ |  |  |
| 17 | $r_{17} = \infty$ | $d_{17} = 0.50$ | $n_{d9} = 1.51633$ | $\nu_{d9} = 64.14$ |

-continued

| Surface Number | Radius of Curvature | Spacing between Surface | Refractive Index | Abbe Number |
|---|---|---|---|---|
| 18 | $r_{18} = \infty$ | $d_{18}$ = (variable) | | |
| I | $\infty$ (image surface) | | | |

[Aspherical Coefficients]

| Surface Number | K | $A_4$ | $A_6$ | $A_8$ | $A_{10}$ |
|---|---|---|---|---|---|
| 2 | −0.697 | $7.65750 \times 10^{-6}$ | $-1.68254 \times 10^{-12}$ | $-1.42325 \times 10^{-15}$ | $-8.49690 \times 10^{-12}$ |
| 6 | 9.778 | $-4.32998 \times 10^{-4}$ | $-5.71365 \times 10^{-6}$ | $-4.70780 \times 10^{-8}$ | $-6.55631 \times 10^{-9}$ |
| 7 | −29.058 | $-1.46704 \times 10^{-4}$ | $1.20833 \times 10^{-6}$ | $7.61198 \times 10^{-8}$ | $2.82407 \times 10^{-9}$ |

[Zoom Data]

| | W | S | T |
|---|---|---|---|
| f (mm) | 8.119 | 13.436 | 23.244 |
| FNO | 2.87 | 3.70 | 5.15 |
| $d_4$ | 18.31 | 8.63 | 1.99 |
| $d_{12}$ | 6.21 | 12.49 | 23.05 |
| $d_{14}$ | 4.16 | 3.76 | 3.87 |
| $d_{18}$ | 0.79 | 0.80 | 0.79 |

Figure 9:
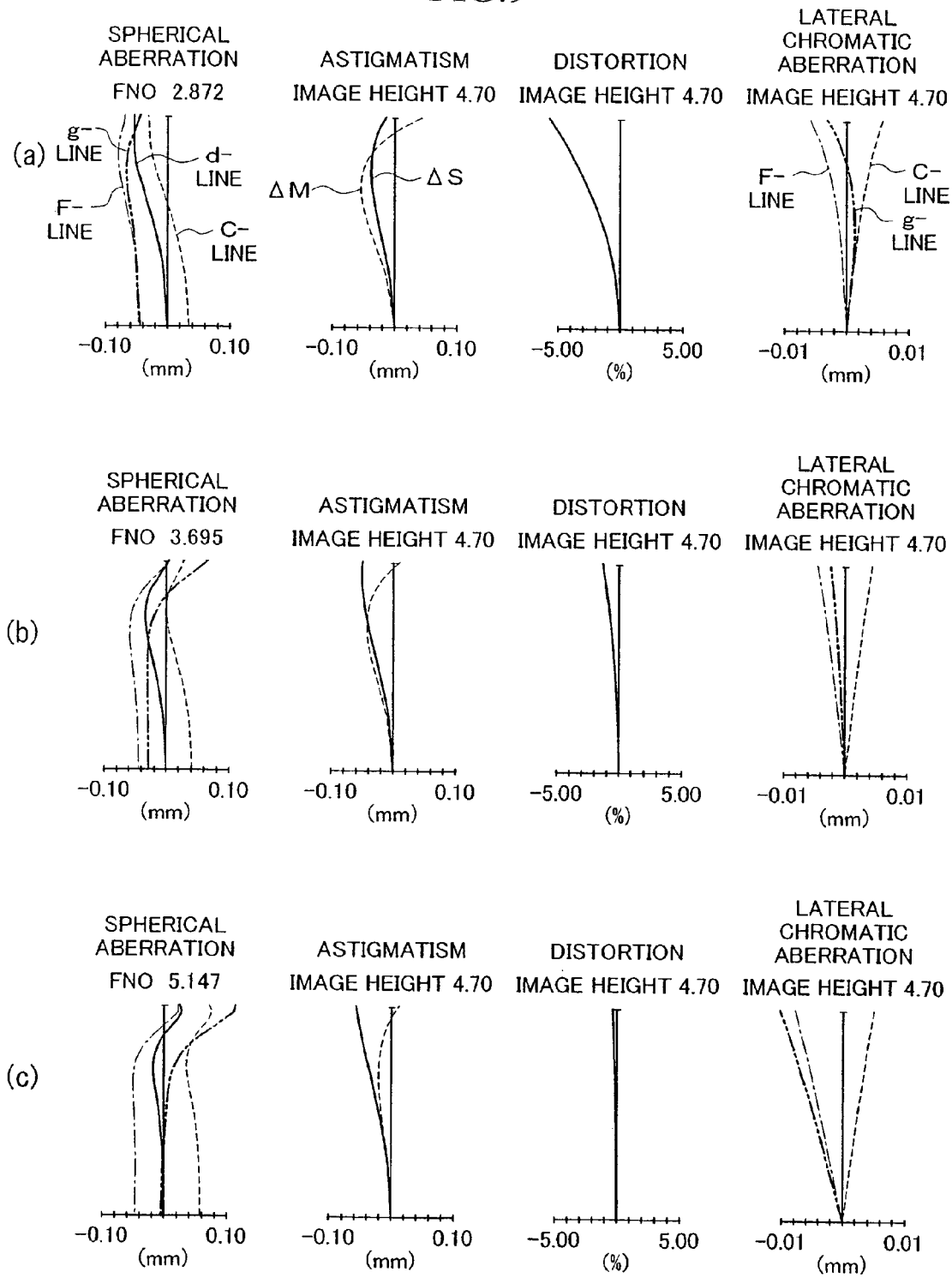
FIG. 9 is aberration curves of Example 1-4 in the wide-angle end, the middle focal length position, and the telephoto end.
Figure 10:
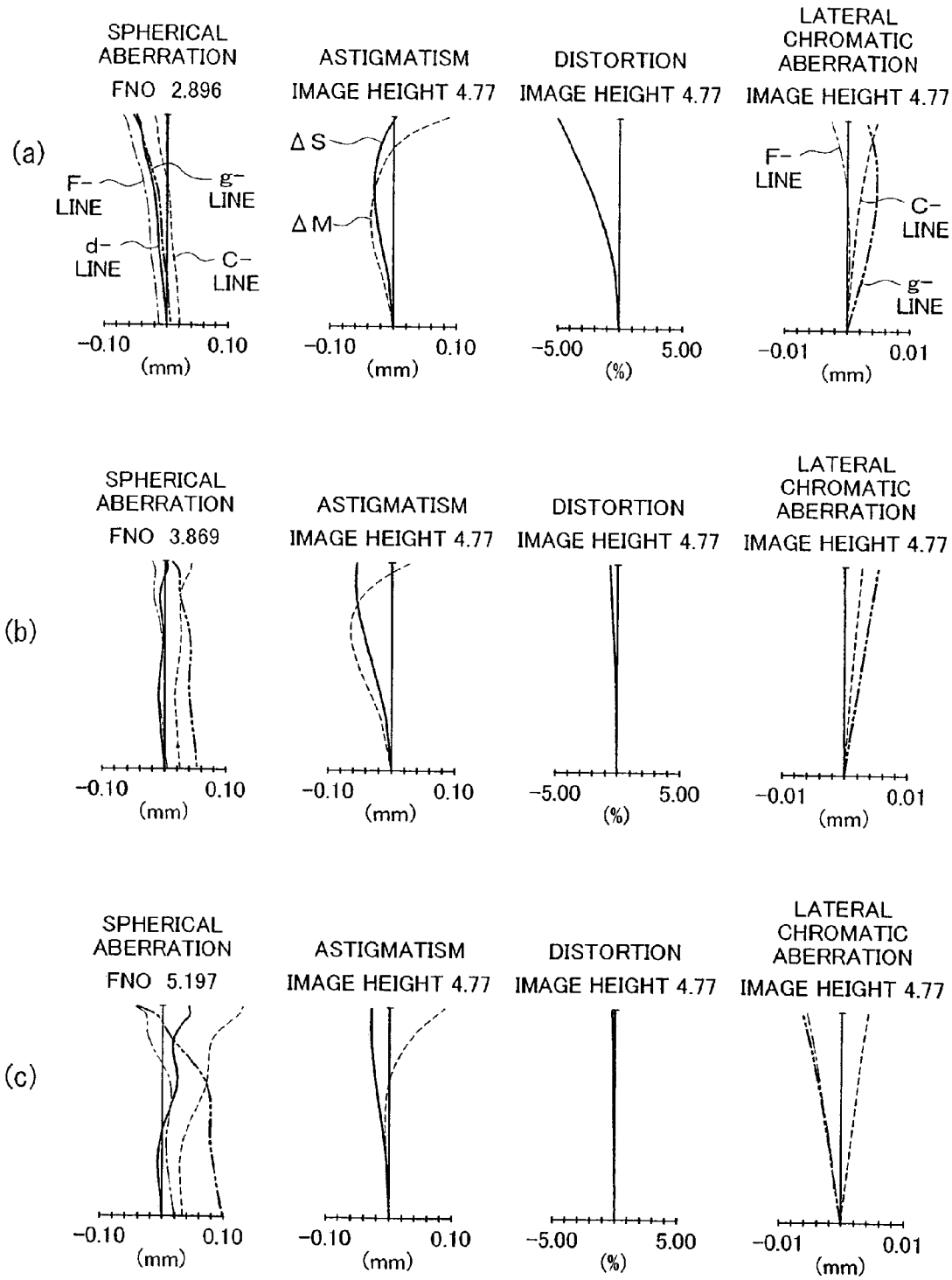
FIG. 10 is aberration curves of Example 1-5 in the wide-angle end, the middle focal length position, and the telephoto end.

Aberration curves of this example are shown in Parts (a), (b), and (c) of FIG. 9. Each drawing corresponds to the wide-angle end (W), the middle focal length position (S), or the telephoto end (T). The drawings are a spherical aberration diagram, an astigmatism diagram, a distortion diagram, and a diagram of chromatic difference of magnification from left to right. The units of each of the horizontal axes are millimeter (mm), millimeter (mm), percent (%), or millimeter (mm).

These diagrams indicate that each of the aberrations is corrected satisfactorily in this example.

The calculated values for each of the conditional formulae will be summarized later.

EXAMPLE 1-5

In the following, structural parameters of an optical system of a fifth numerical example corresponding to the zoom lenses of the fifth example (see FIG. 5) of the first embodiment described above will be described.

| Surface Number | Radius of Curvature | Spacing between Surface | Refractive Index | Abbe Number |
|---|---|---|---|---|
| 1 | $r_1 = \infty$ | $d_1 = 1.50$ | $n_{d1} = 1.77377$ | $\nu_{d1} = 47.18$ |
| 2 | $r_2 = 8.155$ (aspherical) | $d_2 = 3.36$ | | |
| 3 | $r_3 = 15.204$ | $d_3 = 1.65$ | $n_{d2} = 1.84666$ | $\nu_{d2} = 23.78$ |

-continued

| Surface Number | Radius of Curvature | Spacing between Surface | Refractive Index | Abbe Number |
|---|---|---|---|---|
| 4 | $r_4 = 38.711$ | $d_4$ = (variable) | | |
| 5 | $r_5 = \infty$ (stop) | $d_5 = 0.80$ | | |
| 6 | $r_6 = 8.232$ (aspherical) | $d_6 = 2.99$ | $n_{d3} = 1.51633$ | $\nu_{d3} = 64.14$ |
| 7 | $r_7 = -15.571$ (aspherical) | $d_7 = 0.10$ | | |
| 8 | $r_8 = 9.472$ | $d_8 = 2.09$ | $n_{d4} = 1.69680$ | $\nu_{d4} = 55.53$ |
| 9 | $r_9 = -50.000$ | $d_9 = 1.00$ | $n_{d5} = 1.68893$ | $\nu_{d5} = 31.16$ |
| 10 | $r_{10} = 4.569$ | $d_{10}$ = (variable) | | |
| 11 | $r_{11} = 40.201$ | $d_{11} = 2.50$ | $n_{d6} = 1.76802$ | $\nu_{d6} = 49.23$ |
| 12 | $r_{12} = -33.383$ | $d_{12}$ = (variable) | | |
| 13 | $r_{13} = \infty$ | $d_{13} = 0.95$ | $n_{d7} = 1.54771$ | $\nu_{d7} = 62.84$ |
| 14 | $r_{14} = \infty$ | $d_{14} = 0.55$ | | |
| 15 | $r_{15} = \infty$ | $d_{15} = 0.50$ | $n_{d8} = 1.51633$ | $\nu_{d8} = 64.14$ |
| 16 | $r_{16} = \infty$ | $d_{16}$ = (variable) | | |
| I | $\infty$ (image surface) | | | |

[Aspherical Coefficients]

| Surface Number | K | $A_4$ | $A_6$ | $A_8$ | $A_{10}$ |
|---|---|---|---|---|---|
| 2 | −1.224 | $1.15285 \times 10^{-4}$ | $8.39751 \times 10^{-7}$ | $-2.79967 \times 10^{-8}$ | $3.18923 \times 10^{-10}$ |
| 6 | −0.726 | $-3.47679 \times 10^{-4}$ | $-2.49225 \times 10^{-5}$ | $6.50686 \times 10^{-7}$ | $-7.77039 \times 10^{-8}$ |
| 7 | 1.958 | $-1.35093 \times 10^{-4}$ | $-2.32879 \times 10^{-5}$ | $2.62867 \times 10^{-7}$ | $-4.12333 \times 10^{-8}$ |

[Zoom Data]

|  | W | S | T |
|---|---|---|---|
| f (mm) | 8.068 | 13.986 | 23.274 |
| FNO | 2.90 | 3.87 | 5.20 |
| $d_4$ | 18.78 | 8.34 | 1.54 |
| $d_{10}$ | 7.45 | 14.41 | 23.06 |
| $d_{12}$ | 3.29 | 2.34 | 3.00 |
| $d_{16}$ | 0.90 | 0.90 | 0.90 |

Values of the conditional formulae in Examples 1-1 to 1-5 are summarized in the following table:

TABLE 1

|  | Conditional Expression | Ex. 1 | Ex. 2 | Ex. 3 | Ex 4 | Ex. 5 |
|---|---|---|---|---|---|---|
| $L_t/f_2$ | (1-1) | 3.22 | 3.07 | 2.94 | 3.23 | 3.15 |
| $|f_1/f_2|$ | (1-2) | 1.26 | 1.35 | 1.45 | 1.26 | 1.33 |
| $f_w/f_3$ | (1-3) | 0.32 | 0.33 | 0.42 | 0.32 | 0.33 |
| $|X_2/f_1|$ | (1-4) | 0.87 | 0.72 | 0.67 | 0.87 | 0.78 |
| $R_{23R}/R_{22F}$ | (1-5) | 0.84 | 0.77 | 0.7 | 0.83 | 0.48 |
| $f_2/R_{23F}$ | (1-6) | 0.9 | 1.27 | 1.13 | 0.94 | −0.3 |
| $|f_2/f_{23}|$ | (1-7) | 1.84 | 1.69 | 1.95 | 1.79 | 2.45 |
| $(R_{13} + R_{14})/(R_{13} − R_{14})$ | (1-8) | −1.96 | −1.86 | −0.56 | −2.05 | −2.29 |
| $(A_{sp12F} − A_{sp12R})/f_w$ | (1-9) | none | none | 0.022 | none | none |

SECOND EMBODIMENT OF FIRST ASPECT

A camera according to a second embodiment of the first aspect of the present invention will be described.

The zoom lens according to the second embodiment of the first aspect as described above may be applied to phototaking systems where object images formed through zoom lenses are received at image pickup devices such as CCDs, inter alia, digital cameras or video cameras as well as PCs and telephone sets that are typical information processors, in particular, easy-to-carry cellular phones. Given below are some such embodiments.

Figure 11:
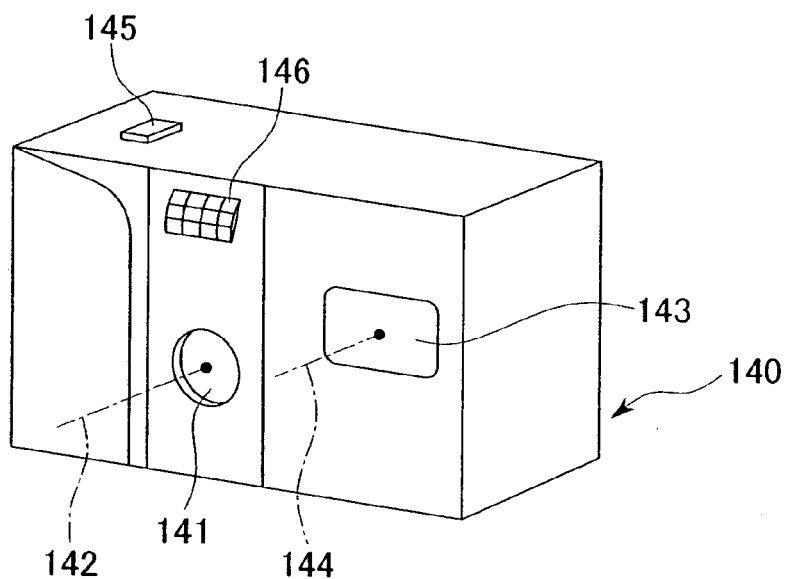
FIG. 11 is a front perspective schematic illustrative of the outside shape of a digital camera in which the zoom lens of the first aspect of the present invention is built.
Figure 12:
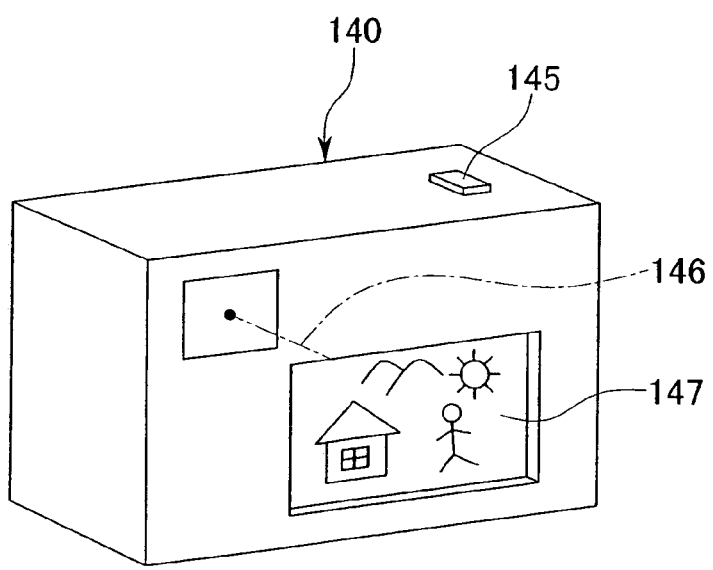
FIG. 12 is a rear perspective schematic of the digital camera shown in FIG. 11.
Figure 13:
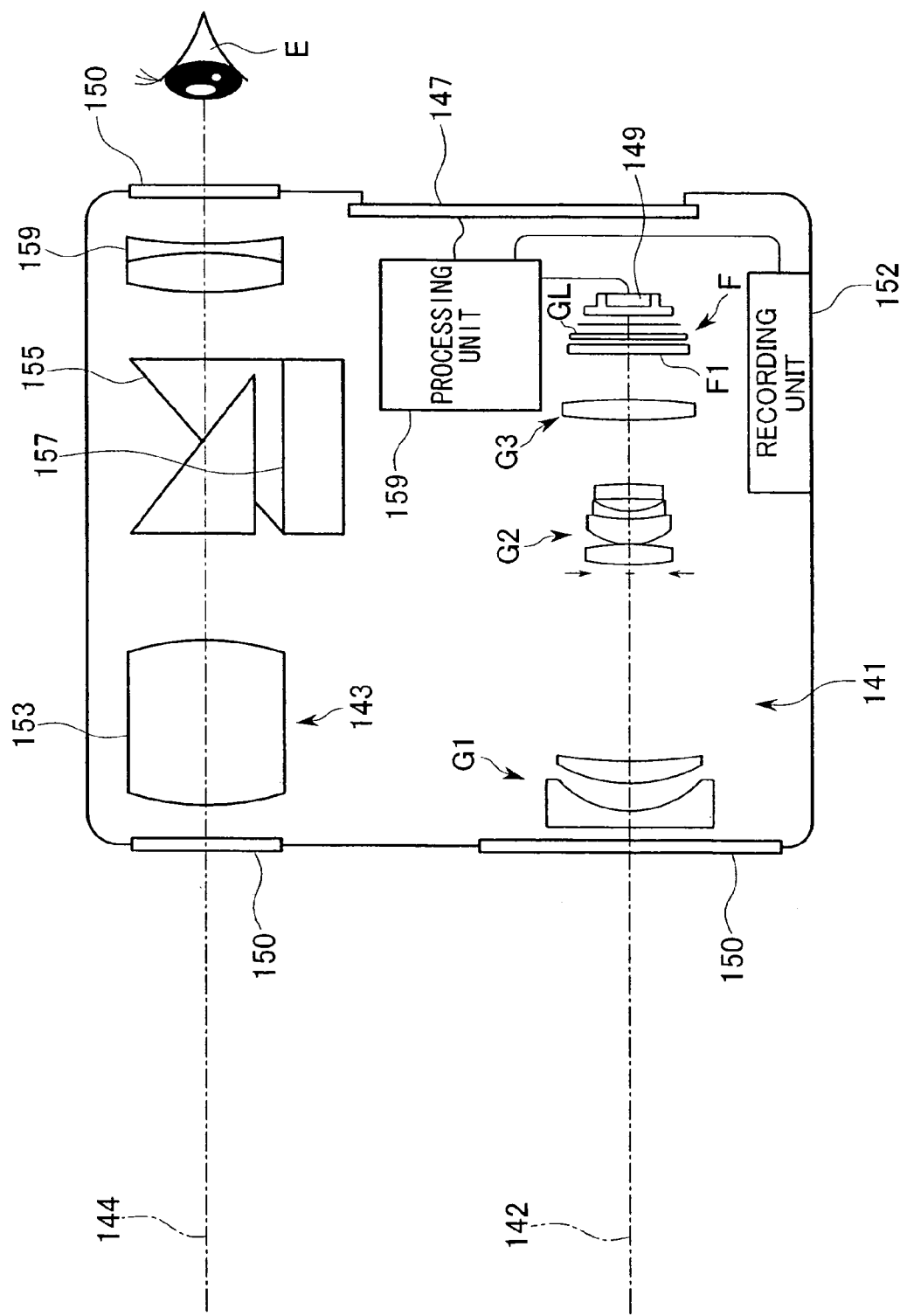
FIG. 13 is a cross-sectional view of the outside shape of a digital camera in which the zoom lens of the first aspect of the present invention is built.

FIGS. 11 to 13 are conceptual illustrations of a phototaking optical system 141 for digital cameras, in which the zoom lens of the present invention is built. FIG. 11 is a front perspective view of the outside shape of a digital camera 140, FIG. 12 is a rear perspective view of the same, and FIG. 13 is a cross-sectional view illustrating the structure of the digital camera 140.

In this embodiment, the digital camera 140 (camera) includes a phototaking optical system 141 (zoom lens) including a phototaking optical path 142, a finder optical system 143 including a finder optical path 144, a shutter 145, a flash 146, a liquid crystal monitor 147 and so on. As the shutter 145 mounted on the upper portion of the camera 40 is pressed down, phototaking takes place through the phototaking optical system 141, for instance, the zoom lens 1100, 1101, 1102, 1103, or 1104 according to the first embodiment. An object image formed by the phototaking optical system 141 is formed on the image pickup plane of a CCD 149 (image pickup element) via an optical low-pass filter LF and a cover glass GL. The object image received at CCD 149 is shown as an electronic image on the liquid crystal monitor 47 via processing unit 151, which monitor is mounted on the back of the camera. This processing unit 151 is connected with recording means 152 in which the phototaken electronic image may be recorded. It is here noted that the recording means 152 may be provided separately from the processing unit 151 or, alternatively, it may be constructed in such a way that images are electronically recorded and written therein by means of floppy discs, memory cards, MOs or the like. This camera may also be constructed in the form of a silver halide camera using a silver halide film in place of CCD 149.

Moreover, a finder objective optical system 153 is located on the finder optical path 144. An object image formed by the finder objective optical system 153 is in turn formed on the field frame 157 of a Porro prism 155 that is an image-erecting member. In the rear of the Porro prism 155 there is located an eyepiece optical system 159 for guiding an erected image into the eyeball E of an observer. It is here noted that cover members 50 are provided on the entrance sides of the phototaking optical system 141 and finder objective optical system 153 as well as on the exit side of the eyepiece optical system 159.

With the thus constructed digital camera 140, it is possible to achieve high performance and cost reductions, because the phototaking optical system 141 is constructed of a zoom lens having a high zoom ratio in the wide-angle end with satisfactory aberrations and a back focus large enough to receive a filter, etc., therein.

In the embodiment of FIG. 13, plane-parallel plates are used as the cover members 150; however, it is acceptable to use powered lenses.

Second Aspect

Before describing various embodiments of the second aspect of the present invention, the operation of the second aspect of the present invention will be described with reference to examples.

A zoom lens according to the second aspect of the present invention have three-lens groups construction including a first lens group having a negative refractive power, a second lens group having a positive refractive power, and a third lens group having a positive refractive power in order from an object side thereof. Thus, the zoom lens exhibits an excellent telecentricity, and light beams can be effectively introduced into an image pickup element such as a charge-coupled device (CCD), for example. Furthermore, since it is possible to ensure a long back focus, space for installing parts, such as an optical low-pass filter or an infrared blocking filter, can be saved.

In addition, when the magnification of the zoom lens is varied from the wide-angle end to the telephoto end, the first lens group moves to the object side after moving to the image side, the second lens group moves only to the object side, whereas the third lens group moves in an amount different from that of the second lens group. Thus, it is possible to reduce the total length of the system while maintaining an appropriate exit pupil.

Furthermore, the third lens group is configured to being movable and is used for focusing. With such a rear focusing method by means of the third lens group, the load to the drive motor can be reduced since the movable lens group has a lower weight than a focusing by means of the first lens group. In addition, the total length can be maintained to be short, and the diameter of the lens barrel can be maintained small since the drive motor can be accommodated in the lens barrel. Thus, such a system is advantageous since it allows a compact layout.

Furthermore, the zoom lens according to the second aspect of the present invention satisfies the conditional formula (2-1) described above. The conditional formula (2-1) defines a preferable condition by defining the range of $L_t/f_2$.

If $L_t/f_2$ exceeds the upper limit defined in the conditional formula (2-1), the total length becomes too long, in which reduction in size is impossible. In contrast, if the $L_t/f_2$ is less than the lower limit, the power of the second lens group becomes weak, and consequently zooming action of the second lens group is degraded, requiring more movement when the magnification of the zoom lens is varied. This, too, hinders reduction in size.

The lower limit value in the conditional formula (2-1) is preferably 2.5, and more preferably is 2.7. The upper limit value is preferably 3.5, and more preferably is 3.3.

For example, preferably the following conditional formula (2-1a) should be satisfied, and more preferably the following conditional formula (2-1b) should be satisfied:

$$2.5 < L_t/f_2 < 3.5 \quad (2\text{-}1a)$$

$$2.7 < L_t/f_2 < 3.3 \quad (2\text{-}1b)$$

Furthermore, the zoom lens according to the second aspect of the present invention satisfies the conditional formula (2-2) described above. The conditional formula (2-2) defines a preferable range of the refractive power of the third lens group by the range of $f_W/f_3$.

If $f_W/f_3$ exceeds the upper limit defined in the conditional formula (2-2), with the refractive power of the third lens group being high, coma aberration and curvature of field in the third lens group become significant, making rear focusing difficult. If the value is less than the lower limit, with the refractive power of the third lens group being low, the back focus is increased and the amount of movement of the third lens group upon focusing is increased, making reduction in the size difficult. The above-described conditional formula (2-2) is especially useful when the lens surface of the third lens group is constructed by spherical surfaces.

The lower limit value in the conditional formula (2-2) is preferably 0.3, and is more preferably 0.31. The upper limit value is preferably 0.5, and is more preferably 0.45.

For example, preferably the following conditional formula (2-2a) should be satisfied, and more preferably the following conditional formula (2-2b) should be satisfied:

$$0.3 < f_W/f_3 < 0.5 \quad (2\text{-}2a)$$

$$0.31 < f_W/f_3 < 0.45 \quad (2\text{-}2b)$$

Furthermore, the zoom lens according to the second aspect of the present invention satisfies the conditional formula (2-3) described above. The structure defined by the conditional formula (2-3) is useful for satisfying the conditional formulae (2-1) and (2-2), and defines the shape of the cemented surface by the range of the value of $f_2/R_{2C}$.

If $f_2/R_{23F}$ exceeds the upper limit defined in the conditional formula (2-3), correction of axial chromatic aberration and chromatic deference of magnification tends to be insufficient. If the lower limit is not reached, the thickness on the optical axis is increased to ensure a sufficient thickness of the periphery of positive-power second lens in cemented lens is increased, which is undesirable. Furthermore, it becomes difficult to position the principal point to the object side, making ensuring a wide angle of view difficult. This conditional formula (2-3) and the structure of the fourth lens in the second lens group ensures an excellent performance even when the third lens group has a strong power.

The lower limit value in the conditional formula (2-3) is preferably 0.45, and is more preferably 0.5. The upper limit value is preferably 1.2, and is more preferably 1.0.

For example, preferably the following conditional formula (2-3a) should be satisfied, and more preferably the following conditional formula (2-3b) should be satisfied:

$$0.45 < f_2/R_{2C} < 1.2 \quad (2\text{-}3a)$$

$$0.5 < f_2/R_{2C} < 1.0 \quad (2\text{-}3b)$$

Furthermore, in the zoom lens according to the second aspect of the present invention, since the fourth lens in the second lens group has a convex surface on the image side, deterioration of performance upon decentration of the single lens can be reduced. Furthermore, this is advantageous for the size reduction since mechanical interference between mechanical members that are placed behind the second lens group can be avoided upon being collapsed.

The fourth lens may be a powerless lens or a negative-power lens for the purpose of correction of aberration. However, when the fourth lens is constructed as a lens having a positive refractive power, the positive power within the second lens group is scattered. As a result, the relative decentration sensitivity within the second lens group can be reduced.

In the zoom lens according to the second aspect of the present invention, the cemented lens in the second lens group preferably satisfies the following conditional formula (2-6):

$$0.3 < R_{23R}/R_{22F} < 1.0 \quad (2\text{-}6)$$

where $R_{22F}$ is the radius of curvature in the vicinity of the optical axis of the object side surface of the positive-power second lens in the second lens group, and $R_{23R}$ is the radius of curvature in the vicinity of the optical axis of a surface closest to the image side of the negative-power third lens in the second lens group.

The conditional formula (2-6) defines a range of a preferable shape of the cemented lens in the second lens group by the value of $R_{23R}/R_{22F}$.

If $R_{23R}/R_{22F}$ exceeds the upper limit defined by the conditional formula (2-6), correction of spherical aberration, coma aberration, and astigmatism within the group cannot be achieved sufficiently and the effect of reduction in decentration sensitivity achieved by the cementing is reduced. If the lower limit is not reached, spherical aberration, coma aberration, and astigmatism within the group is corrected and decentration sensitivity is reduced. However, the power of the second lens group is increased, which tends to hinder size reduction.

The lower limit value in the conditional formula (2-6) is preferably 0.4, and more preferably is 0.45. The upper limit value is preferably 0.95, and is more preferably 0.9.

For example, preferably the following conditional formula (2-6a) should be satisfied, and more preferably the following conditional formula (2-6b) should be satisfied:

$$0.4 < R_{23R}/R_{22F} < 0.95 \quad (2\text{-}6a)$$

$$0.45 < R_{23R}/R_{22F} < 0.9 \quad (2\text{-}6b)$$

In the zoom lens according to the second aspect of the present invention, the negative-power third lens in the second lens group preferably satisfies the following conditional formula (2-7):

$$1.0 < |f_2/f_{23}| < 3.0 \quad (2\text{-}7)$$

where $f_2$ is the focal length of the second lens group, and $f_{23}$ is the focal length of the negative-power third lens in the second lens group.

The conditional formula (2-7) defines a preferable range of the ratio of the focal length of the negative-power third lens in the second lens group to the focal length of the second lens group by the value of $|f_2/f_{23}|$.

If $|f_2/f_{23}|$ exceeds the upper limit defined in the conditional formula (2-7), correction of astigmatism becomes difficult although the total length can be reduced since the principal point of the second lens group shifts closer to the object side. If the lower limit is not reached, the principal point of the second lens group shifts closer to the image side and the power of the second lens group cannot be reduced. Thus, the amount of movement and the size of the first lens group tend to be increased. Furthermore, useless space tends to be defined behind the second lens group when in use, which may increase the total length. This may render the mechanical structure of the lens barrel to become complex or huge. Or the total length of the lens cannot be reduced upon collapsed.

The lower limit value in the conditional formula (2-7) is preferably 1.3, and is more preferably 1.6. The upper limit value is preferably 2.5, and is more preferably 2.0.

For example, preferably the following conditional formula (2-7a) should be satisfied, and more preferably the following conditional formula (2-7b) should be satisfied:

$$1.3<|f_2/f_{23}|<2.5 \tag{2-7a}$$

$$1.6<|f_2/f_{23}|<2.0 \tag{2-7b}$$

In the zoom lens according to the second aspect of the present invention, the amount of movement of the second lens group upon varying magnifying power preferably satisfies the following conditional formula (2-4):

$$0.4<|X_2/f_1|<1.0 \tag{2-4}$$

where $X_2$ is an amount of movement of the second lens group when the magnification of the zoom lens is varied from the wide-angle end to the telephoto end, and $f_1$ is the focal length of the first lens group.

The conditional formula (2-4) defines a preferable range of the amount of movement of the second lens group by the value of $|X_2/f_1|$.

If $|X_2/f_1|$ exceeds the upper limit defined in the conditional formula (2-4), a mechanical mechanism for moving the second lens group becomes too large since the amount of movement of the second lens group is increased, which makes reduction in the total length of the lens upon collapsed difficult. If the power of the first lens group becomes too high exceeding the lower limit, off-axial astigmatism and coma aberration in the wide-angle end is significant, making correction of such aberrations difficult.

The lower limit value in the conditional formula (2-2) is preferably 0.5, and is more preferably 0.6. The upper limit value is preferably 0.9, and is more preferably 0.85.

For example, preferably the following conditional formula (2-4a) should be satisfied, and more preferably the following conditional formula (2-4b) should be satisfied:

$$0.5<|X_2/f_1|<0.9 \tag{2-4a}$$

$$0.6<|X_2/f_1|<0.85 \tag{2-4b}$$

Furthermore, the zoom lens according to the second aspect of the present invention preferably satisfies the conditional formula (2-5) described above.

$$1.15<|f_1/f_2|<2.0 \tag{2-5}$$

where $f_2$ is the focal length of the second lens group, and $f_1$ is the focal length of the first lens group.

The conditional formula (2-5) defines a refractive power of the first and the second lens groups by the value of $|f_1/f_2|$. If $|f_1/f_2|$ exceeds the upper limit defined in the conditional formula (2-5), the refractive power of the second lens group becomes too high. Thus, a telecentricity may be difficult to be ensured, and shading tends to occur at the corners of the picture. If the lower limit is not reached, the refractive power of the second lens group becomes weak, and consequently zooming action of the second lens group is degraded, requiring more movement when the magnification of the zoom lens is varied. This causes an increase in the size of the overall lens system.

The lower limit value in the conditional formula (2-5) is preferably 1.2, and more preferably is 1.25. The upper limit value is preferably 1.75, and more preferably is 1.5.

For example, preferably the following conditional formula (2-5a) should be satisfied, and more preferably the following conditional formula (2-5b) should be satisfied:

$$1.2<|f_1/f_2|<1.75 \tag{2-5a}$$

$$1.25<|f_1/f_2|<1.5 \tag{2-5b}$$

With such a rear focusing method by means of the third lens group, the load to the drive motor can be reduced since the movable lens group has a lower weight than a focusing by means of the first lens group. In addition, the total length can be maintained to be short, and the diameter of the lens barrel can be maintained small since the drive motor can be accommodated in the lens barrel. Thus, such a system is advantageous since it allows a compact layout. However, considering focusing by means of the third lens group, it is desirable to cut astigmatism almost completely by the first lens group and the second lens group in the entire range of zooming. In this case, in order to reduce variation in off-axial aberration, such as astigmatism, the capability for correcting aberration of the second lens group is especially important.

For the above-described reasons, in the zoom lens according to the second aspect of the present invention, the second lens group includes a positive-power first lens, a positive-power second lens, a negative-power third lens, and a fourth lens that is made of a single lens having a convex surface on the image side in order from an object side thereof, and the positive-power second lens and the negative-power third lens are cemented together to form a meniscus-shaped cemented lens that faces a convex surface to the object side and the second lens group has aspherical surfaces on at least two surfaces other than the cemented surface of the cemented lens.

Such a structure can effectively correct astigmatism that is generated in the third lens group, thereby enhancing image forming capability. In particular, since the aspherical surfaces are provided to at least two surfaces, correction of aberration can be performed effectively.

In this case, since the aspherical surfaces on the at least two surfaces are provided to lens surfaces other than the cemented surface of the cemented lens, the cemented lens can be easily manufactured.

Furthermore, the aspherical surfaces on the at least two surfaces are preferably provided to the two sides of the positive-power first lens in the second lens group. This provides great benefits: correction of spherical aberration, reduction in the relative decentration sensitivity within the group, reduction in the manufacturing cost.

Furthermore, since the negative-power third lens in the second lens group cancels spherical aberration and coma aberration generated in the positive-power second lens, this configuration can minimize aberrations generated in the second lens group. The positive-power second lens that has a lens surface for canceling spherical aberration and coma aberration is cemented with the negative-power third lens that is a main lens, generation of aberration due to relative eccentricity can be inhibited.

In this case, decentration sensitivity is preferably reduced by canceling aberration in the cemented lens. This can reduce relative decentration sensitivity with the positive-power first lens in the second lens group.

In the zoom lens according to the second aspect of the present invention, the image side surface of the fourth lens in the second lens group is more preferably an aspherical surface.

This may be effective for correction of aberration. In particular, in order to correct astigmatism and distortion generated in the first lens group, it is effective to provide the aspherical surface on a surface in which the chief ray height becomes high behind the stop.

However, when the rear focusing method is done by means of the third lens group, the amount of asphericity into the third lens group is limited. In other words, if the third lens group has an aspherical surface, the fluctuation of the image forming capability upon focusing becomes significant. Therefore, the aspherical surface is preferably provided at a surface closest to the image side in the second lens group.

It should be noted that the fourth lens in the second lens group may be a glass lens or a plastic lens. Alternatively, it may be a compound aspherical lens in which an aspherical resin is provided on a spherical surface made of glass.

In addition, in the zoom lens according to the second aspect of the present invention, the first lens group includes a negative-power first lens and a positive-power second lens in order from an object side thereof, and has at least one aspherical surface.

Since the first lens group includes two lenses having at least one aspherical surface, chromatic aberration and each off-axial aberration can be effectively corrected, and the reduction of the thickness of the zoom lens can be realized.

In the zoom lens according to the second aspect of the present invention, a glass material having a refractive index of 1.75 or higher for the d-line (having a wavelength of 587.56 nm) is preferably used for the negative-power first lens in the first lens group. This provides an excellent refractive power without increasing the curvature, thereby minimizing generation of various off-axial aberrations.

Furthermore, in the zoom lens according to the second aspect of the present invention, the negative-power first lens in the first lens group preferably has a concave surface having a larger curvature on the image side than that of the object side surface, and the concave surface on the image side includes an aspherical surface. This can effectively correct distortion and curvature of field especially in the wide-angle end. This lens may be an aspherical lens formed by the glass molding, or a compound aspherical lens in which an aspherical resin is formed on a spherical surface made of glass.

In the zoom lens according to the second aspect of the present invention, a glass material having a refractive index of 1.85 or higher for d-line (having a wavelength of 587.56 nm) is preferably used for the positive-power second lens in the first lens group. Generation of various off-axial aberrations can be minimized for the same reason as the negative-power first lens. In this case, it is preferable to use a glass material having a refractive index of 1.90 or higher for d-line.

In the zoom lens according to the second aspect of the present invention, the positive-power second lens in the first lens group preferably satisfies the following conditional formula (2-8):

$$-2.5 < (R_{13}+R_{14})/(R_{13}-R_{14}) < -0.4 \tag{2-8}$$

where $R_{13}$ is the radius of curvature of the object side surface of the positive-power second lens in the first lens group, $R_{14}$ is the radius of curvature of the image side surface of the positive-power second lens in the first lens group.

The conditional formula (2-8) defines a preferable shape of the positive-power second lens in the first lens group by the value of $(R_{13}+R_{14})/(R_{13}-R_{14})$.

If $(R_{13}+R_{14})/(R_{13}-R_{14})$ exceeds the upper limit defined in the conditional formula (2-8), it may be disadvantageous in terms of correction of distortion. If the lower limit is not reached, it may be disadvantageous in terms of correction of astigmatism. Furthermore, it is disadvantageous for reduction in the size since more space from the second lens group is required in order to avoid any mechanical interference when the magnification of the zoom lens is varied.

The lower limit value in the conditional formula (2-8) is preferably −2.4, and is more preferably −2.3. The upper limit value is preferably −0.45, and is more preferably −0.5.

For example, preferably the following conditional formula (2-8a) should be satisfied, and more preferably the following conditional formula (2-8b) should be satisfied:

$$-2.4 < (R_{13}+R_{14})/(R_{13}-R_{14}) < -0.45 \tag{2-8a}$$

$$-2.3 < (R_{13}+R_{14})/(R_{13}-R_{14}) < -0.5 \tag{2-8b}$$

In the zoom lens according to the second aspect of the present invention, the positive-power second lens in the first lens group preferably has aspherical surfaces on the two sides.

In this case, it is more preferable to provide the object side surface with an aspherical shape in which the positive refractive power is higher at the outer periphery portion of the lens. By this, the outer diameter of the negative-power first lens in the first lens group can be reduced, and distortion and astigmatism in the wide-angle end can be effectively corrected. For the same reason, it is more preferable to provide the image side surface with an aspherical shape in which the positive refractive power is higher at the outer periphery portion of the lens.

Furthermore, the aspherical shape preferably satisfies the following conditional formula (2-9):

$$0.01 < (A_{sp12F}-A_{sp12R})/f_W < 0.05 \tag{2-9}$$

where $A_{sp12F}$ and $A_{sp12R}$ are amounts of displacement of surface with respect to a datum spherical surface having paraxial radius of curvature of the aspherical surfaces at effective diameters of aspherical surfaces of the object side and the image side in the positive-power second lens in the first lens group, respectively, and $f_W$ is the focal length of the entire zoom lens in the wide-angle end.

The conditional formula (2-9) defines a more preferable aspherical shape by the value of $(A_{sp12F}-A_{sp12R})/f_W$.

If the amount of asphericity increases, with $(A_{sp12F}-A_{sp12R})/f_W$ exceeding the upper limit defined in the conditional formula (2-9), correction of off-axial coma aberration is difficult. If the lower limit is not reached, the negative distortion cannot be corrected sufficiently, and off-axial curvature of field and astigmatic difference cannot be corrected.

The lower limit value in the conditional formula (2-9) is preferably 0.015, and more preferably is 0.02. The upper limit value is preferably 0.04, and more preferably is 0.03.

For example, preferably the following conditional formula (2-9a) should be satisfied, and more preferably the following conditional formula (2-9b) should be satisfied:

$$0.015 < (A_{sp12F} - A_{sp12R})/f_W < 0.04 \quad (2\text{-}9a)$$

$$0.02 < (A_{sp12F} - A_{sp12R})/f_W < 0.03 \quad (2\text{-}9b)$$

Furthermore, in the zoom lens according to the second aspect of the present invention, the third lens group preferably moves to the image side in a convex locus when the magnification of the zoom lens is varied from the wide-angle end to the telephoto end.

In this case, allowance of adjustment is ensured especially at the telephoto end in which variance in the focus point is great due to fabrication error.

Furthermore, in the zoom lens according to the second aspect of the present invention, the third lens group is made up of one positive-power lens.

In this structure, aberration can be corrected to a practical level, and the size of the zoom lens can be reduced by reducing the number of lenses.

When the third lens group is configured to be movable upon varying magnifying power, or the focusing is done by means of the third lens group, fluctuation of aberration becomes problematic. If more asphericity than necessary is included in the third lens group, astigmatism that remains in the first lens group and the second lens group is required to be corrected by the third lens group in order for the lens configuration to be effective. In this case, moving the third lens group for focusing or the like is undesirable since the balance for the correction of aberration is lost.

Accordingly, in the zoom lens according to the second aspect of the present invention, all of lens surfaces of the third lens group are preferably made of spherical surfaces rather than aspherical surfaces.

In this case, the total thickness of the lens unit upon being collapsed can be reduced, and fluctuation of aberration can be suppressed even when focusing is done by means of the third lens group.

Furthermore, in the zoom lens according to the second aspect of the present invention, the aperture stop is preferably positioned between the first lens group and the second lens group.

In this case, the position of the entrance pupil can be shallower, and accordingly the diameter of the front lens can be reduced. Consequently, the thickness of the lens can be reduced on the optical axis, thereby enabling reduction in the thickness.

In addition, since the position of the exit pupil can be set to be distant from the image formation position, the angle of beams emitted to an image pickup element, such as a CCD, can be reduced and shading at the corners of the picture can be prevented.

The aperture stop preferably moves together with the second lens group when the magnification of the zoom lens is varied.

This structure is advantageous in that this enables a simpler mechanism and that less useless space is created when collapsed. In addition, the difference in F number between the wide-angle end and the telephoto end is reduced.

The image pickup apparatus according to the second aspect of the present invention includes the zoom lens according to the second aspect of the present invention and an image pickup element positioned at the image formation position of the zoom lens.

According to this invention, since an image of a subject can be formed on the image pickup element using the zoom lens according to the second aspect of the present invention, the image pickup apparatus has the same advantageous effects as the zoom lens according to the second aspect of the present invention.

It should be noted that each of the conditional formulae or configurations described above can be combined if needed to obtain a better zoom lens and/or an electronic image pickup apparatus. For each of the above-described conditional formulae, only the upper limit value or the lower limit value thereof can be defined by an upper limit value or a lower limit value of a more preferable conditional formula. In addition, the upper limit value or the lower limit value may be that of a conditional formula of examples described later.

In the following, embodiments of the second aspect of the present invention will be described with reference to the attached drawings.

FIRST EMBODIMENT OF SECOND ASPECT

A camera according to a second embodiment of the first aspect of the present invention will be described.

Parts (a), (b), and (c) of FIG. 14 are cross-sectional views of a first example of the zoom lens according to the first embodiment of the second aspect of the present invention in the wide-angle end, the middle focal length position, and the telephoto end, respectively, when the zoom lens is focused on an object point at infinity. In this figure, reference symbol I indicates an image surface. Detailed numerical examples of this example will be described as Example 2-1.

A first exemplary zoom lens 2100 of this example generally includes a first lens group G1, a second lens group G2, a third lens group G3, and a group of parallel plates F, which are arranged in order from an object side thereof, as shown in Part (a) of FIG. 14.

The first lens group G1 includes a negative-power lens L201 (negative-power first lens) and a positive-power lens L202 (positive-power second lens) in order from an object side thereof, defining a lens group having a negative refractive power.

The negative-power lens L201 include a lens that has a concave surface having a larger curvature on the image side than that of the object side surface, and the concave surface on the image side includes an aspherical surface. It is made of a glass material having a refractive index of 1.75 or higher for the d-line.

The positive-power lens L202 is a positive meniscus lens that faces the convex surface to the object side. It is made of a glass material having a refractive index of 1.85 or higher for the d-line.

In the following, the negative-power lens L201 and the positive-power lens L202 may be simply referred as the lens L201 or L202 as long as there is no possibility of being misunderstood.

The second lens group G2 includes a positive-power lens L203 (positive-power first lens), a cemented lens L204, and a positive-power lens L207 (positive-power fourth lens) in order from an object side thereof, defining a lens group having a negative refractive power. An aperture stop S that moves together with the second lens group G2 when the magnification of the zoom lens is varied is provided at the object side of the second lens group G2.

The positive-power lens L203 includes a biconvex lens that has aspherical surfaces on the two sides.

The cemented lens L204 includes a positive-power lens L205 (positive-power second lens) including a positive meniscus lens that faces the convex surface to the object side, and a negative-power lens L206 (negative-power third lens) including a negative meniscus lens that faces the convex surface to the object side in order from an object side thereof. Each lens surface of the positive-power lens L206 and the negative-power lens L206 have spherical surfaces.

The positive-power lens L207 includes a single lens that faces the convex surface to the image side and has an aspherical surface on convex surface on the image side.

The third lens group G3 includes a positive-power lens L208 (positive single lens) that includes a biconvex single lens having only spherical surfaces on the two sides.

The group of parallel plates F may have any desired characteristics that are achieved by an image pickup element or the like provided to the image surface I. In this embodiment, it includes an optical low-pass filter F1 and a cover glass GL in order from an object side thereof, and is positioned between the last lens group and the image surface I in an immobile manner.

As the optical low-pass filter F1, a birefringent low-pass filter that is made of a quartz plate in which the orientation of crystal axis thereof is adjusted, or a phase low-pass filter that provides optical cut-off frequency characteristic by means of the diffraction effect may be preferably used.

The cover glass GL is a cover glass for disposing an image pickup element such as a CCD.

Other examples include, for example, an infrared light blocking filter in which an evaporated film that blocks infrared light is provided on a parallel plate.

It should be noted that all or part of these components may be omitted in some cases.

As shown in Parts (a), (b), and (c) of FIG. 14, in the zoom lens 2100, the first lens group G1 moves along the optical axis to the image side in a convex locus, the second lens group G2 moves together with the aperture stop S along the optical axis only to the object side, and the third lens group G3 moves in an amount different from that of the second lens group G2 along the optical axis to the image side in a convex locus when the magnification of the zoom lens is varied from the wide-angle end to the telephoto end upon focusing an object point at infinity. The third lens group G3 is configured to be movable for focusing.

Next, a second example of the zoom lens according to this embodiment will be described.

Parts (a), (b), and (c) of FIG. 15 are cross-sectional views of a second example of zoom lens according to the first embodiment of the second aspect of the present invention in the wide-angle end, the middle focal length position, and the telephoto end, respectively, when the zoom lens is focused on an object point at infinity. In this figure, reference symbol I indicates an image surface. Detailed numerical examples of this example will be described as Example 2-2.

As shown in Part (a) of FIG. 15, a second example of the zoom lens 2101 generally includes lenses L210 to L217 that correspond to the lenses L201 to L208 of the first example of the above-described embodiment and have the same refractive power types (positive or negative) and the same types of lens shape as the lenses L201 to L208. The aperture stop S and the group of parallel plates F are the same as those of the first example.

As shown in Parts (a), (b), and (c) of FIG. 15, in the zoom lens 2101, the first lens group G1 moves along the optical axis to the image side in a convex locus, the second lens group G2 moves together with the aperture stop S along the optical axis only to the object side, and the third lens group G3 moves in an amount different from that of the second lens group G2 along the optical axis to the image surface side when the magnification of the zoom lens is varied from the wide-angle end to the telephoto end upon focusing an object point at infinity. The third lens group G3 is configured to be movable for focusing.

Next, a third example of the zoom lens according to this embodiment will be described.

Parts (a), (b), and (c) of FIG. 16 are cross-sectional views of a third example of zoom lens according to the first embodiment of the second aspect of the present invention in the wide-angle end, the middle focal length position, and the telephoto end, respectively, when the zoom lens is focused on an object point at infinity. In this figure, reference symbol I indicates an image surface. Detailed numerical examples of this example will be described as Example 2-3.

As shown in Part (a) of FIG. 16, a third example of the zoom lens 2102 generally includes lenses L220, L222 to L225, and L227 that correspond to the lenses L201, L203 to L206, and L208 of the first example of the above-described embodiment and have the same refractive power types (positive or negative) and the same types of lens shape as the lenses L201, L203 to L206, and L208.

It also includes a positive-power lens L221 (positive-power second lens) and a positive-power lens L226 (positive-power fourth lens) instead of the positive-power lens L203 and the positive-power lens L207 of the first example, respectively.

The positive-power lens L221 includes a single lens that has a positive refractive power by having aspherical surfaces on the two sides. It is made of a glass material having a refractive index of less than 1.85 for the d-line.

The positive-power lens L226 includes a single lens that has the convex surface to the image side and has an aspherical surface on convex surface on the image side.

The aperture stop S and the group of parallel plates F are the same as those of the first example.

As shown in Parts (a), (b), and (c) of FIG. 16, in the zoom lens 2102, the first lens group G1 moves along the optical axis to the image side in a convex locus, the second lens group G2 moves together with the aperture stop S along the optical axis only to the object side, and the third lens group G3 moves in an amount different from that of the second lens group G2 along the optical axis when the magnification of the zoom lens is varied from the wide-angle end to the telephoto end upon focusing an object point at infinity. The third lens group G3 is configured to be movable for focusing.

Next, a fourth example of the zoom lens according to this embodiment will be described.

Figure 17:
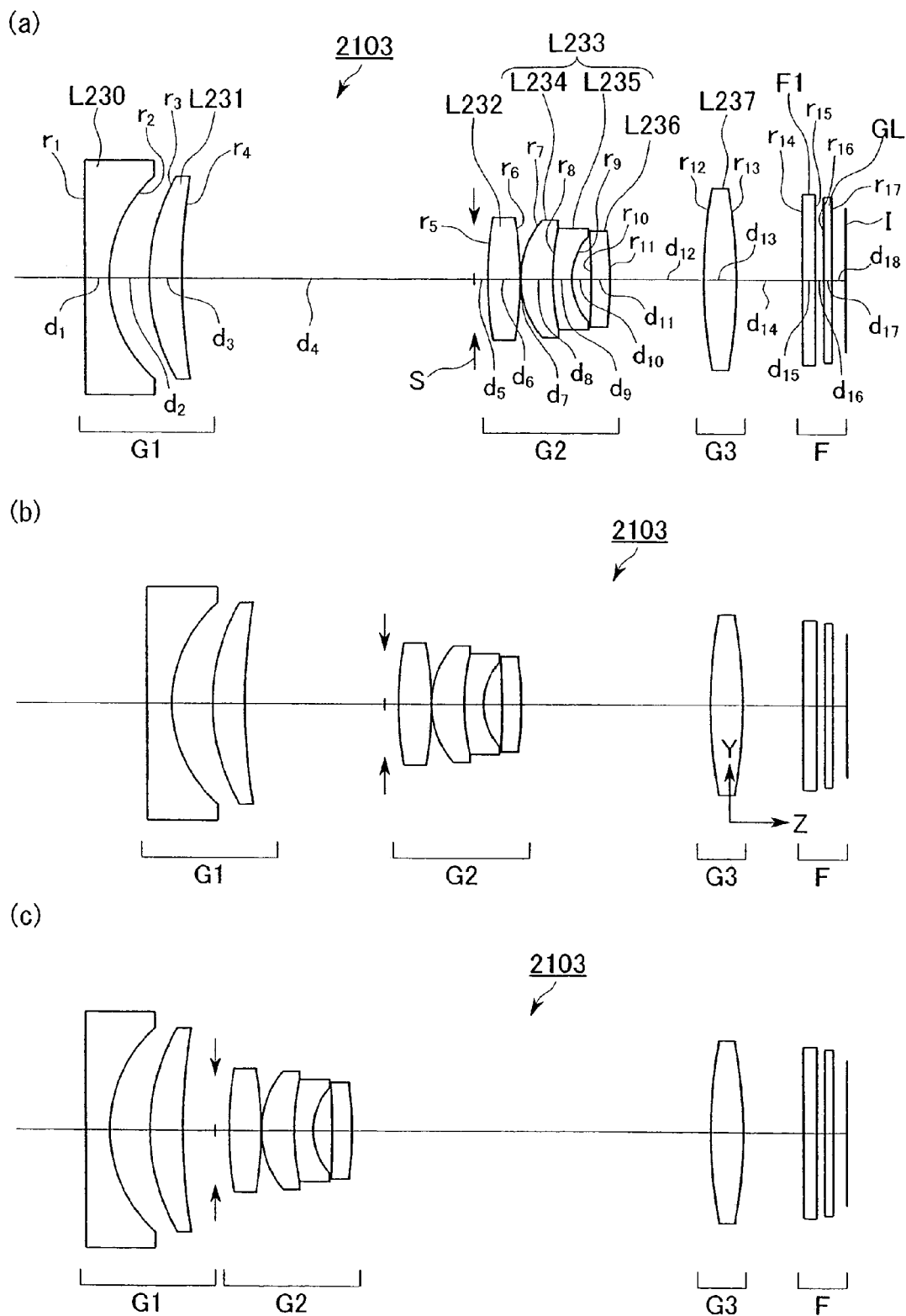
FIG. 17 is a cross-sectional view of a fourth example of the zoom lens in the wide-angle end, the middle focal length position, and the telephoto end respectively, when the zoom lens is focused on an object point at infinity, similar to FIG. 14.

Parts (a), (b), and (c) of FIG. 17 are cross-sectional views of a fourth example of zoom lens according to the first embodiment of the second aspect of the present invention in the wide-angle end, the middle focal length position, and the telephoto end, respectively, when the zoom lens is focused on an object point at infinity. In this figure, reference symbol I indicates an image surface. Examples of specific values of this will be described as Example 2-4.

As shown in Part (a) of FIG. 17, a second example of the zoom lens 2103 generally includes lenses L230 to 235, and L237 that correspond to the lenses L201 to 206, and L208 of the first example of the above-described embodiment and have the same refractive power types (positive or negative) and the same types of lens shape as the lenses L201 to 206, and L208.

It also includes a positive-power lens L236 (positive-power fourth lens) instead of the positive-power lens L207 of the first example.

The positive-power lens L236 includes a single lens that has the convex surface to the image side and has spherical surfaces on the two sides.

The aperture stop S and the group of parallel plates F are the same as those of the first example.

As shown in Parts (a), (b), and (c) of FIG. 17, in the zoom lens 2103, the first lens group G1 moves along the optical axis to the image side in a convex locus, the second lens group G2 moves together with the aperture stop S along the optical axis only to the object side, and the third lens group G3 moves in an amount different from that of the second lens group G2 along the optical axis when the magnification of the zoom lens is varied from the wide-angle end to the telephoto end upon focusing an object point at infinity. The third lens group G3 is configured to be movable for focusing.

It should be noted that the configurations of the lenses within the groups are merely presented as examples, and aspherical surfaces may be provided differently or the configuration of the groups may be changed as long as a desired positive or negative power for each of the lens group is obtained. For example, although the image side surface in the first lens group has been described as having an aspherical surface, at least one aspherical surface may be an object side surface. Furthermore, although the two sides of the positive-power first lens in the second lens group has been described as having aspherical surfaces in the two sides of the positive-power first lens, the at least two aspherical surfaces may be any surface other than the cemented surface of the cemented lens. For example, they may be a surface of cemented lens that is closest to the object side, or the surface closest to the image side may be aspherical.

The first embodiment described above is preferably configured to satisfy a suitable combination of the above-described conditional formulae.

EXAMPLE 2-1

In the following, structural parameters of an optical system of a first numerical example corresponding to the zoom lenses of the first example of the first embodiment described above will be described. In addition to the symbols described above, the following symbols will be used, and the symbols will be used commonly for each example:

f represents the focal length of the entire system, FNO represents an F number, W represents the wide-angle end, S represents the middle focal length position, and T represents the telephoto end. $r_1, r_2, \ldots$ represent the radii of curvature of each lens surface, $d_1, d_2, \ldots$ represent spacing between each lens surface, which correspond reference symbols used in Part (a) of FIG. 14. In addition, $n_{d1}, n_{d2}, \ldots$ represent refractive indices of each lens for the d-line, and $v_{d1}, v_{d2}, \ldots$ represent the Abbe numbers of each lens. These symbols are commonly used for all of the drawings that will be referred to later.

An aspherical shape can be expressed by the following formula (a) provided that z represents a direction of the optical axis, and y represents a direction that is orthogonal to the optical axis:

$$z = (y^2/r)/[1+\sqrt{1-(1+K)\cdot(y/r)^2}] + A_4 y^4 + A_6 y^6 + A_8 y^8 + A_{10} y^{10} \quad (2\text{-}a)$$

where r is a paraxial radius of curvature, K is a conical coefficient, and $A_4$, $A_6$, $A_8$, and $A_{10}$ are the fourth, sixth, eighth and tenth aspheric coefficients, respectively.

| Surface Number | Radius of Curvature | Spacing between Surface | Refractive Index | Abbe Number |
|---|---|---|---|---|
| 1 | $r_1 = \infty$ | $d_1 = 1.50$ | $n_{d1} = 1.77377$ | $v_{d1} = 47.17$ |
| 2 | $r_2 = 7.265$ (aspherical) | $d_2 = 2.63$ | | |
| 3 | $r_3 = 12.816$ | $d_3 = 2.20$ | $n_{d2} = 1.80518$ | $v_{d2} = 25.42$ |
| 4 | $r_4 = 39.500$ | $d_4 = $ (variable) | | |
| 5 | $r_5 = \infty$ (stop) | $d_5 = 0.80$ | | |
| 6 | $r_6 = 14.805$ (aspherical) | $d_6 = 1.82$ | $n_{d3} = 1.74330$ | $v_{d3} = 49.33$ |
| 7 | $r_7 = -42.582$ (aspherical) | $d_7 = 0.08$ | | |
| 8 | $r_8 = 5.519$ | $d_8 = 2.52$ | $n_{d4} = 1.51633$ | $v_{d4} = 64.14$ |
| 9 | $r_9 = 16.682$ | $d_9 = 0.65$ | $n_{d5} = 1.80518$ | $v_{d5} = 25.42$ |
| 10 | $r_{10} = 4.631$ | $d_{10} = 1.25$ | | |
| 11 | $r_{11} = 1148.788$ | $d_{11} = 1.38$ | $n_{d6} = 1.51633$ | $v_{d6} = 64.14$ |
| 12 | $r_{12} = -31.519$ (aspherical) | $d_{12} = $ (variable) | | |
| 13 | $r_{13} = 42.164$ | $d_{13} = 2.01$ | $n_{d7} = 1.74400$ | $v_{d7} = 44.78$ |
| 14 | $r_{14} = -33.209$ | $d_{14} = $ (variable) | | |
| 15 | $r_{15} = \infty$ | $d_{15} = 0.95$ | $n_{d8} = 1.54771$ | $v_{d8} = 62.84$ |
| 16 | $r_{16} = \infty$ | $d_{16} = 0.55$ | | |
| 17 | $r_{17} = \infty$ | $d_{17} = 0.50$ | $n_{d9} = 1.51633$ | $v_{d9} = 64.14$ |
| 18 | $r_{18} = \infty$ | $d_{18} = $ (variable) | | |
| I | $\infty$ (image surface) | | | |

[Aspherical Coefficients]

| surface number | K | $A_4$ | $A_6$ | $A_8$ | $A_{10}$ |
|---|---|---|---|---|---|
| 2 | −0.694 | $3.79934 \times 10^{-6}$ | $3.02207 \times 10^{-12}$ | $4.80234 \times 10^{-12}$ | $-4.18324 \times 10^{-11}$ |
| 6 | 7.272 | $-5.06557 \times 10^{-4}$ | $-1.23961 \times 10^{-5}$ | $-1.87104 \times 10^{-9}$ | $-1.87517 \times 10^{-8}$ |
| 7 | −43.291 | $-2.56756 \times 10^{-4}$ | $-4.98807 \times 10^{-6}$ | $7.55902 \times 10^{-8}$ | $-8.45234 \times 10^{-9}$ |
| 12 | 0.000 | $1.68492 \times 10^{-4}$ | $-2.27448 \times 10^{-6}$ | $1.41768 \times 10^{-6}$ | $-6.47233 \times 10^{-8}$ |

[Zoom Data]

| | W | S | T |
|---|---|---|---|
| f (mm) | 8.072 | 13.438 | 23.273 |
| FNO | 2.87 | 3.73 | 5.16 |
| $d_4$ | 18.51 | 8.96 | 1.99 |
| $d_{12}$ | 6.11 | 12.81 | 22.97 |
| $d_{14}$ | 4.17 | 3.40 | 3.83 |
| $d_{18}$ | 0.80 | 0.80 | 0.80 |

Figure 18:
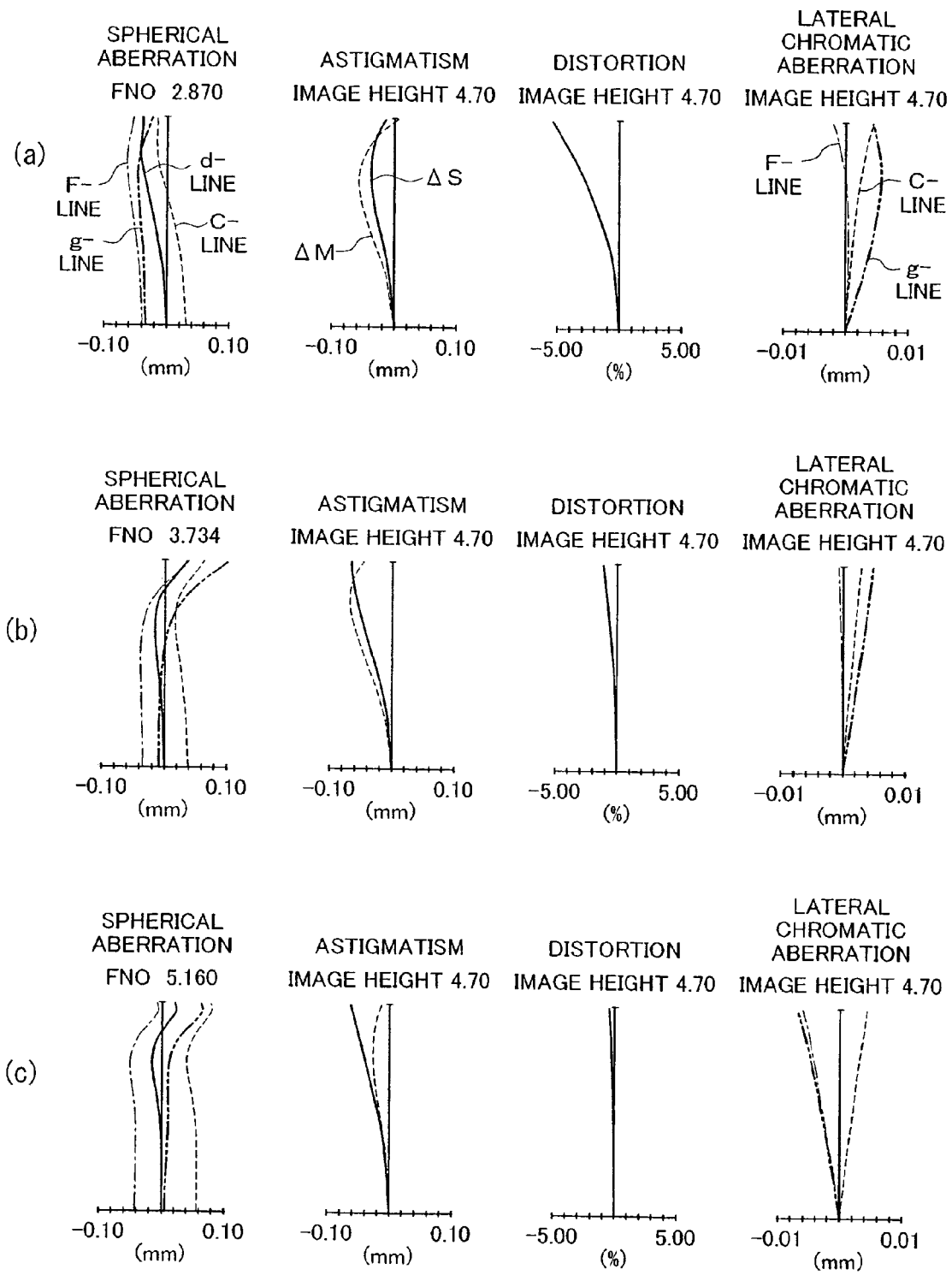
FIG. 18 is aberration curves of Example 2-1 in the wide-angle end, the middle focal length position, and the telephoto end.

Aberration curves of this example are shown in Parts (a), (b), and (c) of FIG. 18. Each drawing corresponds to the wide-angle end (W), the middle focal length position (S), or the telephoto end (T). The drawings are a spherical aberration diagram, an astigmatism diagram, a distortion diagram, and a diagram of chromatic difference of magnification from left to right. The units of each of the horizontal axes are millimeter (mm), millimeter (mm), percent (%), or millimeter (mm).

These diagrams indicate that each of the aberrations is corrected satisfactorily in this example.

The calculated values for each of the conditional formulae will be summarized later.

EXAMPLE 2-2

In the following, structural parameters of an optical system of a second numerical example corresponding to the zoom lenses of the second example (see FIG. 15) of the second embodiment described above will be described.

| Surface Number | Radius of Curvature | Spacing between Surface | Refractive Index | Abbe Number |
|---|---|---|---|---|
| 1 | $r_1 = \infty$ | $d_1 = 1.50$ | $n_{d1} = 1.77377$ | $\nu_{d1} = 47.18$ |
| 2 | $r_2 = 6.812$ (aspherical) | $d_2 = 2.20$ | | |
| 3 | $r_3 = 12.179$ | $d_3 = 2.35$ | $n_{d2} = 1.90367$ | $\nu_{d2} = 31.32$ |
| 4 | $r_4 = 40.524$ | $d_4 = $ (variable) | | |
| 5 | $r_5 = \infty$ (stop) | $d_5 = 0.80$ | | |
| 6 | $r_6 = 14.507$ (aspherical) | $d_6 = 2.12$ | $n_{d3} = 1.74330$ | $\nu_{d3} = 49.33$ |
| 7 | $r_7 = -37.838$ (aspherical) | $d_7 = 0.10$ | | |
| 8 | $r_8 = 5.549$ | $d_8 = 2.04$ | $n_{d4} = 1.48749$ | $\nu_{d4} = 70.23$ |
| 9 | $r_9 = 11.872$ | $d_9 = 1.13$ | $n_{d5} = 1.80518$ | $\nu_{d5} = 25.42$ |
| 10 | $r_{10} = 4.276$ | $d_{10} = 1.28$ | | |
| 11 | $r_{11} = 98.456$ | $d_{11} = 1.86$ | $n_{d6} = 1.51633$ | $\nu_{d6} = 64.14$ |
| 12 | $r_{12} = -27.195$ (aspherical) | $d_{12} = $ (variable) | | |
| 13 | $r_{13} = 27.602$ | $d_{13} = 1.97$ | $n_{d7} = 1.60311$ | $\nu_{d7} = 60.70$ |
| 14 | $r_{14} = -31.375$ | $d_{14} = $ (variable) | | |
| 15 | $r_{15} = \infty$ | $d_{15} = 0.95$ | $n_{d8} = 1.54771$ | $\nu_{d8} = 62.84$ |
| 16 | $r_{16} = \infty$ | $d_{16} = 0.55$ | | |
| 17 | $r_{17} = \infty$ | $d_{17} = 0.50$ | $n_{d9} = 1.51633$ | $\nu_{d9} = 64.14$ |
| 18 | $r_{18} = \infty$ | $d_{18} = $ (variable) | | |
| I | $\infty$ (image surface) | | | |

[Aspherical Coefficients]

| Surface Number | K | $A_4$ | $A_6$ | $A_8$ | $A_{10}$ |
|---|---|---|---|---|---|
| 2 | −0.661 | $-1.18095 \times 10^{-5}$ | $-5.16857 \times 10^{-7}$ | $-8.68102 \times 10^{-10}$ | $-3.63804 \times 10^{-11}$ |
| 6 | 7.386 | $-5.88389 \times 10^{-4}$ | $-1.77024 \times 10^{-5}$ | $2.94038 \times 10^{-10}$ | $-1.44443 \times 10^{-8}$ |
| 7 | −35.173 | $-3.16877 \times 10^{-4}$ | $-9.12370 \times 10^{-6}$ | $1.33506 \times 10^{-7}$ | $-2.25341 \times 10^{-10}$ |
| 12 | 0.000 | $-1.33259 \times 10^{-4}$ | $-1.89869 \times 10^{-5}$ | $1.62043 \times 10^{-6}$ | $-1.96646 \times 10^{-7}$ |

[Zoom Data]

| | W | S | T |
|---|---|---|---|
| f (mm) | 8.068 | 13.438 | 23.275 |
| FNO | 2.77 | 3.59 | 5.01 |

-continued

| | W | S | T |
|---|---|---|---|
| $d_4$ | 18.96 | 8.95 | 2.00 |
| $d_{12}$ | 5.52 | 12.09 | 21.96 |
| $d_{14}$ | 3.79 | 2.77 | 2.00 |
| $d_{18}$ | 0.80 | 0.80 | 0.80 |

Figure 19:
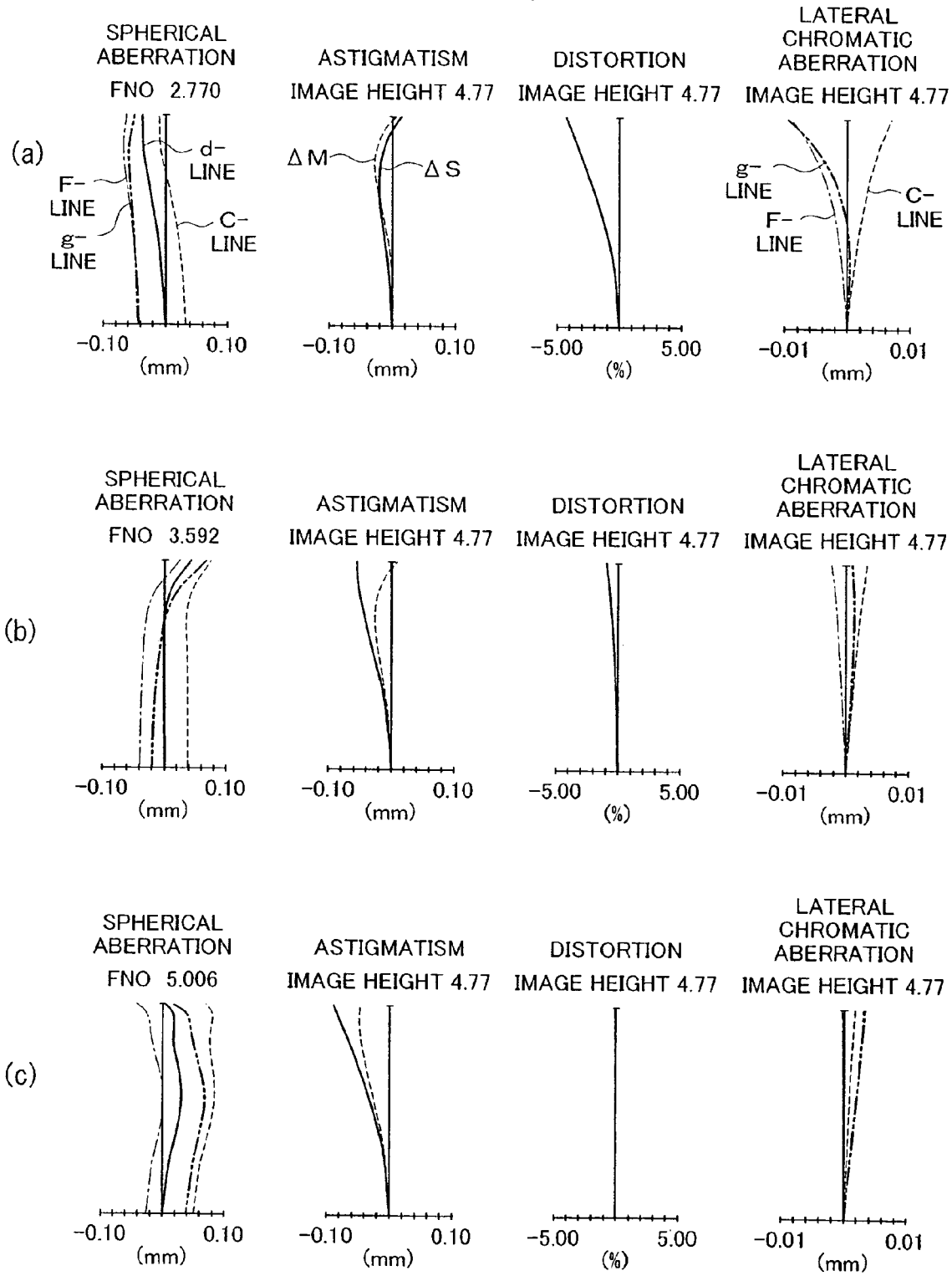
FIG. 19 is aberration curves of Example 2-2 in the wide-angle end, the middle focal length position, and the telephoto end.

Aberration curves of this example are shown in Parts (a), (b), and (c) of FIG. 19. Each drawing corresponds to the wide-angle end (W), the middle focal length position (S), or the telephoto end (T). The drawings are a spherical aberration diagram, an astigmatism diagram, a distortion diagram, and a diagram of chromatic difference of magnification from left to right. The units of each of the horizontal axes are millimeter (mm), millimeter (mm), percent (%), or millimeter (mm).

These diagrams indicate that each of the aberrations is corrected satisfactorily in this example.

The calculated values for each of the conditional formulae will be summarized later.

EXAMPLE 2-3

In the following, structural parameters of an optical system of a third numerical example corresponding to the zoom lenses of the third example (see FIG. 16) of the third embodiment described above will be described.

| Surface Number | Radius of Curvature | Spacing between Surface | Refractive Index | Abbe Number |
|---|---|---|---|---|
| 1 | $r_1 = \infty$ | $d_1 = 1.50$ | $n_{d1} = 1.80610$ | $\nu_{d1} = 40.92$ |
| 2 | $r_2 = 8.753$ | $d_2 = 2.71$ | | |
| 3 | $r_3 = 29.169$ (aspherical) | $d_3 = 2.35$ | $n_{d2} = 1.84666$ | $\nu_{d2} = 23.78$ |
| 4 | $r_4 = -102.659$ (aspherical) | $d_4 = $ (variable) | | |
| 5 | $r_5 = \infty$ (stop) | $d_5 = 0.80$ | | |
| 6 | $r_6 = 14.140$ (aspherical) | $d_6 = 2.10$ | $n_{d3} = 1.58313$ | $\nu_{d3} = 59.46$ |
| 7 | $r_7 = -24.946$ (aspherical) | $d_7 = 0.10$ | | |
| 8 | $r_8 = 5.904$ | $d_8 = 2.08$ | $n_{d4} = 1.69100$ | $\nu_{d4} = 54.82$ |
| 9 | $r_9 = 13.607$ | $d_9 = 1.37$ | $n_{d5} = 1.80518$ | $\nu_{d5} = 25.42$ |
| 10 | $r_{10} = 4.124$ | $d_{10} = 1.46$ | | |

-continued

| Surface Number | Radius of Curvature | Spacing between Surface | Refractive Index | Abbe Number |
|---|---|---|---|---|
| 11 | $r_{11} = -131.935$ | $d_{11} = 1.47$ | $n_{d6} = 1.51633$ | $\nu_{d6} = 64.14$ |

-continued

| Surface Number | Radius of Curvature | Spacing between Surface | Refractive Index | Abbe Number |
|---|---|---|---|---|
| 12 | $r_{12} = -75.520$ (aspherical) | $d_{12}$ = (variable) | | |
| 13 | $r_{13} = 23.098$ | $d_{13} = 2.22$ | $n_{d7} = 1.60311$ | $v_{d7} = 60.70$ |
| 14 | $r_{14} = -22.809$ | $d_{14}$ = (variable) | | |
| 15 | $r_{15} = \infty$ | $d_{15} = 0.95$ | $n_{d8} = 1.54771$ | $v_{d8} = 62.84$ |
| 16 | $r_{16} = \infty$ | $d_{16} = 0.55$ | | |
| 17 | $r_{17} = \infty$ | $d_{17} = 0.50$ | $n_{d9} = 1.51633$ | $v_{d9} = 64.14$ |
| 18 | $r_{18} = \infty$ | $d_{18}$ = (variable) | | |
| I | ∞ (image surface) | | | |

[Aspherical Coefficients]

| Surface Number | K | $A_4$ | $A_6$ | $A_8$ | $A_{10}$ |
|---|---|---|---|---|---|
| 3 | 0.000 | $5.74375 \times 10^{-5}$ | $-8.37511 \times 10^{-6}$ | $4.11074 \times 10^{-7}$ | $-5.28660 \times 10^{-9}$ |
| 4 | 0.000 | $-6.94729 \times 10^{-5}$ | $-7.63117 \times 10^{-6}$ | $3.77509 \times 10^{-7}$ | $-5.46523 \times 10^{-9}$ |
| 6 | 6.643 | $-6.02020 \times 10^{-4}$ | $-5.51363 \times 10^{-6}$ | $-7.20229 \times 10^{-7}$ | $8.33261 \times 10^{-9}$ |
| 7 | -0.550 | $-2.31108 \times 10^{-4}$ | $1.70053 \times 10^{-6}$ | $-6.41632 \times 10^{-7}$ | $1.97033 \times 10^{-8}$ |
| 12 | 0.000 | $1.51066 \times 10^{-4}$ | $-5.40629 \times 10^{-6}$ | $4.30502 \times 10^{-7}$ | $-1.15320 \times 10^{-7}$ |

[Zoom Data]

| | W | S | T |
|---|---|---|---|
| f (mm) | 8.068 | 13.438 | 23.275 |
| FNO | 2.86 | 3.83 | 5.29 |
| $d_4$ | 18.61 | 9.15 | 1.24 |
| $d_{12}$ | 4.60 | 11.63 | 20.83 |
| $d_{14}$ | 3.38 | 2.00 | 2.00 |
| $d_{18}$ | 0.90 | 0.90 | 0.90 |

Figure 20:
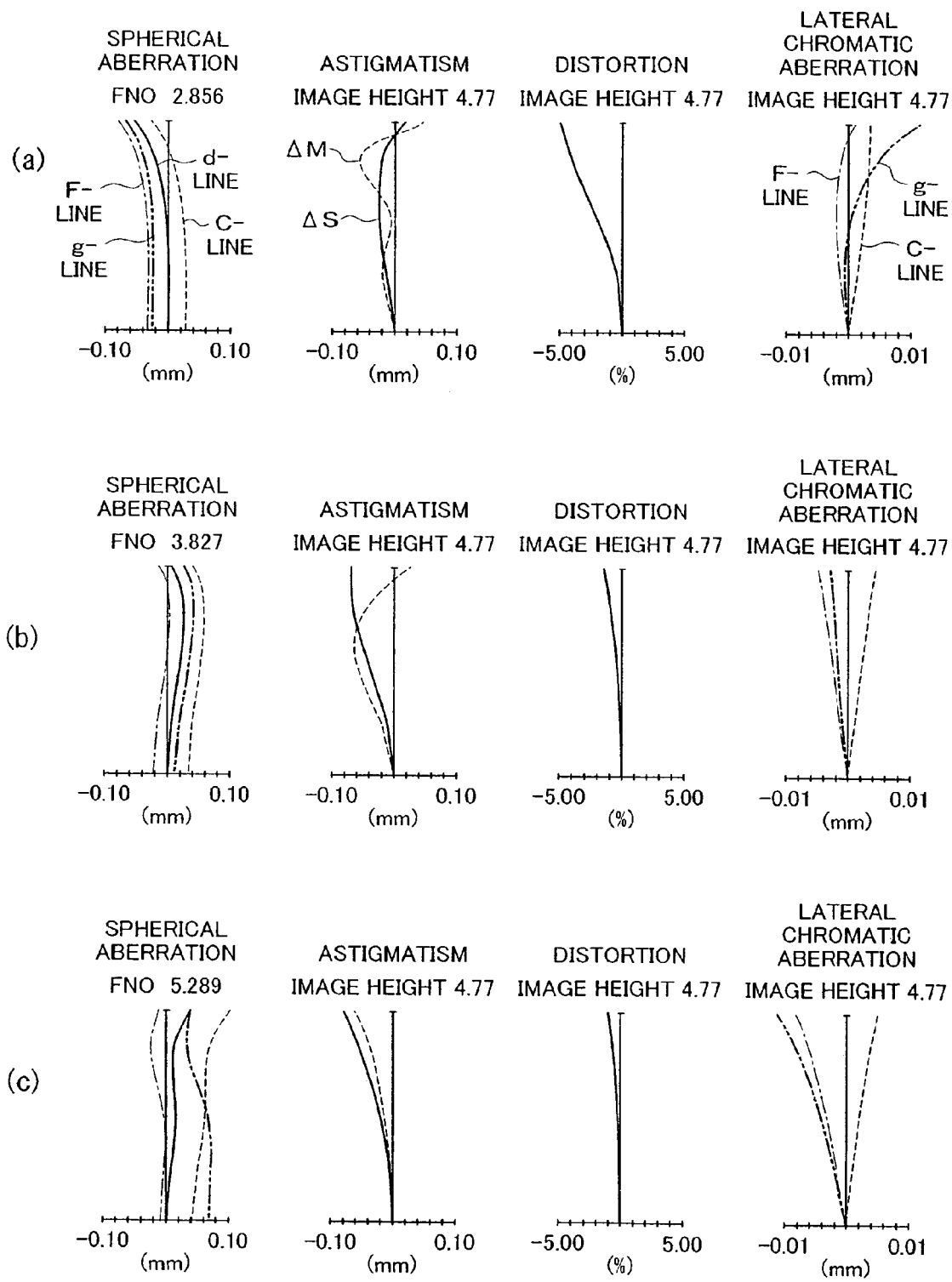
FIG. 20 is aberration curves of Example 2-3 in the wide-angle end, the middle focal length position, and the telephoto end.

Aberration curves of this example are shown in Parts (a), (b), and (c) of FIG. 20. Each drawing corresponds to the wide-angle end (W), the middle focal length position (S), or the telephoto end (T). The drawings are a spherical aberration diagram, an astigmatism diagram, a distortion diagram, and a diagram of chromatic difference of magnification from left to right. The units of each of the horizontal axes are millimeter (mm), millimeter (mm), percent (%), or millimeter (mm).

These diagrams indicate that each of the aberrations is corrected satisfactorily in this example.

The calculated values for each of the conditional formulae will be summarized later.

EXAMPLE 2-4

In the following, structural parameters of an optical system of a fourth numerical example corresponding to the zoom lenses of the fourth example (see FIG. 17) of the fourth embodiment described above will be described.

| Surface Number | Radius of Curvature | Spacing between Surface | Refractive Index | Abbe Number |
|---|---|---|---|---|
| 1 | $r_1 = \infty$ | $d_1 = 1.50$ | $n_{d1} = 1.77377$ | $v_{d1} = 47.17$ |
| 2 | $r_2 = 7.490$ (aspherical) | $d_2 = 2.72$ | | |
| 3 | $r_3 = 13.222$ | $d_3 = 2.11$ | $n_{d2} = 1.80518$ | $v_{d2} = 25.42$ |
| 4 | $r_4 = 38.308$ | $d_4$ = (variable) | | |
| 5 | $r_5 = \infty$ (stop) | $d_5 = 0.80$ | | |
| 6 | $r_6 = 16.536$ | $d_6 = 1.77$ | $n_{d3} = 1.74330$ | $v_{d3} = 49.33$ |

-continued

| Surface Number | Radius of Curvature | Spacing between Surface | Refractive Index | Abbe Number |
|---|---|---|---|---|
| | (aspherical) | | | |
| 7 | $r_7 = -41.171$ | $d_7 = 0.02$ | | |
| | (aspherical) | | | |
| 8 | $r_8 = 5.596$ | $d_8 = 2.48$ | $n_{d4} = 1.51633$ | $v_{d4} = 64.14$ |
| 9 | $r_9 = 16.030$ | $d_9 = 1.02$ | $n_{d5} = 1.80518$ | $v_{d5} = 25.42$ |
| 10 | $r_{10} = 4.623$ | $d_{10} = 1.02$ | | |
| 11 | $r_{11} = 1319.760$ | $d_{11} = 1.43$ | $n_{d6} = 1.51633$ | $v_{d6} = 64.14$ |
| 12 | $r_{12} = -24.853$ | $d_{12}$ = (variable) | | |
| 13 | $r_{13} = 37.064$ | $d_{13} = 2.07$ | $n_{d7} = 1.74400$ | $v_{d7} = 44.78$ |
| 14 | $r_{14} = -36.893$ | $d_{14}$ = (variable) | | |
| 15 | $r_{15} = \infty$ | $d_{15} = 0.95$ | $n_{d8} = 1.54771$ | $v_{d8} = 62.84$ |
| 16 | $r_{16} = \infty$ | $d_{16} = 0.55$ | | |
| 17 | $r_{17} = \infty$ | $d_{17} = 0.50$ | $n_{d9} = 1.51633$ | $v_{d9} = 64.14$ |
| 18 | $r_{18} = \infty$ | $d_{18}$ = (variable) | | |
| I | ∞ (image surface) | | | |

[Aspherical Coefficients]

| Surface Number | K | $A_4$ | $A_6$ | $A_8$ | $A_{10}$ |
|---|---|---|---|---|---|
| 2 | -0.697 | $7.65750 \times 10^{-6}$ | $-1.68254 \times 10^{-12}$ | $-1.42325 \times 10^{-15}$ | $-8.49690 \times 10^{-12}$ |
| 6 | 9.778 | $-4.32998 \times 10^{-4}$ | $-5.71365 \times 10^{-6}$ | $-4.70780 \times 10^{-8}$ | $-6.55631 \times 10^{-9}$ |

-continued

| Surface Number | K | $A_4$ | $A_6$ | $A_8$ | $A_{10}$ |
|---|---|---|---|---|---|
| 7 | −29.058 | $-1.46704 \times 10^{-4}$ | $1.20833 \times 10^{-6}$ | $7.61198 \times 10^{-8}$ | $2.82407 \times 10^{-9}$ |

[Zoom Data]

|  | W | S | T |
|---|---|---|---|
| f (mm) | 8.119 | 13.436 | 23.244 |
| FNO | 2.87 | 3.70 | 5.15 |
| $d_4$ | 18.31 | 8.63 | 1.99 |
| $d_{12}$ | 6.21 | 12.49 | 23.05 |
| $d_{14}$ | 4.16 | 3.76 | 3.87 |
| $d_{18}$ | 0.79 | 0.80 | 0.79 |

Figure 21:
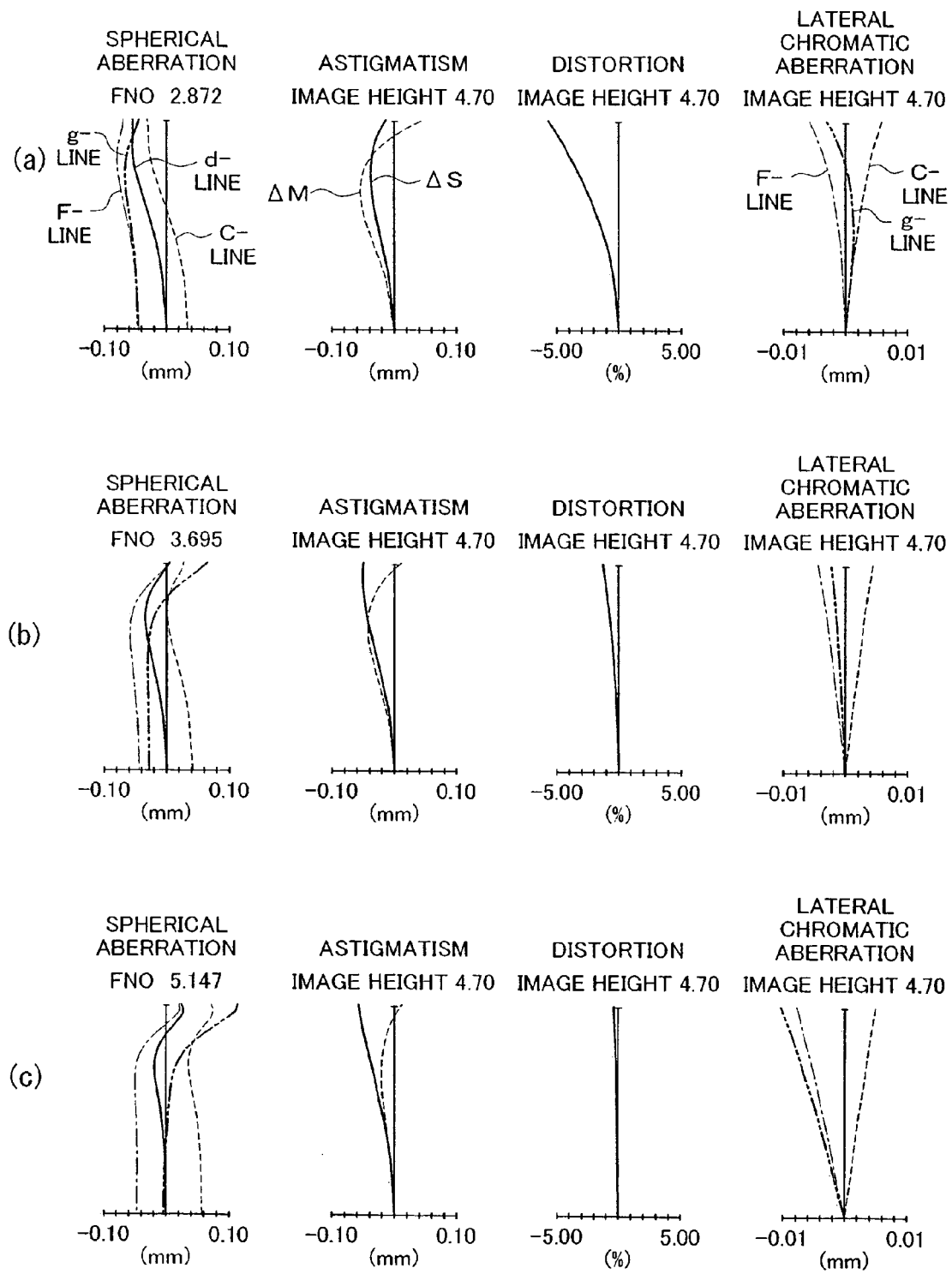
FIG. 21 is aberration curves of Example 2-4 in the wide-angle end, the middle focal length position, and the telephoto end.

Aberration curves of this example are shown in Parts (a), (b), and (c) of FIG. 21. Each drawing corresponds to the wide-angle end (W), the middle focal length position (S), or the telephoto end (T). The drawings are a spherical aberration diagram, an astigmatism diagram, a distortion diagram, and a diagram of chromatic difference of magnification from left to right. The units of each of the horizontal axes are millimeter (mm), millimeter (mm), percent (%), or millimeter (mm).

These diagrams indicate that each of the aberrations is corrected satisfactorily in this example.

The calculated values for each of the conditional formulae will be summarized later.

Values of the conditional formulae in Examples 2-1 to 2-4 are summarized in the following table:

TABLE 2

|  | Conditional Expression | Ex. 1 | Ex. 2 | Ex. 3 | Ex. 4 |
|---|---|---|---|---|---|
| $L_t/f_2$ | (2-1) | 3.22 | 3.07 | 2.94 | 3.23 |
| $f_W/f_3$ | (2-2) | 0.32 | 0.33 | 0.42 | 0.32 |
| $f_2/R_{2C}$ | (2-3) | 0.9 | 1.27 | 1.13 | 0.94 |
| $|X_2/f_1|$ | (2-4) | 0.87 | 0.72 | 0.67 | 0.87 |
| $|f_1/f_2|$ | (2-5) | 1.26 | 1.35 | 1.45 | 1.26 |
| $R_{23R}/R_{22F}$ | (2-6) | 0.84 | 0.77 | 0.7 | 0.83 |
| $|f_2/f_{23}|$ | (2-7) | 1.84 | 1.69 | 1.95 | 1.79 |
| $(R_{13} + R_{14})/(R_{13} − R_{14})$ | (2-8) | −1.96 | −1.86 | −0.56 | −2.05 |
| $(A_{sp12F} − A_{sp12R})/f_W$ | (2-9) | none | none | 0.022 | none |

SECOND EMBODIMENT OF SECOND ASPECT

A camera according to a second embodiment of the second aspect of the present invention will be described.

The zoom lens according to the second embodiment of the second aspect as described above may be applied to phototaking systems where object images formed through zoom lenses are received at image pickup devices such as CCDs, inter alia, digital cameras or video cameras as well as PCs and telephone sets that are typical information processors, in particular, easy-to-carry cellular phones. Given below are some such embodiments.

Figure 22:
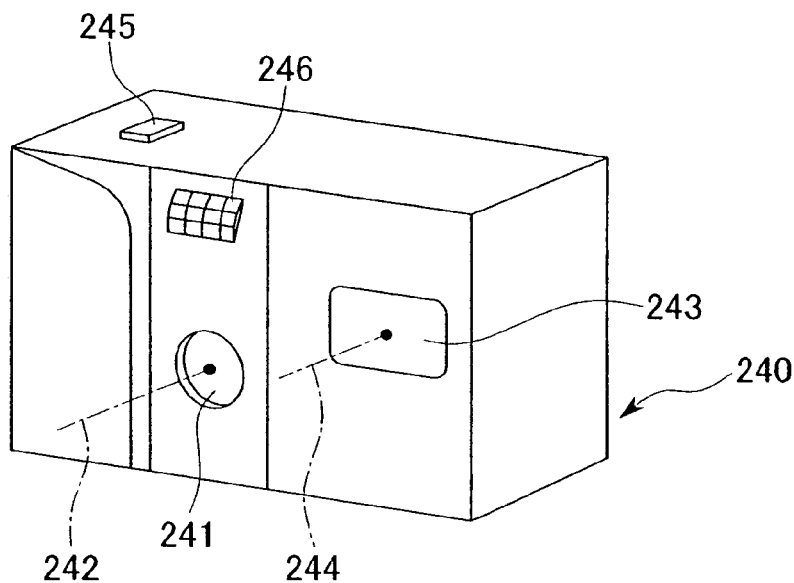
FIG. 22 is a front perspective schematic illustrative of the outside shape of a digital camera in which the zoom lens of the second aspect of the present invention is built.
Figure 23:
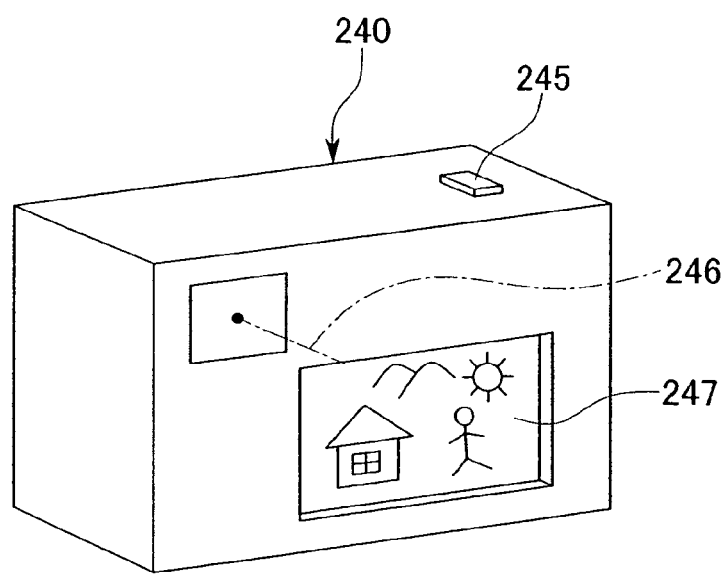
FIG. 23 is a back perspective view of the digital camera shown in FIG. 22.
Figure 24:
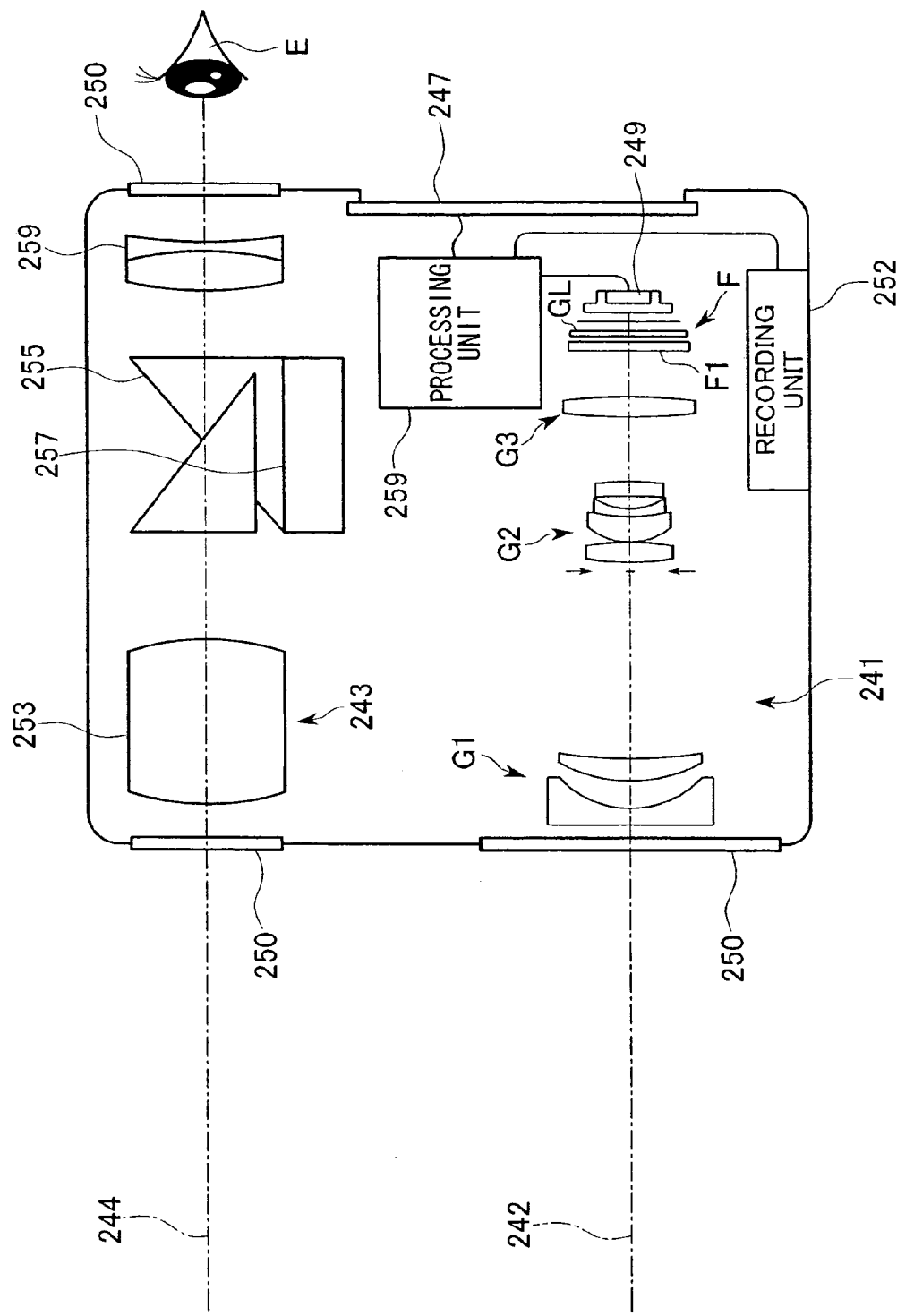
FIG. 24 is a cross-sectional of the outside shape of a digital camera in which the zoom lens of the second aspect of the present invention is built.

FIGS. 22 to 24 are conceptual illustrations of a phototaking optical system 241 for digital cameras, in which the zoom lens of the present invention is built. FIG. 22 is a front perspective view of the outside shape of a digital camera 240, FIG. 23 is a rear perspective view of the same, and FIG. 24 is a cross-sectional view illustrating the structure of the digital camera 240.

In this embodiment, the digital camera 240 (camera) includes a phototaking optical system 241 (zoom lens) including a phototaking optical path 242, a finder optical system 244 including a finder optical path 244, a shutter 245, a flash 246, a liquid crystal monitor 247 and so on. As the shutter 245 mounted on the upper portion of the camera 240 is pressed down, phototaking takes place through the phototaking optical system 241, for instance, the zoom lens 2100, 2101, 2102, 2103, or 2104 according to the first embodiment. An object image formed by the phototaking optical system 241 is formed on the image pickup plane of a CCD 249 (image pickup element) via an optical low-pass filter LF and a cover glass GL. The object image received at CCD 249 is shown as an electronic image on the liquid crystal monitor 247 via processing means 251, which monitor is mounted on the back of the camera. This processing means 251 is connected with recording means 252 in which the phototaken electronic image may be recorded. It is here noted that the recording means 252 may be provided separately from the processing means 251 or, alternatively, it may be constructed in such a way that images are electronically recorded and written therein by means of floppy discs, memory cards, MOs or the like. This camera may also be constructed in the form of a silver halide camera using a silver halide film in place of CCD 249.

Moreover, a finder objective optical system 253 is located on the finder optical path 244. An object image formed by the finder objective optical system 253 is in turn formed on the field frame 257 of a Porro prism 255 that is an image-erecting member. In the rear of the Porro prism 255 there is located an eyepiece optical system 259 for guiding an erected image into the eyeball E of an observer. It is here noted that cover members 250 are provided on the entrance sides of the phototaking optical system 241 and finder objective optical system 253 as well as on the exit side of the eyepiece optical system 259.

With the thus constructed digital camera 240, it is possible to achieve high performance and cost reductions, because the phototaking optical system 241 is constructed of a zoom lens having a high zoom ratio in the wide-angle end with satisfactory aberrations and a back focus large enough to receive a filter, etc., therein.

In the embodiment of FIG. 24, plane-parallel plates are used as the cover members 250; however, it is acceptable to use powered lenses.

Third Aspect

Before describing various embodiments of the third aspect of the present invention, the operation of the third aspect of the present invention will be described with reference to examples.

A zoom lens according to the third aspect of the present invention have three-lens groups construction including a first lens group having a negative refractive power, a second lens group having a positive refractive power, and a third lens group having a positive refractive power in order from an object side thereof. Thus, the zoom lens exhibits an excellent telecentricity, and light beams can be effectively introduced into an image pickup element such as a charge-coupled device (CCD), for example. Furthermore, since it is possible to ensure a long back focus, space for installing parts, such as an optical low-pass filter or an infrared blocking filter, can be saved.

In addition, upon varying magnifying power from the wide-angle end to the telephoto end, the first lens group moves to the object side after moving to the image side, the second lens group moves only to the object side, whereas the third lens group moves in an amount different from that of the second lens group. Thus, it is possible to reduce the total length of the system while maintaining an appropriate exit pupil.

Furthermore, the zoom lens according to the third aspect of the present invention satisfies the conditional formula (3-1) described above. The conditional formula (3-1) defines a preferable condition by defining the range of $L_t/f_2$.

If $L_t/f_2$ exceeds the upper limit defined in the conditional formula (3-1), the total length becomes too long, in which reduction in size is impossible. In contrast, if the $L_t/f_2$ is less than the lower limit, the power of the second lens group becomes too weak, and consequently zooming action of the second lens group is degraded, requiring more movement to vary magnifying power. This, too, hinders reduction in size.

The lower limit value in the conditional formula (3-1) is preferably 2.5, and is more preferably 2.7. The upper limit value is preferably 3.5, and more preferably is 3.3.

For example, preferably the following conditional formula (3-1a) should be satisfied, and more preferably the following conditional formula (3-1b) should be satisfied:

$$2.5 < L_t/f_2 < 3.5 \quad (3\text{-}1a)$$

$$2.7 < L_t/f_2 < 3.3 \quad (3\text{-}1b)$$

Furthermore, the zoom lens according to the third aspect of the present invention satisfies the conditional formula (3-3) described above. In order to reduce the total length of the zoom lens optical system and make it compact, it is required to reduce the total length of each lens group. On the other hand, there is a limit to reduce the total length of each lens group for the reasons of ensuring an image forming capability and manufacturing and maintenance of lens elements. The conditional formula (3-3) defines a ratio of the total length of the first lens group to the total length of the second lens group that is suitable for achieving a high image forming capability while allowing the reduction in the size of the optical system defined by the conditional formula (3-1). Here, the total length means a distance along the optical axis from a lens surface that is closest to the object side to a lens surface that is closest to the image side for each lens group.

If $T_1/T_2$ is not reached the lower limit defined by the conditional formula (3-3), the total length of the first lens group is too short. Accordingly, the spacing between the negative-power first lens and the positive-power second lens in the first lens group is too small, which is undesirable especially for correction of off-axial aberrations, such as distortion or coma aberration. In this case, even if the length of the second lens group is increased, correction of such aberrations by the second lens group is difficult.

Furthermore, in order to provide the negative refractive power required for the negative-power first lens in the first lens group, the negative-power first lens has a relatively large diameter. Thus, the thickness of the outer diameter of the negative-power first lens is well-balanced, and it may interfere with the outer diameter of the positive-power first lens in the first lens group, or supporting it may be difficult, which are undesirable. Or, since the object side surface of the negative-power first lens in the first lens group is a concave surface, the length thereof along the optical axis is reduced. However, the reduction in the size including the outer diameter is difficult. In addition, the total length of the second lens group becomes too long, which is undesirable in terms of balance.

In contrast, if $T_1/T_2$ exceeds the upper limit, total length of the second lens group is too short, and thus, correction of aberrations, especially curvature of field and astigmatic difference, becomes difficult. Even if the total length of the first lens group is increased insofar as the side reduction is achieved, the correction by the first lens group is difficult. Furthermore, the total length of the first lens becomes long more than required, which is undesirable for the reduction in size. In addition, assuring space sufficient for each lens in the second lens group to operate properly becomes difficult in terms of balance.

The lower limit value in the conditional formula (3-3) is preferably 0.67, and is more preferably 0.7. The upper limit value is preferably 0.9, and more preferably is 0.85.

For example, preferably the following conditional formula (3-3a) should be satisfied, and more preferably the following conditional formula (3-3b) should be satisfied:

$$0.67 < T_1/T_2 < 0.9 \quad (3\text{-}3a)$$

$$0.7 < T_1/T_2 < 0.85 \quad (3\text{-}3b)$$

In particular, considering focusing by means of the third lens group, it is desirable to cut astigmatism almost completely by the first lens group and the second lens group in the entire range of zooming. In this case, in order to reduce variation in off-axial aberration, such as astigmatism, the capability for correcting aberration of the second lens group is especially important.

For the above-described reasons, in the zoom lens according to the third aspect of the present invention, the second lens group includes a positive-power first lens, a positive-power second lens, a negative-power third lens, and a fourth lens that is made of a single lens having a convex surface on the image side in order from an object side thereof, and the positive-power second lens and the negative-power third lens are cemented together to form a meniscus-shaped cemented lens that faces a convex surface to the object side and the second lens group has aspherical surfaces on at least two surfaces other than the cemented surface of the cemented lens.

Such a structure can effectively correct astigmatism that is generated in the third lens group, thereby enhancing image forming capability. In particular, since the aspherical surfaces are provided to at least two surfaces, correction of aberration can be performed effectively.

In this case, since the aspherical surfaces on the at least two surfaces are provided to lens surfaces other than the cemented surface of the cemented lens, the cemented lens can be easily manufactured.

Furthermore, the aspherical surfaces on the at least two surfaces are preferably provided to the two sides of the positive-power first lens in the second lens group. This provides great benefits: correction of spherical aberration, reduction in the relative decentration sensitivity within the group, reduction in the manufacturing cost.

Furthermore, since the negative-power third lens in the second lens group cancels spherical aberration and coma aberration generated in the positive-power second lens, this configuration can minimize aberrations generated in the second lens group. The positive-power second lens that has a lens surface for canceling spherical aberration and coma aberration is cemented with the negative-power third lens that is a main lens, generation of aberration due to relative eccentricity can be inhibited.

In this case, decentration sensitivity is preferably reduced by canceling aberration in the cemented lens. This can reduce relative decentration sensitivity with the positive-power first lens in the second lens group.

Furthermore, the fourth lens in the second lens group is advantageous since it enables to simplify the structure of the third lens group. With the fourth lens in the second lens group, for example, even when the third lens group is made up of lenses having spherical surfaces or having less amount of asphericity, fluctuation of aberration caused by the movement of the third lens group that is close to the image surface can be reduced.

Furthermore, in the zoom lens according to the third aspect of the present invention, since the fourth lens in the second lens group has a convex surface on the image side, deterioration of performance upon decentration of the single lens can be reduced. Furthermore, this is advantageous for the size reduction since mechanical interference between mechanical members that are placed behind the second lens group can be avoided upon being collapsed.

The fourth lens may be a powerless lens or a negative-power lens for the purpose of correction of aberration. However, when the fourth lens is constructed as a lens having a positive refractive power, the positive power within the second lens group is scattered. As a result, the relative decentration sensitivity within the second lens group can be reduced.

In addition, in the zoom lens according to the third aspect of the present invention, the image side surface of the fourth lens in the second lens group is preferably aspherical.

This may be effective for correction of aberration. In particular, in order to correct astigmatism and distortion generated in the first lens group, it is effective to provide the aspherical surface on a surface in which the chief ray height becomes high behind the stop.

However, when the rear focusing method is done by means of the third lens group, the amount of asphericity into the third lens group is limited. In other words, if the third lens group has an aspherical surface, the fluctuation of the image forming capability upon focusing becomes significant. Therefore, the aspherical surface is preferably provided at a surface closest to the image side in the second lens group.

It should be noted that the fourth lens in the second lens group may be a glass lens or a plastic lens. Alternatively, it may be a compound aspherical lens in which an aspherical resin is provided on a spherical surface made of glass.

In the zoom lens according to the third aspect of the present invention, the cemented lens in the second lens group preferably satisfies the following conditional formulae (3-7) and (3-8):

$$0.3 < R_{23R}/R_{22F} < 1.0 \qquad (3\text{-}7)$$

$$-0.4 < f_2/R_{23F} < 1.4 \qquad (3\text{-}8)$$

where $f_2$ is the focal length of the second lens group, $R_{22F}$ is the radius of curvature in the vicinity of the optical axis of the object side surface of the positive-power second lens in the second lens group, $R_{23R}$ is the radius of curvature in the vicinity of the optical axis of the surface that is closest to the image side of the negative-power third lens in the second lens group, $R_{23F}$ is the radius of curvature in the vicinity of the optical axis of the cemented surface of the cemented lens in the second lens group.

The conditional formula (3-7) defines a range of a preferable shape of the cemented lens in the second lens group by the value of $R_{23R}/R_{22F}$.

If $R_{23R}/R_{22F}$ exceeds the upper limit defined by the conditional formula (3-7), correction of spherical aberration, coma aberration, and astigmatism within the group cannot be achieved sufficiently and the effect of reduction in decentration sensitivity achieved by the cementing is reduced. If the lower limit is not reached, spherical aberration, coma aberration, and astigmatism within the group is corrected and decentration sensitivity is reduced. However, the power of the second lens group is increased, which tends to hinder size reduction.

The lower limit value in the conditional formula (3-7) is preferably 0.4, and more preferably is 0.45. The upper limit value is preferably 0.95, and is more preferably 0.9.

For example, preferably the following conditional formula (3-7a) should be satisfied, and more preferably the following conditional formula (3-7b) should be satisfied:

$$0.4 < R_{23R}/R_{22F} < 0.95 \qquad (3\text{-}7a)$$

$$0.45 < R_{23R}/R_{22F} < 0.9 \qquad (3\text{-}7b)$$

The conditional formula (3-8) defines a range of a preferable shape of the cemented lens with respect to the focal length of the second lens group by the value of $f_2/R_{23F}$.

If $f_2/R_{23F}$ exceeds the upper limit defined in the conditional formula (3-8), correction of axial chromatic aberration and chromatic deference of magnification tends to be insufficient. If the lower limit is not reached, the thickness on the optical axis is increased to ensure a sufficient thickness of the periphery of positive-power second lens in cemented lens is increased, which is undesirable.

The lower limit value in the conditional formula (3-8) is preferably 0.4, and is more preferably 0.5. The upper limit value is preferably 1.2, and is more preferably 1.0.

For example, preferably the following conditional formula (3-8a) should be satisfied, and more preferably the following conditional formula (3-8b) should be satisfied:

$$0.4 < f_2/R_{23F} < 1.2 \qquad (3\text{-}8a)$$

$$0.5 < f_2/R_{23F} < 1.0 \qquad (3\text{-}8b)$$

In the zoom lens according to the third aspect of the present invention, the negative-power third lens in the second lens group preferably satisfies the following conditional formula (3-9):

$$1.0 < |f_2/f_{23}| < 3.0 \qquad (3\text{-}9)$$

where $f_2$ is the focal length of the second lens group, and $f_{23}$ is the focal length of the negative-power third lens in the second lens group.

The conditional formula (3-9) defines a preferable range of the ratio of the focal length of the negative-power third lens in the second lens group to the focal length of the second lens group by the value of $|f_2/f_{23}|$.

If $|f_2/f_{23}|$ exceeds the upper limit defined in the conditional formula (3-9), correction of astigmatism becomes difficult although the total length can be reduced since the principal point of the second lens group shifts closer to the object side. If the lower limit is not reached, the principal point of the second lens group shifts closer to the image side and the power of the second lens group cannot be reduced. Thus, the amount of movement and the size of the first lens group tend to be increased. Furthermore, useless space tends to be defined behind the second lens group when in use, which may increase the total length. This may render the mechanical structure of the lens barrel to become complex or huge. Or the total length of the lens cannot be reduced upon collapsed.

The lower limit value in the conditional formula (3-9) is preferably 1.3, and is more preferably 1.6. The upper limit value is preferably 2.5, and is more preferably 2.0.

For example, preferably the following conditional formula (3-9a) should be satisfied, and more preferably the following conditional formula (3-9b) should be satisfied:

$$1.3 < |f_2/f_{23}| < 2.5 \quad (3\text{-}9a)$$

$$1.6 < |f_2/f_{23}| < 2.0 \quad (3\text{-}9b)$$

In addition, in the zoom lens according to the third aspect of the present invention, the first lens group includes a negative-power first lens and a positive-power second lens in order from an object side thereof, and has at least one aspherical surface.

Since the first lens group includes two lenses having at least one aspherical surface, chromatic aberration and each off-axial aberration can be effectively corrected, and the reduction of the thickness of the zoom lens can be realized.

Furthermore, in the zoom lens according to the third aspect of the present invention, the negative-power first lens in the first lens group preferably has a concave surface having a larger curvature on the image side than that of the object side surface, and the concave surface on the image side includes an aspherical surface. This can effectively correct distortion and curvature of field especially in the wide-angle end. This lens may be an aspherical lens formed by the glass molding, or a compound aspherical lens in which an aspherical resin is formed on a spherical surface made of glass.

In the zoom lens according to the third aspect of the present invention, the positive-power second lens in the first lens group satisfies the following conditional formula (3-2):

The conditional formula (3-2) defines a preferable shape of the positive-power second lens in the first lens group by the value of $(R_{13}+R_{14})/(R_{13}-R_{14})$.

If $(R_{13}+R_{14})/(R_{13}-R_{14})$ exceeds the upper limit defined in the conditional formula (3-2), it may be disadvantageous in terms of correction of distortion. If the lower limit is not reached, it may be disadvantageous in terms of correction of astigmatism. Furthermore, it is disadvantageous for reduction in the size since more space from the second lens group is required in order to avoid any mechanical interference upon varying magnifying power.

The lower limit value in the conditional formula (3-2) is preferably −2.4, and is more preferably −2.3. The upper limit value is preferably −0.45, and is more preferably −0.5.

For example, preferably the following conditional formula (3-2a) should be satisfied, and more preferably the following conditional formula (3-2b) should be satisfied:

$$-2.4 < (R_{13}+R_{14})/(R_{13}-R_{14}) < -0.45 \quad (3\text{-}2a)$$

$$-2.3 < (R_{13}+R_{14})/(R_{13}-R_{14}) < -0.5 \quad (3\text{-}2b)$$

In the zoom lens according to the third aspect of the present invention, the positive-power second lens in the first lens group preferably has aspherical surfaces on the two sides.

In this case, it is more preferable to provide the object side surface with an aspherical shape in which the positive refractive power is higher at the outer periphery portion of the lens. By this, the outer diameter of the negative-power first lens in the first lens group can be reduced, and distortion and astigmatism in the wide-angle end can be effectively corrected. For the same reason, it is more preferable to provide the image side surface with an aspherical shape in which the positive refractive power is higher at the outer periphery portion of the lens.

Furthermore, the aspherical shape preferably satisfies the following conditional formula (3-10):

$$0.01 < (A_{sp12F} - A_{sp12R})/f_W < 0.05 \quad (3\text{-}10)$$

where $A_{sp12F}$ and $A_{sp12R}$ are amounts of displacement of surface with respect to a datum spherical surface having paraxial radius of curvature of the aspherical surfaces at effective diameters of aspherical surfaces of the object side and the image side in the positive-power second lens in the first lens group, respectively, and $f_W$ is the focal length of the entire zoom lens in the wide-angle end.

The conditional formula (3-10) defines a more preferable aspherical shape by the value of $(A_{sp12F} - A_{sp12R})/f_W$.

If the amount of asphericity increases, with $(A_{sp12F} - A_{sp12R})/f_W$ exceeding the upper limit defined in the conditional formula (3-10), correction of off-axial coma aberration is difficult. If the lower limit is not reached, the negative distortion cannot be corrected sufficiently, and off-axial curvature of field and astigmatic difference cannot be corrected.

The lower limit value in the conditional formula (3-9) is preferably 0.015, and more preferably is 0.02. The upper limit value is preferably 0.04, and more preferably is 0.03

For example, preferably the following conditional formula (3-10a) should be satisfied, and more preferably the following conditional formula (3-10b) should be satisfied:

$$0.015 < (A_{sp12F} - A_{sp12R})/f_W < 0.04 \quad (3\text{-}10a)$$

$$0.02 < (A_{sp12F} - A_{sp12R})/f_W < 0.03 \quad (3\text{-}10b)$$

In the zoom lens according to the third aspect of the present invention, a glass material having a refractive index of 1.75 or higher for the d-line (having a wavelength of 587.56 nm) is preferably used for the negative-power first lens in the first lens group. This provides an excellent refractive power without increasing the curvature, thereby minimizing generation of various off-axial aberrations.

Furthermore, in the zoom lens according to the third aspect of the present invention, the negative-power first lens in the first lens group preferably has a concave surface having a larger curvature on the image side than that of the object side surface, and the concave surface on the image side includes an aspherical surface. This can effectively correct distortion and curvature of field especially in the wide-angle end. This lens may be an aspherical lens formed by the glass molding, or a compound aspherical lens in which an aspherical resin is formed on a spherical surface made of glass.

In the zoom lens according to the third aspect of the present invention, a glass material having a refractive index of 1.85 or higher for d-line (having a wavelength of 587.56 nm) is preferably used for the positive-power second lens in the first lens group. Generation of various off-axial aberrations can be minimized for the same reason as the negative-power first lens. In this case, it is preferable to use a glass material having a refractive index of 1.90 or higher for d-line.

Furthermore, the zoom lens according to the third aspect of the present invention preferably satisfies the conditional formula (3-4) described above.

$$1.15 < |f_1/f_2| < 2.0 \quad (3\text{-}4)$$

where $f_2$ is the focal length of the second lens group, and $f_1$ is the focal length of the first lens group.

The conditional formula (3-4) defines a refractive power of the first and the second lens groups by the value of $|f_1/f_2|$. If $|f_1/f_2|$ exceeds the upper limit defined in the conditional formula (3-4), the refractive power of the second lens group becomes too high. Thus, a telecentricity may be difficult to be ensured, and shading tends to occur at the corners of the picture. If the lower limit is not reached, the refractive power of the second lens group becomes too weak, and consequently zooming action of the second lens group is degraded, requiring more movement to vary magnifying power. This causes an increase in the size of the overall lens system.

The lower limit value in the conditional formula (3-4) is preferably 1.2, and more preferably is 1.25. The upper limit value is preferably 1.75, and more preferably is 1.5.

For example, preferably the following conditional formula (3-4a) should be satisfied, and more preferably the following conditional formula (3-4b) should be satisfied:

$$1.2 < |f_1/f_2| < 1.75 \quad (3\text{-}4a)$$

$$1.25 < |f_1/f_2| < 1.5 \quad (3\text{-}4b)$$

In the zoom lens according to the third aspect of the present invention, the amount of movement of the second lens group upon varying magnifying power preferably satisfies the following conditional formula (3-5):

$$0.4 < |X_2/f_1| < 1.0 \quad (3\text{-}5)$$

where $X_2$ is an amount of movement of the second lens group upon varying magnifying power from the wide-angle end to the telephoto end, and $f_1$ is the focal length of the first lens group.

The conditional formula (3-5) defines a preferable range of the amount of movement of the second lens group by the value of $|X_2/f_1|$.

If $|X_2/f_1|$ exceeds the upper limit defined in the conditional formula (3-5), a mechanical mechanism for moving the second lens group becomes too large since the amount of movement of the second lens group is increased, which makes reduction in the total length of the lens upon collapsed difficult. If the power of the first lens group becomes too high exceeding the lower limit, off-axial astigmatism and coma aberration in the wide-angle end is significant, making correction of such aberrations difficult.

The lower limit value in the conditional formula (3-5) is preferably 0.5, and is more preferably 0.6. The upper limit value is preferably 0.9, and is more preferably 0.85.

For example, preferably the following conditional formula (3-5a) should be satisfied, and more preferably the following conditional formula (3-5b) should be satisfied:

$$0.5 < |X_2/f_1| < 0.9 \quad (3\text{-}5a)$$

$$0.6 < |X_2/f_1| < 0.85 \quad (3\text{-}5b)$$

Furthermore, in the zoom lens according to the third aspect of the present invention, the third lens group is configured to being movable and is used for focusing. With such a rear focusing method by means of the third lens group, the load to the drive motor can be reduced since the movable lens group has a lower weight than a focusing by means of the first lens group. In addition, the total length can be maintained to be short, and the diameter of the lens barrel can be maintained small since the drive motor can be accommodated in the lens barrel. Thus, such a system is advantageous since it allows a compact layout.

If more asphericity than necessary is included in the third lens group, astigmatism that remains in the first lens group and the second lens group is required to be corrected by the third lens group in order for the lens configuration to be effective. However, when the third lens group is moved for focusing, this balance is lost and is fluctuation of aberration becomes significant.

Accordingly, in the zoom lens according to the third aspect of the present invention, in order to achieve the object of the third aspect, i.e., for reducing the entire thickness of the lens unit while allowing focusing by means of the third lens group, all of lens surfaces of the third lens group are preferably made of spherical surfaces or surfaces having small asphericity.

Furthermore, the zoom lens according to the third aspect of the present invention preferably satisfies the conditional formula (3-6) described above.

$$0.29 < f_W/f_3 < 0.6 \quad (3\text{-}6)$$

where $f_W$ is the focal length of the entire zoom lens in the wide-angle end, and $f_3$ is the focal length of the third lens group.

The conditional formula (3-6) defines a preferable range of the refractive power of the third lens group by the range of $f_W/f_3$.

If $f_W/f_3$ exceed the upper limit defined in the conditional formula (3-6), with the refractive power of the third lens group being high, coma aberration and curvature of field in the third lens group become significant, making rear focusing difficult. If the value is less than the lower limit, with the refractive power of the third lens group being low, the back focus is increased and the amount of movement of the third lens group upon focusing is increased, making reduction in the size difficult. The above-described conditional formula (3-6) is especially useful when the lens surface of the third lens group is constructed by spherical surfaces.

The lower limit value in the conditional formula (3-2) is preferably 0.3, and is more preferably 0.31. The upper limit value is preferably 0.5, and is more preferably 0.45.

For example, preferably the following conditional formula (3-6a) should be satisfied, and more preferably the following conditional formula (3-6b) should be satisfied:

$$0.3 < f_W/f_3 < 0.5 \quad (3\text{-}6a)$$

$$0.31 < f_W/f_3 < 0.45 \quad (3\text{-}6b)$$

Furthermore, in the zoom lens according to the third aspect of the present invention, the third lens group preferably moves to the image side in a convex locus upon varying magnifying power from the wide-angle end to the telephoto end.

In this case, allowance of adjustment is ensured especially at the telephoto end in which variance in the focus point is great due to fabrication error.

Furthermore, in the zoom lens according to the third aspect of the present invention, the third lens group is made up of one positive-power lens.

In this structure, aberration can be corrected to a practical level, and the size of the zoom lens can be reduced by reducing the number of lenses.

Furthermore, in the zoom lens according to the third aspect of the present invention, the aperture stop is preferably positioned between the first lens group and the second lens group.

In this case, the position of the entrance pupil can be shallower, and accordingly the diameter of the front lens can be reduced. Consequently, the thickness of the lens can be reduced on the optical axis, thereby enabling reduction in the thickness.

In addition, since the position of the exit pupil can be set to be distant from the image formation position, the angle of beams emitted to an image pickup element, such as a CCD, can be reduced and shading at the corners of the picture can be prevented.

The aperture stop preferably moves together with the second lens group upon varying magnifying power.

This structure is advantageous in that this enables a simpler mechanism and that less useless space is created when collapsed. In addition, the difference in F number between the wide-angle end and the telephoto end is reduced.

The image pickup apparatus according to the third aspect of the present invention includes the zoom lens according to the third aspect of the present invention and an image pickup element positioned at the image formation position of the zoom lens.

According to this invention, since an image of a subject can be formed on the image pickup element using the zoom lens according to the third aspect of the present invention, the image pickup apparatus has the same advantageous effects as the zoom lens according to the third aspect of the present invention.

It should be noted that each of the conditional formulae or configurations described above can be combined if needed to obtain a better zoom lens and/or an electronic image pickup apparatus. For each of the above-described conditional formulae, only the upper limit value or the lower limit value thereof can be defined by an upper limit value or a lower limit value of a more preferable conditional formula. In addition, the upper limit value or the lower limit value may be that of a conditional formula of examples described later.

In the following, embodiments of the third aspect of the present invention will be described with reference to the attached drawings.

FIRST EMBODIMENT OF THIRD ASPECT

A zoom lens according to a first embodiment of the third aspect of the present invention will be described.

Parts (a), (b), and (c) of FIG. 25 are cross-sectional views of a first example of the zoom lens according to the first embodiment of the third aspect of the present invention in the wide-angle end, the middle focal length position, and the telephoto end, respectively, when the zoom lens is focused on an object point at infinity. In this figure, reference symbol I indicates an image surface. Detailed numerical examples of this example will be described as Example 3-1.

A first exemplary zoom lens 3100 of this example generally includes a first lens group G1, a second lens group G2, a third lens group G3, and a group of parallel plates F, which are arranged in order from an object side thereof, as shown in Part (a) of FIG. 25.

The first lens group G1 includes a negative-power lens L301 (negative-power first lens) and a positive-power lens L302 (positive-power second lens) in order from an object side thereof, defining a lens group having a negative refractive power.

The negative-power lens L301 include a lens that has a concave surface having a larger curvature on the image side than that of the object side surface, and the concave surface on the image side includes an aspherical surface. It is made of a glass material having a refractive index of 1.75 or higher for the d-line.

The positive-power lens L302 is a positive meniscus lens that faces the convex surface to the object side. It is made of a glass material having a refractive index of 1.85 or higher for the d-line.

In the following, the negative-power lens L301 and the positive-power lens L302 may be simply referred as the lens L301 or L302 as long as there is no possibility of being misunderstood.

The second lens group G2 includes a positive-power lens L303 (positive-power first lens), a cemented lens L304, and a positive-power lens L307 (positive-power fourth lens) in order from an object side thereof, defining a lens group having a negative refractive power. An aperture stop S that moves together with the second lens group G2 upon varying magnifying power is provided at the object side of the second lens group G2.

The positive-power lens L303 includes a biconvex lens that has aspherical surfaces on the two sides.

The cemented lens L304 includes a positive-power lens L305 (positive-power second lens) including a positive meniscus lens that faces the convex surface to the object side, and a negative-power lens L306 (negative-power third lens) including a negative meniscus lens that faces the convex surface to the object side in order from an object side thereof. Each lens surface of the positive-power lens L305 and the negative-power lens L306 are made up of a spherical surface.

The positive-power lens L307 includes a single lens that faces the convex surface to the image side and has an aspherical surface on convex surface on the image side.

The third lens group G3 includes a positive-power lens L308 (positive single lens) that includes a biconvex single lens having only spherical surfaces on the two sides.

The group of parallel plates F may have any desired characteristics that are achieved by an image pickup element or the like provided to the image surface I. In this embodiment, it includes an optical low-pass filter F1 and a cover glass GL in order from an object side thereof, and is positioned between the last lens group and the image surface I in an immobile manner.

As the optical low-pass filter F1, a birefringent low-pass filter that is made of a quartz plate in which the orientation of crystal axis thereof is adjusted, or a phase low-pass filter that provides optical cut-off frequency characteristic by means of the diffraction effect may be preferably used.

The cover glass GL is a cover glass for disposing an image pickup element such as a CCD.

Other examples include, for example, an infrared light blocking filter in which an evaporated film that blocks infrared light is provided on a parallel plate.

It should be noted that all or part of these components may be omitted in some cases.

As shown in Parts (a), (b), and (c) of FIG. 25, in the zoom lens 3100, the first lens group G1 moves along the optical axis to the image side in a convex locus, the second lens group G2 moves together with the aperture stop S along the optical axis only to the object side, and the third lens group G3 moves in an amount different from that of the second lens group G2 along the optical axis to the image side in a convex locus upon varying magnifying power from the wide-angle end to the telephoto end upon focusing an object point at infinity. The third lens group G3 is configured to be movable for focusing.

Next, a second example of the zoom lens according to this embodiment will be described.

Parts (a), (b), and (c) of FIG. 26 are cross-sectional views of a second example of zoom lens according to the first embodiment of the third aspect of the present invention in the wide-angle end, the middle focal length position, and the telephoto end, respectively, when the zoom lens is focused on an object point at infinity. In this figure, reference symbol I indicates an image surface. Detailed numerical examples of this example will be described as Example 3-2.

As shown in Parts (a) of FIG. 26, a second example of the zoom lens 3101 generally includes lenses L310 to L317 that correspond to the lenses L301 to L308 of the first example of the above-described embodiment and have the same refractive power types (positive or negative) and the same types of lens shape as the lenses L301 to L308. The aperture stop S and the group of parallel plates F are the same as those of the first example.

As shown in Parts (a), (b), and (c) of FIG. 26, in the zoom lens 3101, the first lens group G1 moves along the optical axis to the image side in a convex locus, the second lens group G2 moves together with the aperture stop S along the optical axis only to the object side, and the third lens group G3 moves in an amount different from that of the second lens group G2 along the optical axis to the image surface side upon varying magnifying power from the wide-angle end to the telephoto end upon focusing an object point at infinity. The third lens group G3 is configured to be movable for focusing.

Next, a third example of the zoom lens according to this embodiment will be described.

Parts (a), (b), and (c) of FIG. 27 are cross-sectional views of a third example of zoom lens according to the first embodiment of the third aspect of the present invention in the wide-angle end, the middle focal length position, and the telephoto end, respectively, when the zoom lens is focused on an object point at infinity. In this figure, reference symbol I indicates an image surface. Examples of specific values of this will be described as Example 3-3.

As shown in Parts of FIG. 27, a third example of the zoom lens 3102 generally includes lenses L320, L322 to L325, and L327 that correspond to the lenses L301, L303 to L306, and L308 of the first example of the above-described embodiment and have the same refractive power types (positive or negative) and the same types of lens shape as the lenses L301, L303 to L306, and L308.

It also includes a positive-power lens L321 (positive-power second lens) and a positive-power lens L326 (positive-power fourth lens) instead of the positive-power lens L307 and the positive-power lens L307 of the first example, respectively.

The positive-power lens L321 includes a single lens that has a positive refractive power by having aspherical surfaces on the two sides. It is made of a glass material having a refractive index of less than 1.85 for the d-line.

The positive-power lens L326 includes a single lens that has the convex surface to the image side and has an aspherical surface on convex surface on the image side.

The aperture stop S and the group of parallel plates F are the same as those of the first example.

As shown in Parts (a), (b), and (c) of FIG. 27, in the zoom lens 3102, the first lens group G1 moves along the optical axis to the image side in a convex locus, the second lens group G2 moves together with the aperture stop S along the optical axis only to the object side, and the third lens group G3 moves in an amount different from that of the second lens group G2 along the optical axis upon varying magnifying power from the wide-angle end to the telephoto end upon focusing an object point at infinity. The third lens group G3 is configured to be movable for focusing.

Next, a fourth example of the zoom lens according to this embodiment will be described.

Figure 28:
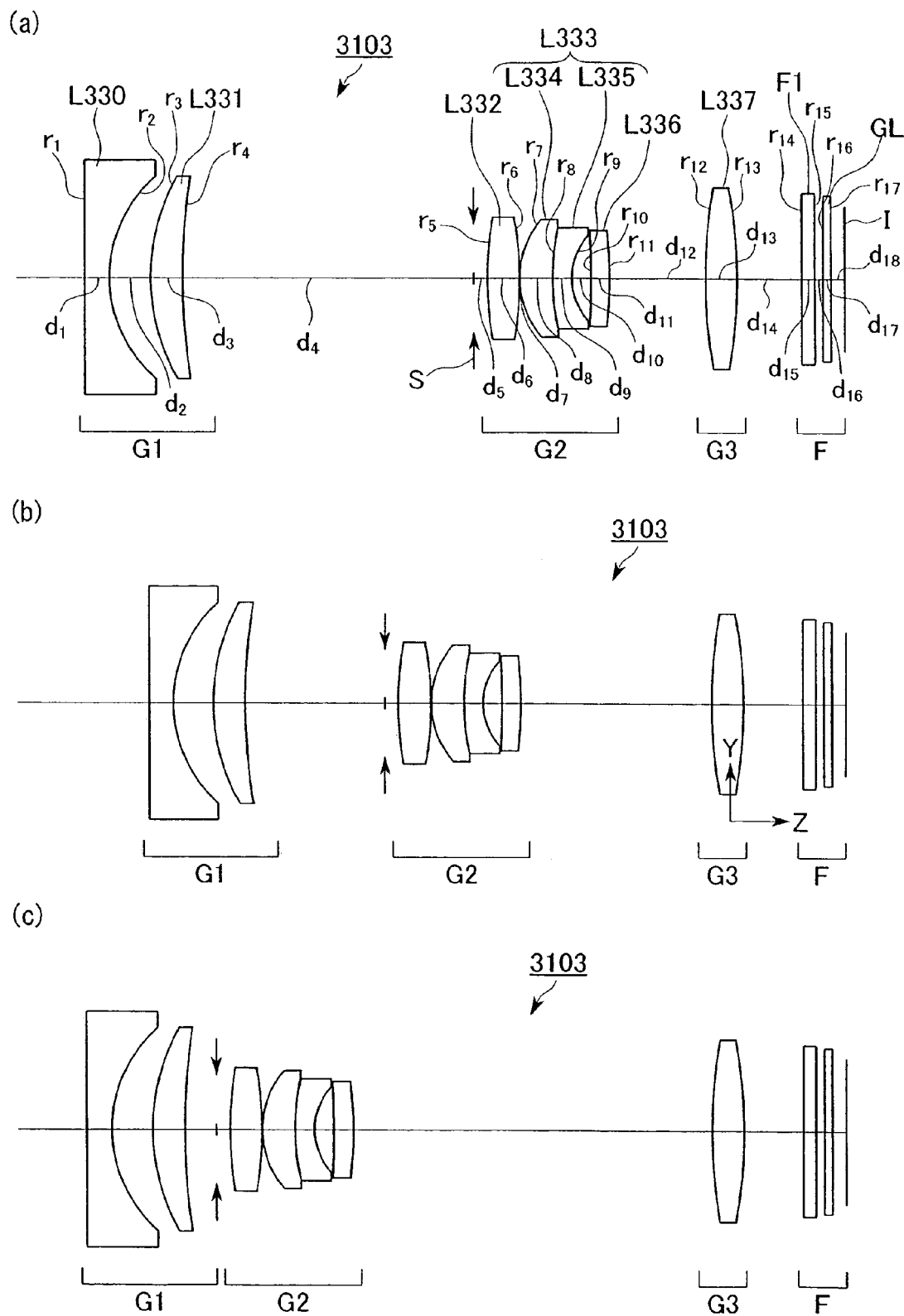
FIG. 28 is a cross-sectional view of a fourth example of the zoom lens in the wide-angle end, the middle focal length position, and the telephoto end respectively, when the zoom lens is focused on an object point at infinity, similar to FIG. 25.

Parts (a), (b), and (c) of FIG. 28 are cross-sectional views of a fourth example of zoom lens according to the first embodiment of the third aspect of the present invention in the wide-angle end, the middle focal length position, and the telephoto end, respectively, when the zoom lens is focused on an object point at infinity. In this figure, reference symbol I indicates an image surface. Examples of specific values of this will be described as Example 3-4.

As shown in Parts (a) of FIG. 28, a second example of the zoom lens 3103 generally includes lenses L330 to L335, and L337 that correspond to the lenses L301 to 306, and L308 of the first example of the above-described embodiment and have the same refractive power types (positive or negative) and the same types of lens shape as the lenses L301 to L308, and L308.

It also includes a positive-power lens L336 (positive-power fourth lens) instead of the positive-power lens L307 of the first example.

The positive-power lens L336 includes a single lens that has the convex surface to the image side and has spherical surfaces on the two sides.

The aperture stop S and the group of parallel plates F are the same as those of the first example.

As shown in Parts (a), (b), and (c) of FIG. 28, in the zoom lens 3103, the first lens group G1 moves along the optical axis to the image side in a convex locus, the second lens group G2 moves together with the aperture stop S along the optical axis only to the object side, and the third lens group G3 moves in an amount different from that of the second lens group G2 along the optical axis upon varying magnifying power from the wide-angle end to the telephoto end upon focusing an object point at infinity. The third lens group G3 is configured to be movable for focusing.

It should be noted that the configurations of the lenses within the groups are merely presented as examples, and aspherical surfaces may be provided differently or the configuration of the groups may be changed as long as a desired positive or negative power for each of the lens group is obtained. For example, although the image side surface in the first lens group has been described as having an aspherical surface, at least one aspherical surface may be an object side surface. Furthermore, although the two sides of the positive-power first lens in the second lens group has been described as having aspherical surfaces in the two sides of the positive-power first lens, the at least two aspherical surfaces may be any surface other than the cemented surface of the cemented lens. For example, they may be a surface of cemented lens that is closest to the object side, or the surface closest to the image side may be aspherical.

The first embodiment described above is preferably configured to satisfy a suitable combination of the above-described conditional formulae.

EXAMPLE 3-1

In the following, structural parameters of an optical system of a first numerical example corresponding to the zoom lenses of the first example of the first embodiment described above will be described. In addition to the symbols described above, the following symbols will be used, and the symbols will be used commonly for each example:

f represents the focal length of the entire system, FNO represents an F number, W represents the wide-angle end, S represents the middle state, and T represents the telephoto end. $r_1, r_2, \ldots$ represent the radii of curvature of each lens surface, $d_1, d_2, \ldots$ represent spacing between each lens surface, which correspond reference symbols used in Part (a) of FIG. 25. In addition, $n_{d1}, n_{d2}, \ldots$ represent refractive indices of each lens for the d-line, and $v_{d1}, v_{d2}, \ldots$ represent the Abbe numbers of each lens. These symbols are commonly used for all of the drawings that will be referred to later.

An aspherical shape can be expressed by the following formula (a) provided that z represents a direction of the optical axis, and y represents a direction that is orthogonal to the optical axis:

$$z = (y^2/r)/[1 + \sqrt{1-(1+K)\cdot(y/r)^2}] + A_4 y^4 + A_6 y^6 + A_8 y^8 + A_{10} y^{10} \tag{a}$$

where r is a paraxial radius of curvature, K is a conical coefficient, and $A_4, A_6, A_8$, and $A_{10}$ are the fourth, sixth, eighth and tenth aspheric coefficients, respectively.

| Surface Number | Radius of Curvature | Spacing between Surface | Refractive Index | Abbe Number |
|---|---|---|---|---|
| 1 | $r_1 = \infty$ | $d_1 = 1.50$ | $n_{d1} = 1.77377$ | $v_{d1} = 47.17$ |
| 2 | $r_2 = 7.265$ (aspherical) | $d_2 = 2.63$ | | |
| 3 | $r_3 = 12.816$ | $d_3 = 2.20$ | $n_{d2} = 1.80518$ | $v_{d2} = 25.42$ |
| 4 | $r_4 = 39.500$ | $d_4 =$ (variable) | | |
| 5 | $r_5 = \infty$ (stop) | $d_5 = 0.80$ | | |
| 6 | $r_6 = 14.805$ (aspherical) | $d_6 = 1.82$ | $n_{d3} = 1.74330$ | $v_{d3} = 49.33$ |
| 7 | $r_7 = -42.582$ (aspherical) | $d_7 = 0.08$ | | |
| 8 | $r_8 = 5.519$ | $d_8 = 2.52$ | $n_{d4} = 1.51633$ | $v_{d4} = 64.14$ |
| 9 | $r_9 = 16.682$ | $d_9 = 0.65$ | $n_{d5} = 1.80518$ | $v_{d5} = 25.42$ |
| 10 | $r_{10} = 4.631$ | $d_{10} = 1.25$ | | |
| 11 | $r_{11} = 1148.788$ | $d_{11} = 1.38$ | $n_{d6} = 1.51633$ | $v_{d6} = 64.14$ |
| 12 | $r_{12} = -31.519$ (aspherical) | $d_{12} =$ (variable) | | |
| 13 | $r_{13} = 42.164$ | $d_{13} = 2.01$ | $n_{d7} = 1.74400$ | $v_{d7} = 44.78$ |
| 14 | $r_{14} = -33.209$ | $d_{14} =$ (variable) | | |
| 15 | $r_{15} = \infty$ | $d_{15} = 0.95$ | $n_{d8} = 1.54771$ | $v_{d8} = 62.84$ |
| 16 | $r_{16} = \infty$ | $d_{16} = 0.55$ | | |
| 17 | $r_{17} = \infty$ | $d_{17} = 0.50$ | $n_{d9} = 1.51633$ | $v_{d9} = 64.14$ |
| 18 | $r_{18} = \infty$ | $d_{18} =$ (variable) | | |
| I | $\infty$ (image surface) | | | |

[Aspherical Coefficients]

| surface number | K | $A_4$ | $A_6$ | $A_8$ | $A_{10}$ |
|---|---|---|---|---|---|
| 2 | -0.694 | $3.79934 \times 10^{-6}$ | $3.02207 \times 10^{-12}$ | $4.80234 \times 10^{-12}$ | $-4.18324 \times 10^{-11}$ |
| 6 | 7.272 | $-5.06557 \times 10^{-4}$ | $-1.23961 \times 10^{-5}$ | $-1.87104 \times 10^{-9}$ | $-1.87517 \times 10^{-8}$ |
| 7 | -43.291 | $-2.56756 \times 10^{-4}$ | $-4.98807 \times 10^{-6}$ | $7.55902 \times 10^{-8}$ | $-8.45234 \times 10^{-9}$ |
| 12 | 0.000 | $1.68492 \times 10^{-4}$ | $-2.27448 \times 10^{-6}$ | $1.41768 \times 10^{-6}$ | $-6.47233 \times 10^{-8}$ |

[Zoom Data]

| | W | S | T |
|---|---|---|---|
| f (mm) | 8.072 | 13.438 | 23.273 |
| FNO | 2.87 | 3.73 | 5.16 |
| $d_4$ | 18.51 | 8.96 | 1.99 |
| $d_{12}$ | 6.11 | 12.81 | 22.97 |
| $d_{14}$ | 4.17 | 3.40 | 3.83 |
| $d_{18}$ | 0.80 | 0.80 | 0.80 |

Figure 29:
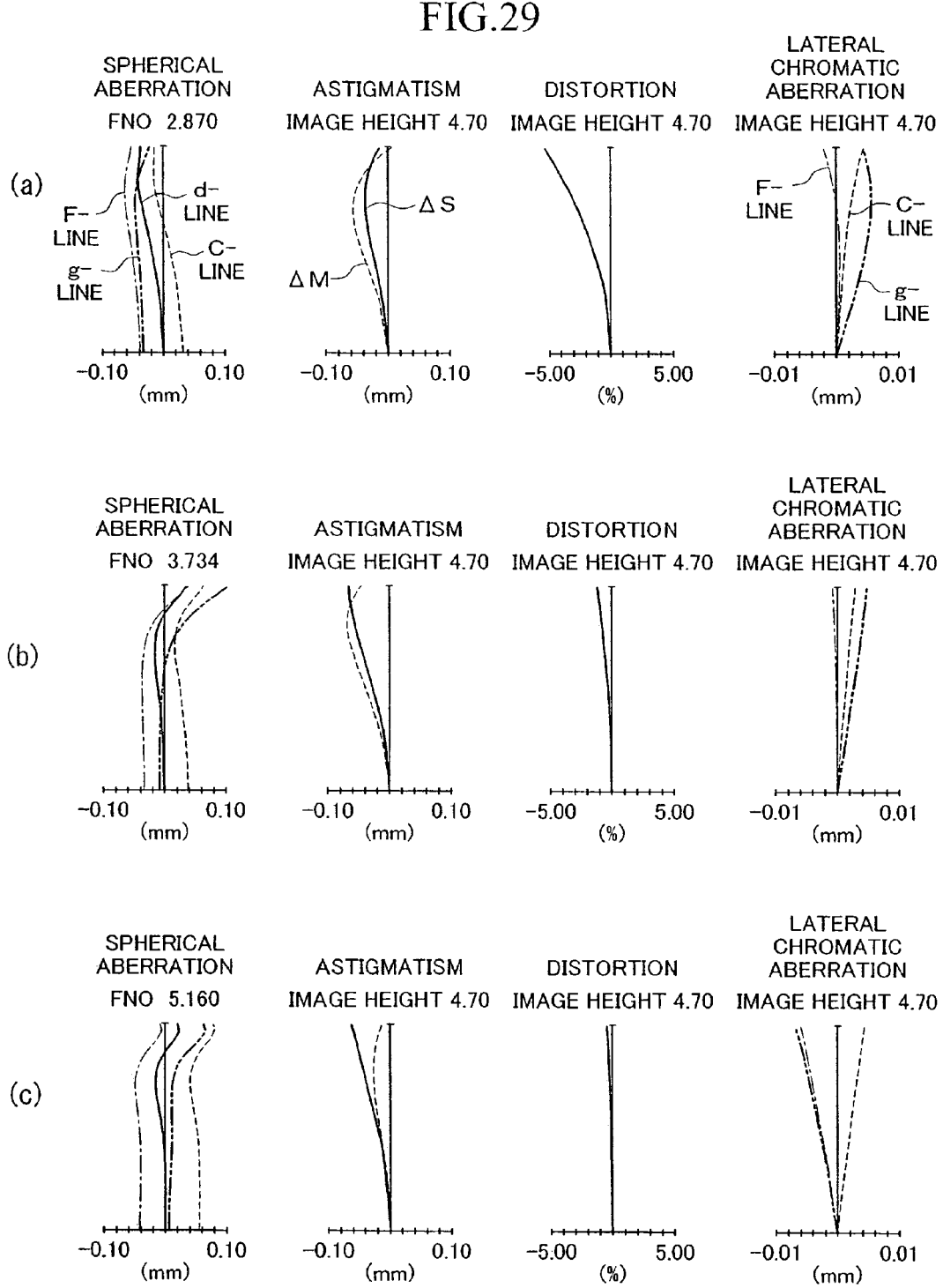
FIG. 29 is aberration curves of Example 3-1 in the wide-angle end, the middle focal length position, and the telephoto end.

Aberration curves of this example are shown in Parts (a), (b), and (c) of FIG. 29. Each drawing corresponds to the wide-angle end (W), the middle focal length position (S), or the telephoto end (T). The drawings are a spherical aberration diagram, an astigmatism diagram, a distortion diagram, and a diagram of chromatic difference of magnification from left to right. The units of each of the horizontal axes are millimeter (nun), millimeter (mm), percent (%), or millimeter (mm).

These diagrams indicate that each of the aberrations is corrected satisfactorily in this example.

The calculated values for each of the conditional formulae will be summarized later.

EXAMPLE 3-2

In the following, structural parameters of an optical system of a second numerical example corresponding to the zoom lenses of the second example (see FIG. 26) of the second embodiment described above will be described.

| Surface Number | Radius of Curvature | Spacing between Surface | Refractive Index | Abbe Number |
|---|---|---|---|---|
| 1 | $r_1 = \infty$ | $d_1 = 1.50$ | $n_{d1} = 1.77377$ | $v_{d1} = 47.18$ |
| 2 | $r_2 = 6.812$ (aspherical) | $d_2 = 2.20$ | | |
| 3 | $r_3 = 12.179$ | $d_3 = 2.35$ | $n_{d2} = 1.90367$ | $v_{d2} = 31.32$ |
| 4 | $r_4 = 40.524$ | $d_4 =$ (variable) | | |
| 5 | $r_5 = \infty$ (stop) | $d_5 = 0.80$ | | |
| 6 | $r_6 = 14.507$ (aspherical) | $d_6 = 2.12$ | $n_{d3} = 1.74330$ | $v_{d3} = 49.33$ |
| 7 | $r_7 = -37.838$ (aspherical) | $d_7 = 0.10$ | | |
| 8 | $r_8 = 5.549$ | $d_8 = 2.04$ | $n_{d4} = 1.48749$ | $v_{d4} = 70.23$ |
| 9 | $r_9 = 11.872$ | $d_9 = 1.13$ | $n_{d5} = 1.80518$ | $v_{d5} = 25.42$ |
| 10 | $r_{10} = 4.276$ | $d_{10} = 1.28$ | | |
| 11 | $r_{11} = 98.456$ | $d_{11} = 1.86$ | $n_{d6} = 1.51633$ | $v_{d6} = 64.14$ |
| 12 | $r_{12} = -27.195$ (aspherical) | $d_{12} =$ (variable) | | |
| 13 | $r_{13} = 27.602$ | $d_{13} = 1.97$ | $n_{d7} = 1.60311$ | $v_{d7} = 60.70$ |
| 14 | $r_{14} = -31.375$ | $d_{14} =$ (variable) | | |
| 15 | $r_{15} = \infty$ | $d_{15} = 0.95$ | $n_{d8} = 1.54771$ | $v_{d8} = 62.84$ |
| 16 | $r_{16} = \infty$ | $d_{16} = 0.55$ | | |

-continued

| Surface Number | Radius of Curvature | Spacing between Surface | Refractive Index | Abbe Number |
|---|---|---|---|---|
| 17 | $r_{17} = \infty$ | $d_{17} = 0.50$ | $n_{d9} = 1.51633$ | $v_{d9} = 64.14$ |
| 18 | $r_{18} = \infty$ | $d_{18} =$ (variable) | | |
| I | $\infty$ (image surface) | | | |

[Aspherical Coefficients]

| Surface Number | K | $A_4$ | $A_6$ | $A_8$ | $A_{10}$ |
|---|---|---|---|---|---|
| 2 | −0.661 | $-1.18095 \times 10^{-5}$ | $-5.16857 \times 10^{-7}$ | $-8.68102 \times 10^{-10}$ | $-3.63804 \times 10^{-11}$ |
| 6 | 7.386 | $-5.88389 \times 10^{-4}$ | $-1.77024 \times 10^{-5}$ | $2.94038 \times 10^{-10}$ | $-1.44443 \times 10^{-8}$ |
| 7 | −35.173 | $-3.16877 \times 10^{-4}$ | $-9.12370 \times 10^{-6}$ | $1.33506 \times 10^{-7}$ | $-2.25341 \times 10^{-10}$ |
| 12 | 0.000 | $-1.33259 \times 10^{-4}$ | $-1.89869 \times 10^{-5}$ | $1.62043 \times 10^{-6}$ | $-1.96646 \times 10^{-7}$ |

[Zoom Data]

| | W | S | T |
|---|---|---|---|
| f(mm) | 8.068 | 13.438 | 23.275 |
| FNO | 2.77 | 3.59 | 5.01 |
| $d_4$ | 18.96 | 8.95 | 2.00 |
| $d_{12}$ | 5.52 | 12.09 | 21.96 |
| $d_{14}$ | 3.79 | 2.77 | 2.00 |
| $d_{18}$ | 0.80 | 0.80 | 0.80 |

Figure 30:
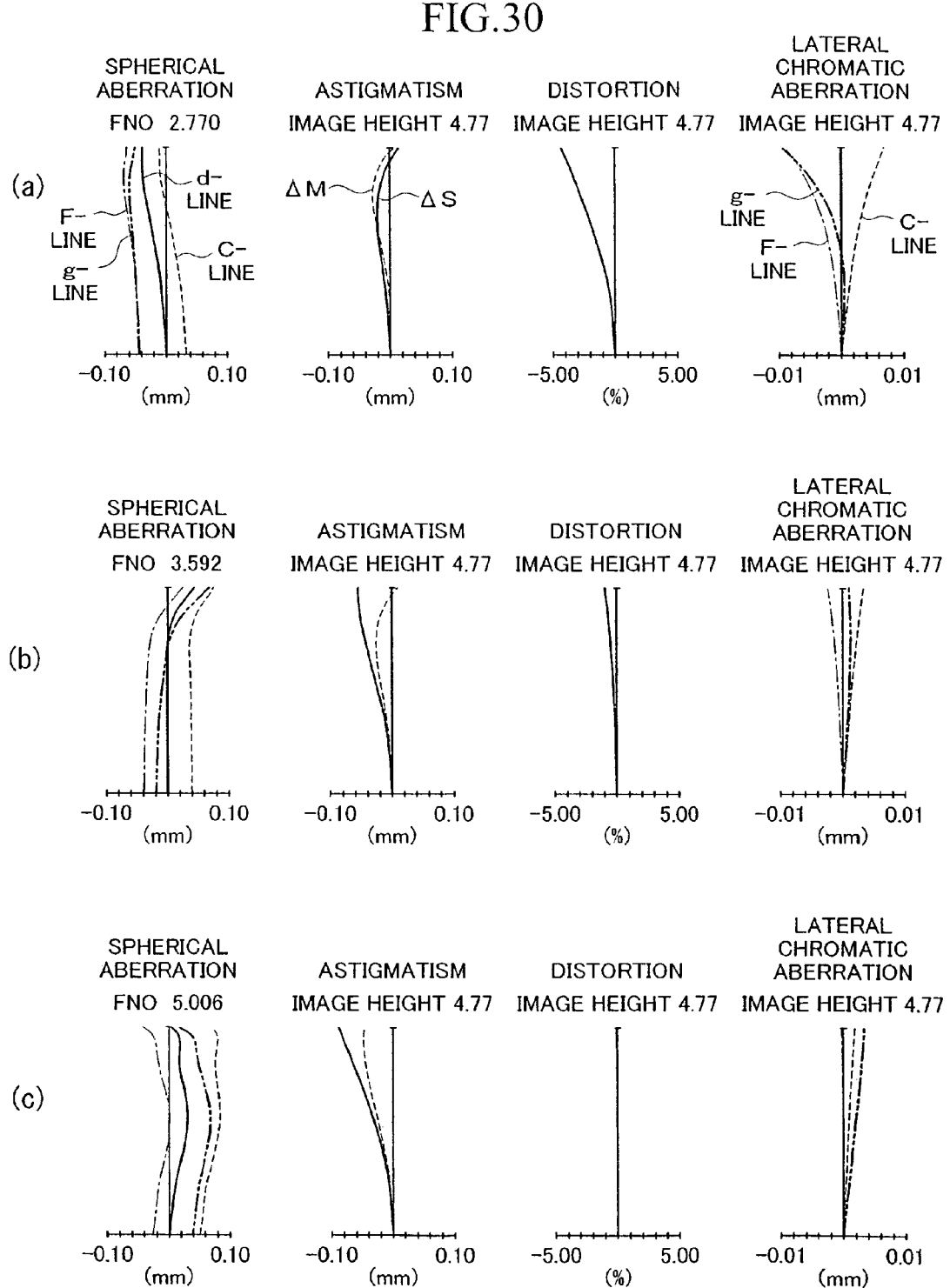
FIG. 30 is aberration curves of Example 3-2 in the wide-angle end, the middle focal length position, and the telephoto end.

Aberration curves of this example are shown in Parts (a), (b), and (c) of FIG. 30. Each drawing corresponds to the wide-angle end (W), the middle focal length position (S), or the telephoto end (T). The drawings are a spherical aberration diagram, an astigmatism diagram, a distortion diagram, and a diagram of chromatic difference of magnification from left to right. The units of each of the horizontal axes are millimeter (mm), millimeter (mm), percent (%), or millimeter (mm).

These diagrams indicate that each of the aberrations is corrected satisfactorily in this example.

The calculated values for each of the conditional formulae will be summarized later.

EXAMPLE 3-3

In the following, structural parameters of an optical system of a third numerical example corresponding to the zoom lenses of the third example (see FIG. 27) of the third embodiment described above will be described.

| Surface Number | Radius of Curvature | Spacing between Surface | Refractive Index | Abbe Number |
|---|---|---|---|---|
| 1 | $r_1 = \infty$ | $d_1 = 1.50$ | $n_{d1} = 1.80610$ | $v_{d1} = 40.92$ |
| 2 | $r_2 = 8.753$ | $d_2 = 2.71$ | | |
| 3 | $r_3 = 29.169$ (aspherical) | $d_3 = 2.35$ | $n_{d2} = 1.84666$ | $v_{d2} = 23.78$ |
| 4 | $r_4 = -102.659$ (aspherical) | $d_4 =$ (variable) | | |

-continued

| Surface Number | Radius of Curvature | Spacing between Surface | Refractive Index | Abbe Number |
|---|---|---|---|---|
| 5 | $r_5 = \infty$ (stop) | $d_5 = 0.80$ | | |
| 6 | $r_6 = 14.140$ (aspherical) | $d_6 = 2.10$ | $n_{d3} = 1.58313$ | $v_{d3} = 59.46$ |
| 7 | $r_7 = -24.946$ (aspherical) | $d_7 = 0.10$ | | |
| 8 | $r_8 = 5.904$ | $d_8 = 2.08$ | $n_{d4} = 1.69100$ | $v_{d4} = 54.82$ |
| 9 | $r_9 = 13.607$ | $d_9 = 1.37$ | $n_{d5} = 1.80518$ | $v_{d5} = 25.42$ |
| 10 | $r_{10} = 4.124$ | $d_{10} = 1.46$ | | |
| 11 | $r_{11} = -131.935$ | $d_{11} = 1.47$ | $n_{d6} = 1.51633$ | $v_{d6} = 64.14$ |
| 12 | $r_{12} = -75.520$ (aspherical) | $d_{12} =$ (variable) | | |
| 13 | $r_{13} = 23.098$ | $d_{13} = 2.22$ | $n_{d7} = 1.60311$ | $v_{d7} = 60.70$ |
| 14 | $r_{14} = -22.809$ | $d_{14} =$ (variable) | | |
| 15 | $r_{15} = \infty$ | $d_{15} = 0.95$ | $n_{d8} = 1.54771$ | $v_{d8} = 62.84$ |
| 16 | $r_{16} = \infty$ | $d_{16} = 0.55$ | | |
| 17 | $r_{17} = \infty$ | $d_{17} = 0.50$ | $n_{d9} = 1.51633$ | $v_{d9} = 64.14$ |
| 18 | $r_{18} = \infty$ | $d_{18} =$ (variable) | | |
| I | $\infty$ (image surface) | | | |

[Aspherical Coefficients]

| Surface Number | K | $A_4$ | $A_6$ | $A_8$ | $A_{10}$ |
|---|---|---|---|---|---|
| 3 | 0.000 | $5.74375 \times 10^{-5}$ | $-8.37511 \times 10^{-6}$ | $4.11074 \times 10^{-7}$ | $-5.28660 \times 10^{-9}$ |
| 4 | 0.000 | $-6.94729 \times 10^{-5}$ | $-7.63117 \times 10^{-6}$ | $3.77509 \times 10^{-7}$ | $-5.46523 \times 10^{-9}$ |
| 6 | 6.643 | $-6.02020 \times 10^{-4}$ | $-5.51363 \times 10^{-6}$ | $-7.20229 \times 10^{-7}$ | $8.33261 \times 10^{-9}$ |
| 7 | −0.550 | $-2.31108 \times 10^{-4}$ | $1.70053 \times 10^{-6}$ | $-6.41632 \times 10^{-7}$ | $1.97033 \times 10^{-8}$ |
| 12 | 0.000 | $1.51066 \times 10^{-4}$ | $-5.40629 \times 10^{-6}$ | $4.30502 \times 10^{-7}$ | $-1.15320 \times 10^{-7}$ |

[Zoom Data]

|  | W | S | T |
|---|---|---|---|
| f(mm) | 8.068 | 13.438 | 23.275 |
| FNO | 2.86 | 3.83 | 5.29 |
| $d_4$ | 18.61 | 9.15 | 1.24 |
| $d_{12}$ | 4.60 | 11.63 | 20.83 |
| $d_{14}$ | 3.38 | 2.00 | 2.00 |
| $d_{18}$ | 0.90 | 0.90 | 0.90 |

Figure 31:
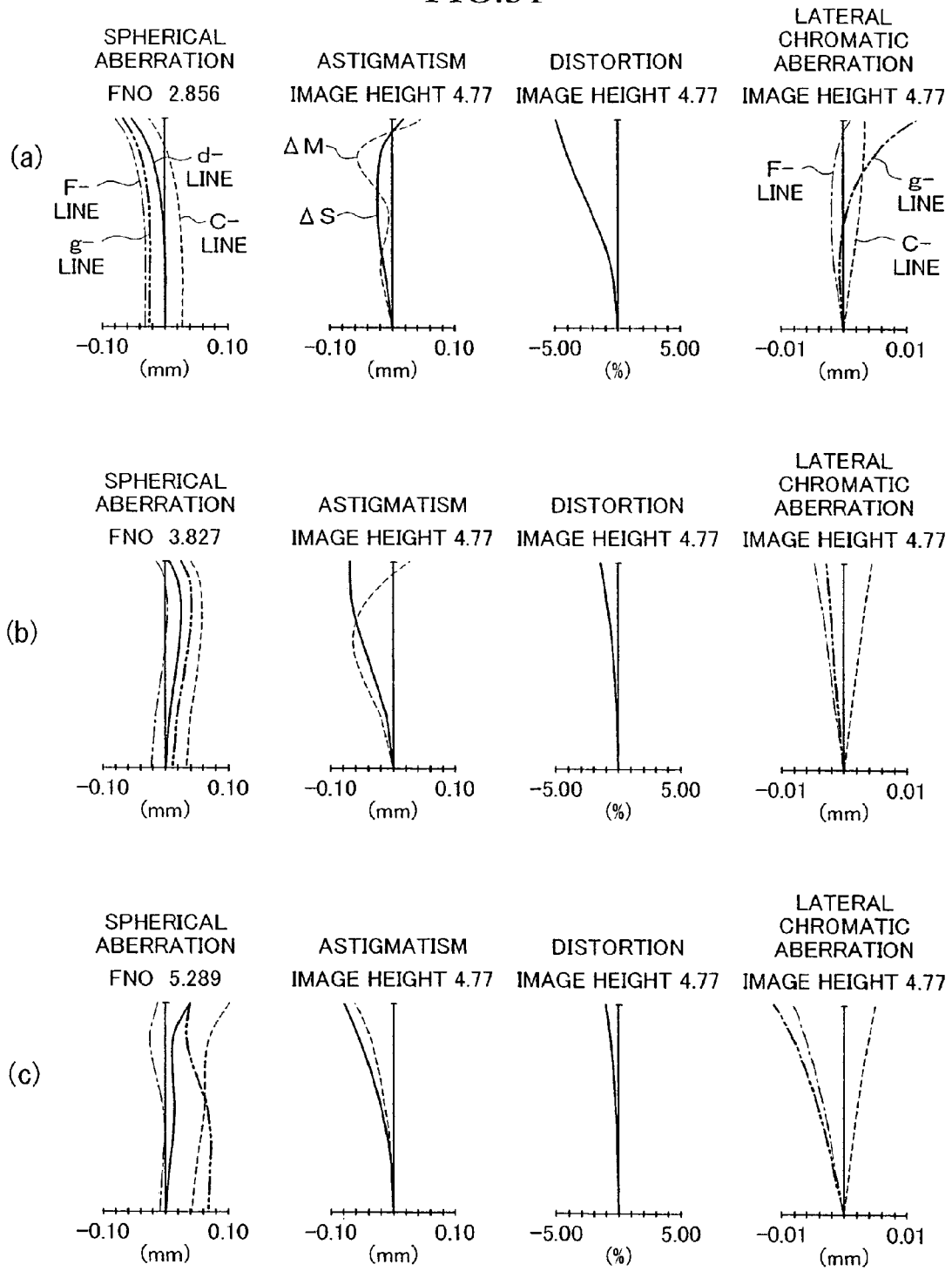
FIG. 31 is aberration curves of Example 3-3 in the wide-angle end, the middle focal length position, and the telephoto end.

Aberration curves of this example are shown in Parts (a), (b), and (c) of FIG. 31. Each drawing corresponds to the wide-angle end (W), the middle focal length position (S), or the telephoto end (T). The drawings are a spherical aberration diagram, an astigmatism diagram, a distortion diagram, and a diagram of chromatic difference of magnification from left to right. The units of each of the horizontal axes are millimeter (mm), millimeter (mm), percent (%), or millimeter (mm).

These diagrams indicate that each of the aberrations is corrected satisfactorily in this example.

The calculated values for each of the conditional formulae will be summarized later.

EXAMPLE 3-4

In the following, structural parameters of an optical system of a fourth numerical example corresponding to the zoom lenses of the fourth example (see FIG. 28) of the fourth embodiment described above will be described.

| Surface Number | Radius of Curvature | Spacing between Surface | Refractive Index | Abbe Number |
|---|---|---|---|---|
| 1 | $r_1 = \infty$ | $d_1 = 1.50$ | $n_{d1} = 1.77377$ | $v_{d1} = 47.17$ |
| 2 | $r_2 = 7.490$ (aspherical) | $d_2 = 2.72$ | | |
| 3 | $r_3 = 13.222$ | $d_3 = 2.11$ | $n_{d2} = 1.80518$ | $v_{d2} = 25.42$ |
| 4 | $r_4 = 38.308$ | $d_4 = $ (variable) | | |
| 5 | $r_5 = \infty$ (stop) | $d_5 = 0.80$ | | |
| 6 | $r_6 = 16.536$ (aspherical) | $d_6 = 1.77$ | $n_{d3} = 1.74330$ | $v_{d3} = 49.33$ |
| 7 | $r_7 = -41.171$ (aspherical) | $d_7 = 0.02$ | | |
| 8 | $r_8 = 5.596$ | $d_8 = 2.48$ | $n_{d4} = 1.51633$ | $v_{d4} = 64.14$ |
| 9 | $r_9 = 16.030$ | $d_9 = 1.02$ | $n_{d5} = 1.80518$ | $v_{d5} = 25.42$ |
| 10 | $r_{10} = 4.623$ | $d_{10} = 1.02$ | | |
| 11 | $r_{11} = 1319.760$ | $d_{11} = 1.43$ | $n_{d6} = 1.51633$ | $v_{d6} = 64.14$ |
| 12 | $r_{12} = -24.853$ | $d_{12} = $ (variable) | | |
| 13 | $r_{13} = 37.064$ | $d_{13} = 2.07$ | $n_{d7} = 1.74400$ | $v_{d7} = 44.78$ |
| 14 | $r_{14} = -36.893$ | $d_{14} = $ (variable) | | |
| 15 | $r_{15} = \infty$ | $d_{15} = 0.95$ | $n_{d8} = 1.54771$ | $v_{d8} = 62.84$ |
| 16 | $r_{16} = \infty$ | $d_{16} = 0.55$ | | |
| 17 | $r_{17} = \infty$ | $d_{17} = 0.50$ | $n_{d9} = 1.51633$ | $v_{d9} = 64.14$ |
| 18 | $r_{18} = \infty$ | $d_{18} = $ (variable) | | |
| I | $\infty$ (image surface) | | | |

[Aspherical Coefficients]

| Surface Number | K | $A_4$ | $A_6$ | $A_8$ | $A_{10}$ |
|---|---|---|---|---|---|
| 2 | −0.697 | $7.65750 \times 10^{-6}$ | $-1.68254 \times 10^{-12}$ | $-1.42325 \times 10^{-15}$ | $-8.49690 \times 10^{-12}$ |
| 6 | 9.778 | $-4.32998 \times 10^{-4}$ | $-5.71365 \times 10^{-6}$ | $-4.70780 \times 10^{-8}$ | $-6.55631 \times 10^{-9}$ |
| 7 | −29.058 | $-1.46704 \times 10^{-4}$ | $1.20833 \times 10^{-6}$ | $7.61198 \times 10^{-8}$ | $2.82407 \times 10^{-9}$ |

[Zoom Data]

|  | W | S | T |
|---|---|---|---|
| f(mm) | 8.119 | 13.436 | 23.244 |
| FNO | 2.87 | 3.70 | 5.15 |
| $d_4$ | 18.31 | 8.63 | 1.99 |
| $d_{12}$ | 6.21 | 12.49 | 23.05 |
| $d_{14}$ | 4.16 | 3.76 | 3.87 |
| $d_{18}$ | 0.79 | 0.80 | 0.79 |

Figure 32:
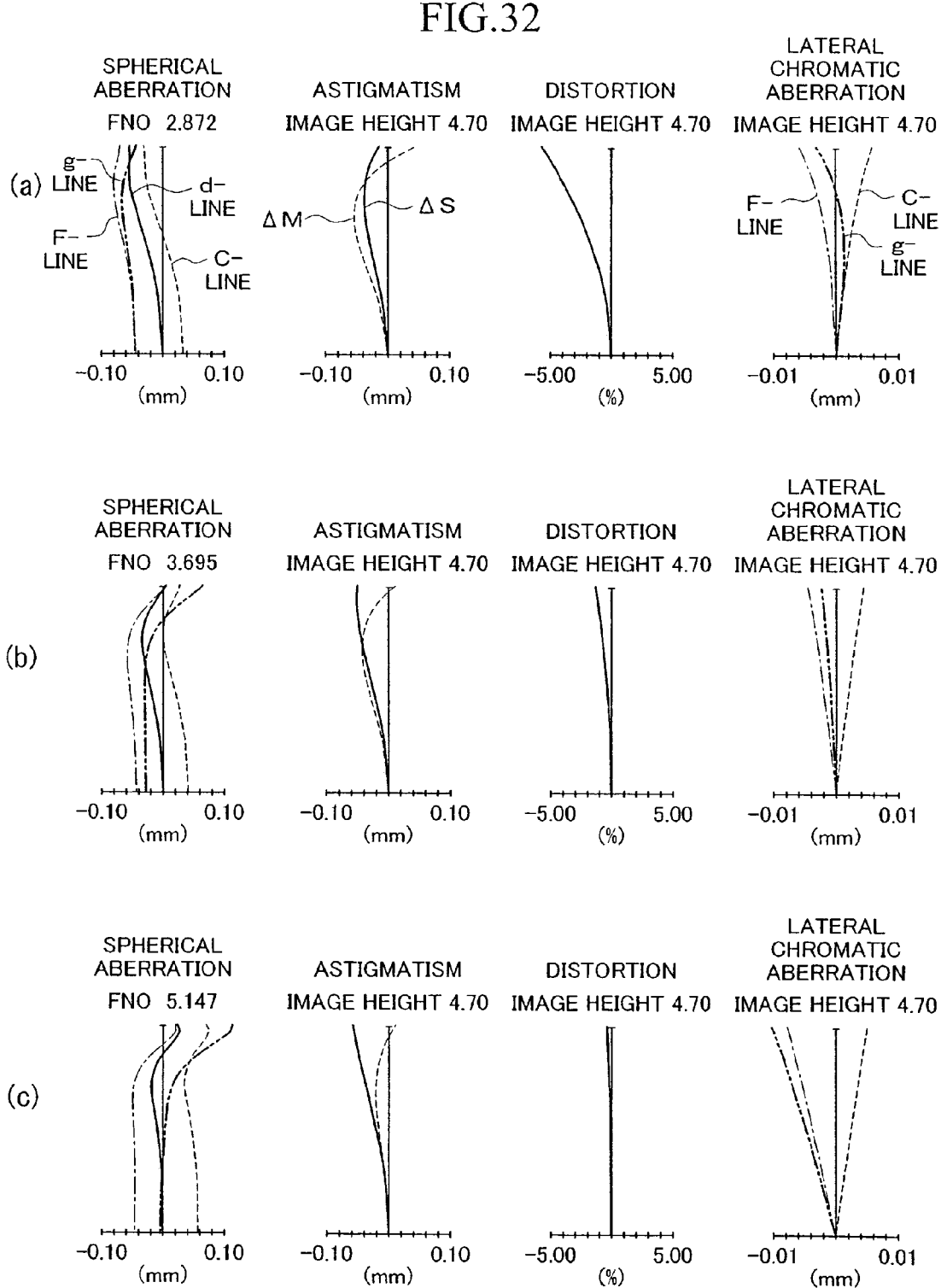
FIG. 32 is aberration curves of Example 3-4 in the wide-angle end, the middle focal length position, and the telephoto end.

Aberration curves of this example are shown in Parts (a), (b), and (c) of FIG. 32. Each drawing corresponds to the wide-angle end (W), the middle focal length position (S), or the telephoto end (T). The drawings are a spherical aberration diagram, an astigmatism diagram, a distortion diagram, and a diagram of chromatic difference of magnification from left to right. The units of each of the horizontal axes are millimeter (mm), millimeter (mm), percent (%), or millimeter (mm).

The calculated values for each of the conditional formulae will be summarized later.

Values of the conditional formulae in Examples 3-1 to 3-4 are summarized in the following table:

TABLE 3

| Conditional Expression | | Ex. 1 | Ex. 2 | Ex. 3 | Ex. 4 |
|---|---|---|---|---|---|
| $L_t/f_2$ | (3-1) | 3.22 | 3.07 | 2.94 | 3.23 |
| $(R_{13} + R_{14})/(R_{13} - R_{14})$ | (3-2) | −1.96 | −1.86 | −0.56 | −2.05 |
| $T_1/T_2$ | (3-3) | 0.82 | 0.71 | 0.77 | 0.82 |
| $|f_1/f_2|$ | (3-4) | 1.26 | 1.35 | 1.45 | 1.26 |
| $|X_2/f_1|$ | (3-5) | 0.87 | 0.72 | 0.67 | 0.87 |

TABLE 3-continued

| | Conditional Expression | Ex. 1 | Ex. 2 | Ex. 3 | Ex. 4 |
|---|---|---|---|---|---|
| $f_W/f_3$ | (3-6) | 0.32 | 0.33 | 0.42 | 0.32 |
| $R_{23R}/R_{22F}$ | (3-7) | 0.84 | 0.77 | 0.7 | 0.83 |
| $f_2/R_{23F}$ | (3-8) | 0.9 | 1.27 | 1.13 | 0.94 |
| $|f_2/f_{23}|$ | (3-9) | 1.84 | 1.69 | 1.95 | 1.79 |
| $(A_{sp12F} - A_{sp12R})/f_W$ | (3-10) | none | none | 0.022 | none |

SECOND EMBODIMENT OF THIRD ASPECT

A camera according to a second embodiment of the third aspect of the present invention will be described.

The zoom lens according to the second embodiment of the third aspect as described above may be applied to phototaking systems where object images formed through zoom lenses are received at image pickup devices such as CCDs, inter alia, digital cameras or video cameras as well as PCs and telephone sets that are typical information processors, in particular, easy-to-carry cellular phones. Given below are some such embodiments.

Figure 33:
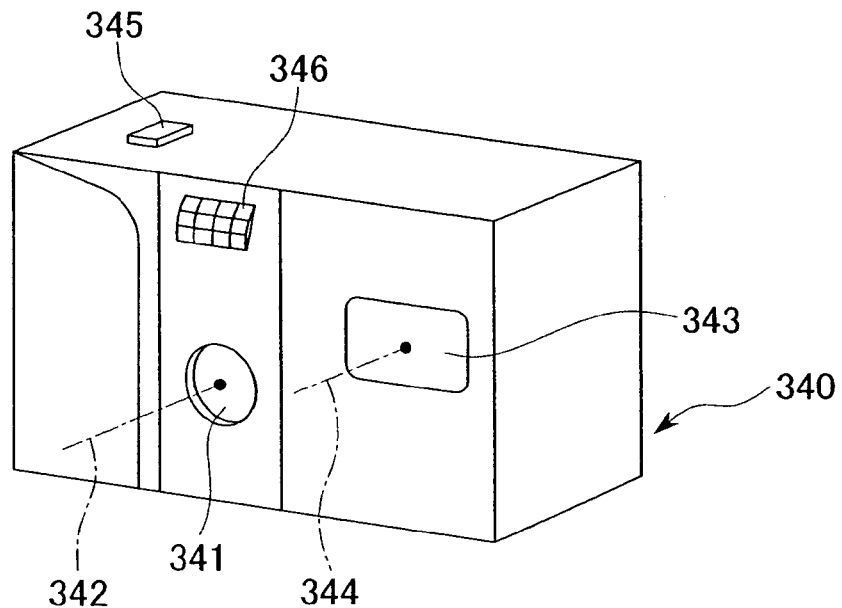
FIG. 33 is a front perspective schematic illustrative of the outside shape of a digital camera in which the zoom lens of the third aspect of the present invention is built.
Figure 34:
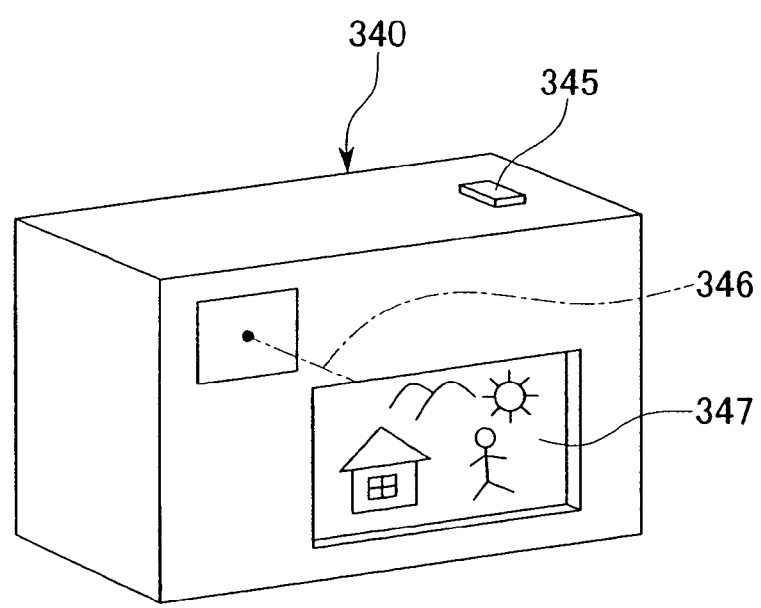
FIG. 34 is a back perspective view of the digital camera shown in FIG. 33.
Figure 35:
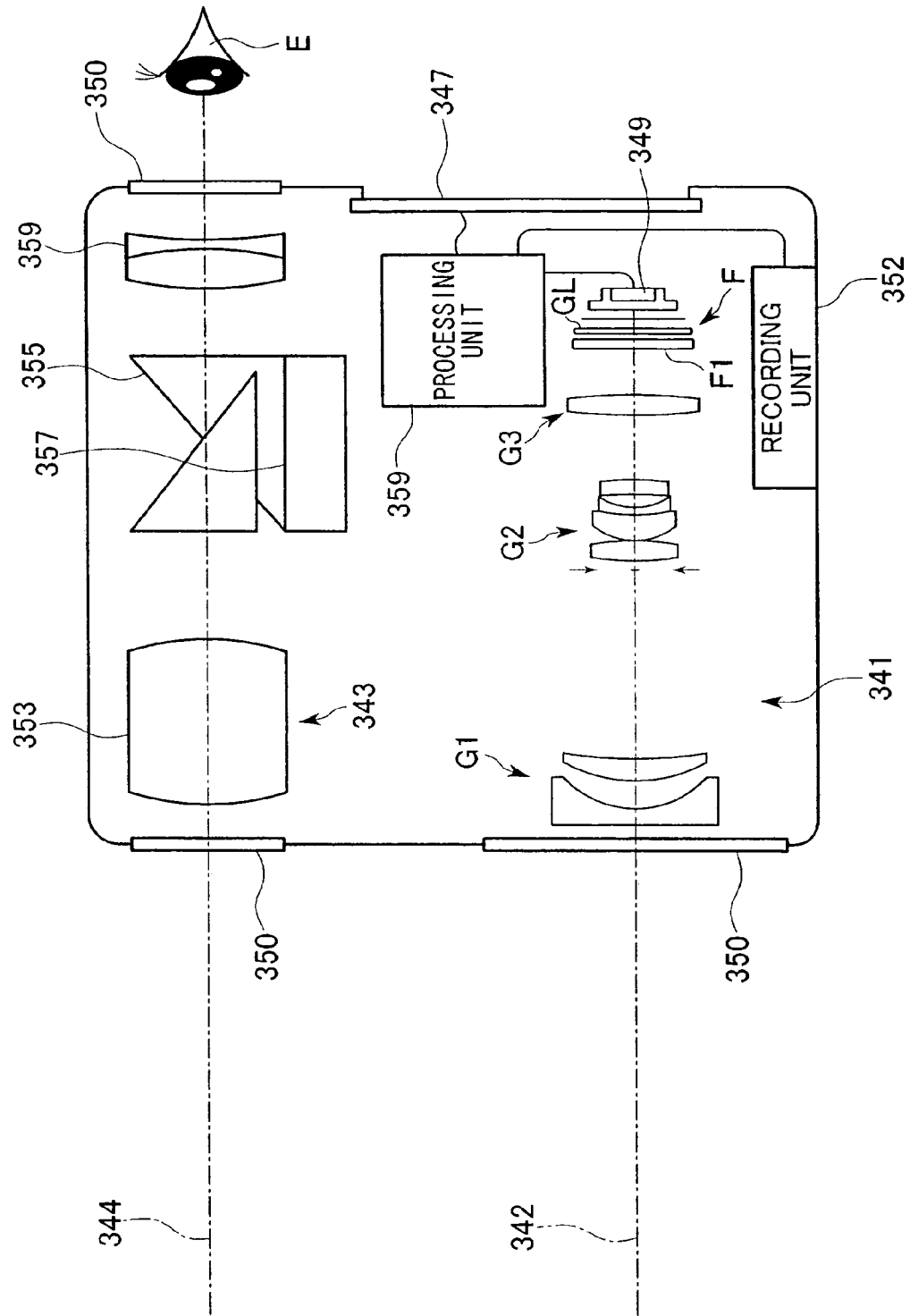
FIG. 35 is a front perspective schematic illustrative of the outside shape of a digital camera in which the zoom lens of the third aspect of the present invention is built.

FIGS. 33 to 35 are conceptual illustrations of a phototaking optical system 341 for digital cameras, in which the zoom lens of the present invention is built. FIG. 33 is a front perspective view of the outside shape of a digital camera 340, FIG. 34 is a rear perspective view of the same, and FIG. 35 is a cross-sectional view illustrating the structure of the digital camera 340.

In this embodiment, the digital camera 340 (camera) includes a phototaking optical system 341 (zoom lens) including a phototaking optical path 342, a finder optical system 344 including a finder optical path 343, a shutter 345, a flash 346, a liquid crystal monitor 347 and so on. As the shutter 345 mounted on the upper portion of the camera 341 is pressed down, phototaking takes place through the phototaking optical system 341, for instance, the zoom lens 3100, 3101, 3102, 3103, or 3104 according to the first embodiment. An object image formed by the phototaking optical system 341 is formed on the image pickup plane of a CCD 349 (image pickup element) via an optical low-pass filter LF and a cover glass GL. The object image received at CCD 349 is shown as an electronic image on the liquid crystal monitor 347 via processing means 351, which monitor is mounted on the back of the camera. This processing means 351 is connected with recording means 352 in which the phototaken electronic image may be recorded. It is here noted that the recording means 352 may be provided separately from the processing means 351 or, alternatively, it may be constructed in such a way that images are electronically recorded and written therein by means of floppy discs, memory cards, MOs or the like. This camera may also be constructed in the form of a silver halide camera using a silver halide film in place of CCD 349.

Moreover, a finder objective optical system 353 is located on the finder optical path 344. An object image formed by the finder objective optical system 353 is in turn formed on the field frame 355 of a Porro prism 357 that is an image-erecting member. In the rear of the Porro prism 355 there is located an eyepiece optical system 359 for guiding an erected image into the eyeball E of an observer. It is here noted that cover members 350 are provided on the entrance sides of the phototaking optical system 341 and finder objective optical system 353 as well as on the exit side of the eyepiece optical system 359.

With the thus constructed digital camera 340, it is possible to achieve high performance and cost reductions, because the phototaking optical system 341 is constructed of a zoom lens having a high zoom ratio in the wide-angle end with satisfactory aberrations and a back focus large enough to receive a filter, etc., therein.

In the embodiment of FIG. 35, plane-parallel plates are used as the cover members 350; however, it is acceptable to use powered lenses.

While preferred embodiments of the invention have been described and illustrated above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A three-group zoom lens, comprising, in order from an object side thereof:
   a first lens group having a negative refractive power, comprising in order from the object side:
      a negative-power first lens; and
      a positive-power second lens, wherein the first lens group has no third lens, and the first lens group includes at least one aspherical surface,
   a second lens group having a positive refractive power, comprising in order from the object side thereof,
      a positive-power first lens;
      a positive-power second lens; and
      a negative-power third lens; wherein the positive-power second lens and the negative-power third lens are cemented together to form a meniscus-shaped cemented lens that faces a convex surface to the object side and the second lens group has aspherical surfaces on at least two surfaces other than a cemented surface of the cemented lens; and
   a third lens group having a positive refractive power, comprising:
      a positive-power single lens having two spherical surfaces on the two sides, wherein the third lens group has no second lens,
   wherein the first lens group moves to the object side after moving to an image side, the second lens group moves only to the object side, and the third lens group moves in an amount different from that of the second lens group upon focusing an object point at infinity from a wide-angle end to a telephoto end, and the third lens group is configured to be movable for focusing,
   wherein and the following conditional formula are satisfied:

$$2.3 < L_t/f_2 < 3.7$$

$$1.15 < |f_1/f_2| < 2.0$$

where $L_t$ is a distance between a lens surface that is closest to the object side of the three-group zoom lens and the image plane at the telephoto end, $f_2$ is a focal length of the second lens group, and $f_1$ is a focal length of the first lens group.

2. The three-group zoom lens according to claim 1, wherein the following conditional formula is satisfied:

$$0.29 < f_W/f_3 < 0.6$$

where $f_W$ is a focal length of the entire three-group zoom lens in the wide-angle end, and $f_3$ is a focal length of the third lens group.

3. The three-group zoom lens according to claim 1, wherein the following conditional formula is satisfied:

$$0.4 < |X_2/f_1| < 1.0$$

where $X_2$ is an amount of movement of the second lens group upon varying magnifying power from the wide-angle end to the telephoto end, and $f_1$ is a focal length of the first lens group.

4. The three-group zoom lens according to claim 1, wherein the positive-power first lens in the second lens group has aspherical surfaces on the two sides.

5. The three-group zoom lens according to claim 1, wherein a fourth positive-power lens is provided to an image side of the cemented lens in the second lens group.

6. The three-group zoom lens according to claim 5, wherein the fourth positive-power lens in the second lens group is a single lens that has a convex surface on an image side.

7. The three-group zoom lens according to claim 5, wherein an image side surface of the fourth positive-power lens in the second lens group is an aspherical surface.

8. The three-group zoom lens according to claim 1, wherein the negative-power first lens in the first lens group includes a concave surface, on the image side having a greater absolute value of a curvature than an absolute value of a curvature of the object side surface, and the concave surface on the image side is an aspherical surface.

9. The three-group zoom lens according to claim 1, wherein the positive-power second lens in the first lens group has aspherical surfaces on the two sides.

10. The three-group zoom lens according to claim 1, wherein the positive-power second lens in the first lens group has a refractive index of 1.85 or higher for the d-line.

11. An image pickup apparatus comprising:
  a three-group zoom lens, comprising, in order from an object side thereof: a first lens group having a negative refractive power, comprising in order from the object side: a negative-power first lens; and a positive-power second lens, wherein the first lens group has no third lens, and the first lens group includes at least one aspherical surface, a second lens group having a positive refractive power, comprising in order from the object side thereof, a positive-power first lens; a positive-power second lens; and a negative-power third lens; wherein the positive-power second lens and the negative-power third lens are cemented together to form a meniscus-shaped cemented lens that faces a convex surface to the object side and the second lens group has aspherical surfaces on at least two surfaces other than a cemented surface of the cemented lens; and a third lens group having a positive refractive power, comprising: a positive-power single lens having two spherical surfaces on the two sides, wherein the third lens group has no second lens, wherein the first lens group moves to the object side after moving to an image side, the second lens group moves only to the object side, and the third lens group moves in an amount different from that of the second lens group upon focusing an object point at infinity from a wide-angle end to a telephoto end, and the third lens group is configured to be movable for focusing, wherein and the following conditional formula are satisfied:

$$2.3 < L_t/f_2 < 3.7$$

$$1.15 < |f_1/f_2| < 2.0$$

where $L_t$ is a distance between a lens surface that is closest to the object side of the three-group zoom lens and the image plane at the telephoto end, $f_2$ is a focal length of the second lens group, and $f_1$ is a focal length of the first lens group; and
  an image pickup element disposed at an image formation position of the three-group zoom lens.

12. A three-group zoom lens comprising, in order from an object side thereof:
  a first lens group having a negative refractive power, comprising in order from the object side:
    a negative-power first lens; and
    a positive-power second lens, wherein the first lens group has no third lens, and the first lens group includes at least one aspherical surface,
  a second lens group having a positive refractive power, comprising in order from the object side thereof,
    a positive-power first lens;
    a positive-power second lens;
    a negative-power third lens; and
    a fourth lens that is made of a single lens having a convex surface on an image side, wherein the positive-power second lens and the negative-power third lens are cemented together to form a meniscus-shaped cemented lens that faces a convex surface to the object side and the second lens group has aspherical surfaces on at least two surfaces other than a cemented surface of the cemented lens; and
  a third lens group having a positive refractive power, comprising:
    a positive-power single lens, wherein the third lens group has no second lens,
  wherein the first lens group moves to the object side after moving to the image side, the second lens group moves only to the object side, and the third lens group moves in an amount different from that of the second lens group upon focusing an object point at infinity from a wide-angle end to a telephoto end, and the third lens group is configured to be movable for focusing,
  and the following conditional formulae are satisfied:

$$2.3 < L_t/f_2 < 3.7$$

$$0.29 < f_W/f_3 < 0.6$$

$$0.4 < f_2/R_{2C} < 1.4$$

where $L_t$ is a distance between a lens surface that is closest to the object side of the three-group zoom lens and the image plane at the telephoto end, $f_2$ is a focal length of the second lens group, $f_W$ is a focal length of the entire three-group zoom lens in the wide-angle end, $f_3$ is a focal length of the third lens group, and $R_{2C}$ is a paraxial radius of curvature of the cemented surface of the cemented lens in the second lens group.

13. The three-group zoom lens according to claim 12, wherein the fourth lens in the second lens group has a positive refractive power.

14. The three-group zoom lens according to claim 12, wherein the following conditional formula is satisfied:

$$0.5 < |X_2/f_1| < 0.9$$

where $X_2$ is an amount of movement of the second lens group upon varying magnifying power from the wide-angle end to the telephoto end, and $f_1$ is a focal length of the first lens group.

15. The three-group zoom lens according to claim 12, wherein the following conditional formula is satisfied:

$$1.15 < |f_1/f_2| < 2.0$$

where $f_1$ is a focal length of the first lens group, and $f_2$ is a focal length of the second lens group.

16. The three-group zoom lens according to claim 12, wherein the positive-power first lens in the second lens group has aspherical surfaces on the two sides.

17. The three-group zoom lens according to claim 12, wherein an image side surface of the fourth lens in the second lens group is an aspherical surface.

18. The three-group zoom lens according to claim 12, wherein the negative-power first lens in the first lens group includes a concave surface, on the image side having a greater absolute value of a curvature than an absolute value of a curvature of the object side surface, and the concave surface on the image side is an aspherical surface.

19. The three-group zoom lens according to claim 12, wherein the positive-power second lens in the first lens group has aspherical surfaces on the two sides.

20. The three-group zoom lens according to claim 12, wherein the positive-power second lens in the first lens group has a refractive index of 1.85 or higher for the d-line.

21. The three-group zoom lens according to claim 12, wherein the positive power single lens in the third lens group has two spherical surfaces.

22. An image pickup apparatus comprising:
a three-group zoom lens comprising, in order from an object side thereof: a first lens group having a negative refractive power, comprising in order from the object side: a negative-power first lens; and a positive-power second lens, wherein the first lens group has no third lens, and the first lens group includes at least one aspherical surface, a second lens group having a positive refractive power, comprising in order from the object side thereof, a positive-power first lens; a positive-power second lens; a negative-power third lens; and a fourth lens that is made of a single lens having a convex surface on an image side, wherein the positive-power second lens and the negative-power third lens are cemented together to form a meniscus-shaped cemented lens that faces a convex surface to the object side and the second lens group has aspherical surfaces on at least two surfaces other than a cemented surface of the cemented lens; and a third lens group having a positive refractive power, comprising: a positive-power single lens, wherein the third lens group has no second lens, wherein the first lens group moves to the object side after moving to the image side, the second lens group moves only to the object side, and the third lens group moves in an amount different from that of the second lens group upon focusing an object point at infinity from a wide-angle end to a telephoto end, and the third lens group is configured to be movable for focusing, and the following conditional formulae are satisfied:

$$2.3 < L_t/f_2 < 3.7$$

$$0.29 < f_W/f_3 < 0.6$$

$$0.4 < f_2/R_{2C} < 1.4$$

where $L_t$ is a distance between a lens surface that is closest to the object side of the three-group zoom lens and the image plane at the telephoto end, $f_2$ is a focal length of the second lens group, $f_W$ is a focal length of the entire three-group zoom lens in the wide-angle end, $f_3$ is a focal length of the third lens group, and $R_{2C}$ is a paraxial radius of curvature of the cemented surface of the cemented lens in the second lens group; and
an image pickup element disposed at an image formation position of the three-group zoom lens.

23. A three-group zoom lens, comprising, in order from an object side thereof:
a first lens group having a negative refractive power, comprising in order from the object side:
a negative-power first lens; and
a positive-power second lens, wherein the first lens group has no third lens, and the first lens group includes at least one aspherical surface,
a second lens group having a positive refractive power, comprising in order from the object side thereof,
a positive-power first lens;
a positive-power second lens;
a negative-power third lens; and
a fourth lens that is made of a single lens having a convex surface on an image side, wherein the positive-power second lens and the negative-power third lens are cemented together to form a meniscus-shaped cemented lens that faces a convex surface to the object side and the second lens group has aspherical surfaces on at least two surfaces other than a cemented surface of the cemented lens; and
a third lens group having a positive refractive power, comprising:
a positive-power single lens, wherein the third lens group has no second lens,
wherein the first lens group moves to the object side after moving to the image side, the second lens group moves only to the object side, and the third lens group moves in an amount different from that of the second lens group upon focusing an object point at infinity from a wide-angle end to a telephoto end, and the third lens group is configured to be movable for focusing,
and the following conditional formulae are satisfied:

$$2.3 < L_t/f_2 < 3.7$$

$$-2.5 < (R_{13}+R_{14})/(R_{13}-R_{14}) < -0.4$$

$$0.65 < T_1/T_2 < 1$$

where $L_t$ is a distance between a lens surface that is closest to the object side of the three-group zoom lens and the image plane at the telephoto end, $f_2$ is a focal length of the second lens group, $R_{13}$ is a radius of curvature of the object side surface of the positive-power second lens in the first lens group, $R_{14}$ is a radius of curvature of the image side surface of the positive-power second lens in the first lens group, $T_1$ is a distance along the optical axis from a surface that is closest to the object side to a surface closest to the image side of the first lens group, and $T_2$ is a distance along the optical axis a surface that is closest to the object side to a surface closest to the image side of the second lens group.

24. The three-group zoom lens according to claim 23, wherein the negative-power first lens in the first lens group includes a concave surface, on the image side having a greater absolute value of a curvature than an absolute value of a curvature of the object side surface, and the concave surface on the image side is an aspherical surface.

25. The three-group zoom lens according to claim 23, wherein the positive-power second lens in the first lens group has aspherical surfaces on the two sides.

26. The three-group zoom lens according to claim 23, wherein the positive-power second lens in the first lens group has a refractive index of 1.85 or higher for the d-line.

27. The three-group zoom lens according to claim 23, wherein the following conditional formula is satisfied:

$1.15 < |f_1/f_2| < 2.0$ where $f_1$ is a focal length of the first lens group, and $f_2$ is a focal length of the second lens group.

28. The three-group zoom lens according to claim 23, wherein the following conditional formula is satisfied:

$0.5 < |X_2/f_1| < 0.9$ where $X_2$ is an amount of movement of the second lens group upon varying magnifying power from the wide-angle end to the telephoto end, and $f_1$ is a focal length of the first lens group.

29. The three-group zoom lens according to claim 23, wherein the fourth lens in the second lens group has a positive refractive power.

30. The three-group zoom lens according to claim 23, wherein the positive-power first lens in the second lens group has aspherical surfaces on the two sides.

31. The three-group zoom lens according to claim 23, wherein an image side surface of the fourth lens in the second lens group is an aspherical surface.

32. The three-group zoom lens according to claim 23, wherein the following conditional formula is satisfied:

$0.29 < f_W/f_3 < 0.6$ where $f_W$ is a focal length of the entire three-group zoom lens in the wide-angle end, and $f_3$ is a focal length of the third lens group.

33. The three-group zoom lens according to claim 23, wherein the two sides of the single lens in the third lens group only are spherical surfaces.

34. An image pickup apparatus comprising:
a three-group zoom lens, comprising, in order from an object side thereof: a first lens group having a negative refractive power, comprising in order from the object side: a negative-power first lens; and a positive-power second lens, wherein the first lens group has no third lens, and the first lens group includes at least one aspherical surface, a second lens group having a positive refractive power, comprising in order from the object side thereof, a positive-power first lens; a positive-power second lens; a negative-power third lens; and a fourth lens that is made of a single lens having a convex surface on an image side, wherein the positive-power second lens and the negative-power third lens are cemented together to form a meniscus-shaped cemented lens that faces a convex surface to the object side and the second lens group has aspherical surfaces on at least two surfaces other than a cemented surface of the cemented lens; and a third lens group having a positive refractive power, comprising: a positive-power single lens, wherein the third lens group has no second lens, wherein the first lens group moves to the object side after moving to the image side, the second lens group moves only to the object side, and the third lens group moves in an amount different from that of the second lens group upon focusing an object point at infinity from a wide-angle end to a telephoto end, and the third lens group is configured to be movable for focusing, and the following conditional formulae are satisfied:

$2.3 < L_t/f_2 < 3.7$ $-2.5 < (R_{13}+R_{14})/(R_{13}-R_{14}) < -0.4$ $0.65 < T_1/T_2 < 1$ where $L_t$ is a distance between a lens surface that is closest to the object side of the three-group zoom lens and the image plane at the telephoto end, $f_2$ is a focal length of the second lens group, $R_{13}$ is a radius of curvature of the object side surface of the positive-power second lens in the first lens group, $R_{14}$ is a radius of curvature of the image side surface of the positive-power second lens in the first lens group, $T_1$ is a distance along the optical axis from a surface that is closest to the object side to a surface closest to the image side of the first lens group, and $T_2$ is a distance along the optical axis a surface that is closest to the object side to a surface closest to the image side of the second lens group and an image pickup element disposed at an image formation position of the three-group zoom lens.

* * * * *